(12) United States Patent
Fox et al.

(10) Patent No.: US 10,464,280 B2
(45) Date of Patent: Nov. 5, 2019

(54) TRIM COMPONENT FOR VEHICLE INTERIOR

(71) Applicant: Shanghai Yanfeng Jinqiao Automotive Trim Systems Co. Ltd., Plymouth, MI (US)

(72) Inventors: Bart William Fox, Zeeland, MI (US); Jeffery A. DeYoung, Holland, MI (US); Tony Michael Pokorzynski, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 324 days.

(21) Appl. No.: 15/459,894

(22) Filed: Mar. 15, 2017

(65) Prior Publication Data

US 2017/0182729 A1  Jun. 29, 2017

Related U.S. Application Data

(60) Continuation-in-part of application No. PCT/US2015/060710, filed on Nov. 13, 2015, which
(Continued)

(51) Int. Cl.
   *B32B 3/08* (2006.01)
   *B29C 45/00* (2006.01)
   (Continued)

(52) U.S. Cl.
   CPC ........... *B32B 3/08* (2013.01); *B29C 43/02* (2013.01); *B29C 43/361* (2013.01); *B29C 43/40* (2013.01);
   (Continued)

(58) Field of Classification Search
   CPC .................................................. B32B 3/08
   See application file for complete search history.

(56) References Cited

U.S. PATENT DOCUMENTS 2,903,388 A   9/1959  Jonke et al.
4,015,872 A   4/1977  Loznak et al.
(Continued)

FOREIGN PATENT DOCUMENTS

CA   939473 A1   1/1974
CA   977113 A1   11/1975
(Continued)

OTHER PUBLICATIONS

Communication from the Examining Division and Annex to the Communication from the European Patent Office for EP Patent Application No. 17158656.3 dated Nov. 22, 2018 (in English) (16 pages).
(Continued)

*Primary Examiner* — Larry W Thrower

(57) ABSTRACT

A trim component for a vehicle interior is disclosed. The trim component comprises a fiber panel, a structure and a cover coupled to the fiber panel and/or the structure. The fiber panel may comprise fibers and a resin binder. The structure may comprise resin such as a molded plastic. The structure may provide a border formed on a periphery and/or an edge of the fiber panel. The structure may be on the cover or the fiber panel. The structure may reinforce a gap and/or tear in the fiber panel. The structure may comprise a molded feature. The feature may comprise the border, a rib, or a connector. The cover may be coupled to an outer surface of the fiber panel and/or the structure. The trim component may be a trim panel, an instrument panel, a door panel, or other interior trim part.

22 Claims, 27 Drawing Sheets

Related U.S. Application Data is a continuation-in-part of application No. 14/808,938, filed on Jul. 24, 2015, now Pat. No. 10,118,325, which is a division of application No. 13/846,529, filed on Mar. 18, 2013, now Pat. No. 9,149,961, which is a continuation of application No. 13/595,741, filed on Aug. 27, 2012, now Pat. No. 8,939,745.

(60) Provisional application No. 62/079,932, filed on Nov. 14, 2014, provisional application No. 61/528,832, filed on Aug. 30, 2011.

(51) Int. Cl.

| | |
|---|---|
| *B32B 3/30* | (2006.01) |
| *B29C 45/14* | (2006.01) |
| *B32B 7/04* | (2019.01) |
| *B29C 43/02* | (2006.01) |
| *B29C 43/36* | (2006.01) |
| *B29C 43/40* | (2006.01) |
| *B32B 3/26* | (2006.01) |
| *B32B 7/08* | (2019.01) |
| *B32B 27/06* | (2006.01) |
| *B32B 27/12* | (2006.01) |
| *B60R 21/205* | (2011.01) |
| *B60R 21/2165* | (2011.01) |
| *B60R 13/02* | (2006.01) |
| *B29L 31/30* | (2006.01) |
| *B29C 43/14* | (2006.01) |
| *B29C 43/18* | (2006.01) |
| *B29C 43/32* | (2006.01) |
| *B29K 105/08* | (2006.01) |

(52) U.S. Cl.
CPC ...... *B29C 45/0005* (2013.01); *B29C 45/1418* (2013.01); *B29C 45/14786* (2013.01); *B32B 3/266* (2013.01); *B32B 3/30* (2013.01); *B32B 7/04* (2013.01); *B32B 7/08* (2013.01); *B32B 27/06* (2013.01); *B32B 27/12* (2013.01); *B29C 43/146* (2013.01); *B29C 43/183* (2013.01); *B29C 45/14336* (2013.01); *B29C 45/14344* (2013.01); *B29C 45/14467* (2013.01); *B29C 2043/325* (2013.01); *B29C 2043/3663* (2013.01); *B29C 2043/3665* (2013.01); *B29C 2045/14147* (2013.01); *B29C 2045/14442* (2013.01); *B29C 2045/14901* (2013.01); *B29K 2105/08* (2013.01); *B29L 2031/302* (2013.01); *B29L 2031/3014* (2013.01); *B29L 2031/3041* (2013.01); *B32B 2250/44* (2013.01); *B32B 2260/021* (2013.01); *B32B 2260/046* (2013.01); *B32B 2605/003* (2013.01); *B60R 13/0212* (2013.01); *B60R 13/0243* (2013.01); *B60R 13/0256* (2013.01); *B60R 13/0262* (2013.01); *B60R 21/205* (2013.01); *B60R 21/2165* (2013.01); *Y10T 428/192* (2015.01); *Y10T 428/2481* (2015.01); *Y10T 428/24273* (2015.01); *Y10T 428/24331* (2015.01); *Y10T 428/24339* (2015.01)

(56) References Cited

U.S. PATENT DOCUMENTS

| | | | |
|---|---|---|---|
| 4,124,242 A | 11/1978 | Canner | |
| 4,576,560 A | 3/1986 | Herman | |
| 4,766,025 A | 8/1988 | Sanok et al. | |
| 4,959,004 A | 9/1990 | Nowakowski | |
| 5,000,990 A | 3/1991 | Freeman | |
| 5,091,131 A | 2/1992 | Schumacher et al. | |
| 5,370,518 A | 12/1994 | Sasaki et al. | |
| 5,372,767 A | 12/1994 | Zimmermann et al. | |
| 5,679,301 A | 10/1997 | Miklas et al. | |
| 5,756,406 A | 5/1998 | Rittman et al. | |
| 5,804,117 A | 9/1998 | Baba et al. | |
| 5,807,513 A | 9/1998 | Gebreselassie et al. | |
| 5,902,533 A | 5/1999 | Munger et al. | |
| 5,968,437 A | 10/1999 | Harada | |
| 5,968,439 A | 10/1999 | Grove | |
| 6,027,678 A | 2/2000 | Rehm et al. | |
| 6,291,369 B1 | 9/2001 | Yoshikawa et al. | |
| 6,439,871 B1 | 8/2002 | Saito et al. | |
| 6,457,768 B1 | 10/2002 | Schroeder et al. | |
| 6,471,276 B1 | 10/2002 | Brunsman et al. | |
| 6,537,669 B1 | 3/2003 | Kaufmann | |
| 6,558,604 B1 | 5/2003 | Beckmann | |
| 6,558,608 B2 | 5/2003 | Haraldsson et al. | |
| 6,685,863 B1 | 2/2004 | Yabushita et al. | |
| 6,739,856 B2 | 5/2004 | Cesano | |
| 6,756,003 B2 | 6/2004 | Kieltyka et al. | |
| 6,893,247 B2 | 5/2005 | Uytterhaeghe et al. | |
| 7,186,105 B2 | 3/2007 | Cesano | |
| 7,241,412 B2 | 7/2007 | Cesano | |
| 8,216,501 B2 | 7/2012 | Egerer et al. | |
| 8,764,089 B2 | 7/2014 | Preisler et al. | |
| 8,939,745 B2 | 1/2015 | Fox et al. | |
| 9,149,961 B2 | 10/2015 | Fox et al. | |
| 9,409,332 B2 | 8/2016 | Kröner | |
| 2003/0149261 A1 | 8/2003 | Schramm et al. | |
| 2007/0290542 A1 | 12/2007 | Wada | |
| 2008/0292851 A1 | 11/2008 | Egerer et al. | |
| 2009/0226676 A1 | 9/2009 | Smith et al. | |
| 2012/0244323 A1 | 9/2012 | Dittmar | |
| 2013/0229024 A1 | 9/2013 | Schidan et al. | |
| 2015/0041081 A1 | 2/2015 | Banu et al. | |
| 2018/0056556 A1 | 3/2018 | Hildebrandt | |
| 2018/0264756 A1 | 9/2018 | Giaraffa et al. | |

FOREIGN PATENT DOCUMENTS

| | | |
|---|---|---|
| CA | 1138161 A1 | 12/1982 |
| CA | 1239336 A1 | 7/1988 |
| CA | 1258561 A1 | 8/1989 |
| CA | 2013848 A1 | 10/1990 |
| CA | 2018966 A1 | 12/1990 |
| CA | 2020235 A1 | 12/1990 |
| CA | 2018882 A1 | 2/1991 |
| CA | 2035921 A1 | 9/1991 |
| CA | 1291603 | 11/1991 |
| CA | 2085478 A1 | 1/1992 |
| CA | 1314366 | 3/1993 |
| CA | 1318502 | 6/1993 |
| CA | 2137347 A1 | 3/1994 |
| CA | 2143004 A1 | 6/1994 |
| CA | 2119694 A1 | 9/1994 |
| CA | 2156050 A1 | 9/1994 |
| CA | 2156061 A1 | 9/1994 |
| CA | 2168221 A1 | 2/1995 |
| CA | 2187446 A1 | 8/1996 |
| CA | 2175309 A1 | 11/1996 |
| CA | 2223779 A1 | 12/1996 |
| CA | 2318251 A1 | 7/1999 |
| CA | 2318554 A1 | 7/1999 |
| CA | 2269308 A1 | 10/1999 |
| CA | 2334853 A1 | 12/1999 |
| CA | 2317301 A1 | 3/2001 |
| CA | 2400641 A1 | 8/2001 |
| CA | 2341002 A1 | 9/2001 |
| CA | 2322343 A1 | 4/2002 |
| CA | 2424081 A1 | 4/2002 |
| CA | 2380114 A1 | 10/2003 |
| CA | 2509350 A1 | 6/2004 |
| CA | 2528219 A1 | 12/2004 |
| CA | 2557584 A1 | 9/2005 |
| CA | 2570816 A1 | 1/2006 |
| CA | 2570831 A1 | 1/2006 |
| CA | 2589120 A1 | 6/2006 |
| CA | 2591390 A1 | 7/2006 |
| CA | 2602166 A1 | 9/2006 |

(56) References Cited

FOREIGN PATENT DOCUMENTS

| | | |
|---|---|---|
| CA | 2568770 A1 | 6/2007 |
| CA | 2634260 A1 | 7/2007 |
| CA | 2648601 A1 | 10/2007 |
| CA | 2647317 A1 | 11/2007 |
| CA | 2647658 A1 | 11/2007 |
| CA | 2651595 A1 | 11/2007 |
| CA | 2653322 A1 | 12/2007 |
| CA | 2658572 A1 | 5/2008 |
| CA | 2672235 A1 | 7/2008 |
| CA | 2674316 A1 | 7/2008 |
| CA | 2674390 A1 | 7/2008 |
| CA | 2674457 A1 | 7/2008 |
| CA | 2675855 A1 | 7/2008 |
| CA | 2689506 A1 | 12/2008 |
| CA | 2695245 A1 | 2/2009 |
| CA | 2733552 A1 | 2/2009 |
| CA | 2707083 A1 | 7/2009 |
| CA | 2756724 A1 | 10/2010 |
| CA | 2757214 A1 | 10/2010 |
| CA | 2772425 A1 | 4/2011 |
| CA | 2802119 A1 | 12/2011 |
| CA | 2847272 A1 | 3/2013 |
| CN | 101218084 A | 7/2008 |
| CN | 101336157 A | 12/2008 |
| CN | 201304706 Y | 9/2009 |
| CN | 102470614 A | 5/2012 |
| DE | 2122581 A1 | 11/1972 |
| DE | 3614533 A1 | 11/1987 |
| DE | 10052693 A1 | 5/2001 |
| DE | 10107269 A1 | 8/2002 |
| DE | 102004054228 A1 | 6/2006 |
| DE | 102006000657 A1 | 7/2007 |
| DE | 102009055983 | 6/2011 |
| DE | 102010063751 A1 | 6/2012 |
| DE | 102011014244 A1 | 9/2012 |
| DE | 102006000657 B4 | 9/2014 |
| DE | 102004006487 B4 | 3/2015 |
| DE | 102013224934 A1 | 6/2015 |
| DE | 102015109597 A1 | 1/2017 |
| EP | 0730947 B1 | 8/2001 |
| EP | 1685009 A1 | 8/2006 |
| EP | 1897669 A1 | 3/2008 |
| EP | 1986835 B1 | 1/2011 |
| FR | 2445208 | 7/1980 |
| FR | 2445208 | 7/1980 |
| JP | H05185466 A | 7/1993 |
| JP | H06143312 A | 5/1994 |
| JP | H07195372 A | 8/1995 |
| JP | H08142059 A | 6/1996 |
| JP | 3051288 B2 | 6/2000 |
| JP | 2001517169 A | 10/2001 |
| JP | 2004314501 A | 11/2004 |
| JP | 2005319637 A | 11/2005 |
| JP | 2008012838 A | 1/2008 |
| JP | 2008254438 A | 10/2008 |
| JP | 2010047207 A | 3/2010 |
| WO | 9902321 A1 | 1/1999 |
| WO | 1999046106 A1 | 9/1999 |
| WO | 2005049391 A1 | 6/2005 |
| WO | 2005087601 A1 | 9/2005 |
| WO | 2007135033 A1 | 11/2007 |
| WO | 2009023038 A2 | 2/2009 |
| WO | 2009045202 A1 | 4/2009 |
| WO | 2009088904 A2 | 7/2009 |
| WO | 2009023038 A3 | 9/2009 |
| WO | 2012085070 A1 | 6/2012 |
| WO | 2013033024 A2 | 3/2013 |
| WO | 2016077773 A1 | 5/2016 |
| WO | 2017097673 A1 | 6/2017 |

OTHER PUBLICATIONS

Extended European Search Report for European Application No. 17158656.3 dated Apr. 25, 2017.
Application papers as filed for European Application No. 17158656.3 dated Jan. 19, 2018.
Examination Decision of the Patent Reexamination Board from the State Intellectual Property Office of the People's Republic of China for Chinese Application No. 201280026371.6 dated Nov. 2, 2017.
File history of European Patent Application Publication No. EP 3192636 A1 (European Patent Application No. 17158656.3) (All documents available at register.epo.org/application?number=EP17158656 when accessed on Jan. 23, 2018) (131 total pages).
English translation of European Patent No. EP 1986835 B1 (Description translated from German available at www.google.com/patents/EP1986835B1?cl=en when accessed on Jan. 23, 2018) (5 pages).
Examination Decision of the Patent Reexamination Board from the State Intellectual Property Office of the People's Republic of China for CN Patent Application No. 201280026371.6 dated Nov. 2, 2017 (not translated) (12 pages).
English language translation of the First Office Action from the Mexican Institute of Industrial Property for Mexican Patent Application No. MX/a/2014/002300.
English language summary of the Notice of Reasons for Rejection for Japanese Patent Application No. 2015-185147 dated Nov. 1, 2016.
English language translation of the First Office Action for Chinese Patent Application No. 2012800263716.
International Search Report for International Application No. PCT/US2012/052534 dated Feb. 19, 2013.
Written Opinion of the International Searching Authority for International Application No. PCT/US2012/052534 dated Feb. 19, 2013.
International Search Report for International Application No. PCT/US2015/060710 dated Jan. 29, 2016.
Written Opinion of the International Searching Authority for International Application No. PCT/US2015/060710 dated Jan. 29, 2016.
International Preliminary Report on Patentability for International Application No. PCT/US2012/052534 dated Mar. 13, 2014.
International Search Report and Written Opinion for International Application No. PCT/US2012/052534 dated Feb. 19, 2013.
PCT Invitation to Pay Additional Fees and Communication Relating to the Results of the Partial International Search for International Application No. PCT/US2012/052534 dated Nov. 9, 2012.
Materials from website/Internet: "Kante inbegriffen—One-Shot Hybridtechnik" http://www.frimo.com/de/news/frimounsere-news/anzeigen/kante-inbegrifen-one-shot-hybridtechnik.html (Date accessed Oct. 21, 2016).
Materials from website/Internet: "ZF erhalt Composite Innovations Award 2011 für ein Leichtbau-Bremspedal" http://www.lightweight-design.de/index.php;do=show/site=lwd/sid=1630548824562f52b361d6a485111468/alloc=135/ id=13987 (Date accessed Oct. 21, 2016).
Materials from website/Internet: "Presseinformationen FiberForm—Umformen und Hinterspritzen von Organoblechen" (Date accessed Oct. 21, 2016) http://www.kraussmaffei.com/de/presseinformationen/d/FiberForm.html.
Materials from website/Internet: "Institut fur Verbundwerkstoffe GmbH Kaiserslautern" http://www.ivw.uni-kl.de/ forschung-entwicklung/projekte/abgeschlossene-projekte-auswahl/spriform/?_sm_au_=iVVMTSsQV1J2D23N (Date accessed Oct. 21, 2016).
Materials from website/Internet: "Hybrid Molding" http://bond-laminates.com/en/technology/processing-options/hybrid-molding/ (Date accessed Oct. 21, 2016).
Materials from website/Internet: Leichtbauteile spritzgieben http://www.arburg.com/fileadmin/redaktion/mediathek/prospekte/arburg_leichtbau_681228_de/# (Date accessed Oct. 21, 2016).
Materials from website/Internet: "K 2013: Engel and a plastic brake pedal" https://www.youtube.com/watch?v=30CJrOrSrt4 (Date accessed Oct. 21, 2016).
Materials from website/Internet: "Frimo: One-Shot Hybridtechnik—Kante inbegriffen" http://www.k-aktuell.de/frimo-oneshot-hybridtechnik-kante-inbegriffen-18956/ (Date accessed Oct. 21, 2016).
Materials from website/Internet: http://news.directindustry.de/press/frimo-group-gmbh/clever-kombiniert-verformenhinterspritzen-einem-schritt-36161-404953.html (access unavailable Jan. 11, 2016).
Chinese Office Action dated Apr. 14, 2015.

(56) References Cited

OTHER PUBLICATIONS

Office Action from the Canadian Intellectual Property Office dated Mar. 26, 2015.
Japanese Office Action dated Mar. 24, 2015.
First Office Action from the Korean Intellectual Property Office for KR Patent Application No. 10-2013-7032219 dated May 31, 2018 (English translation) (11 pages).
First Search from the State Intellectual Property Office of the People's Republic of China for CN Patent Application No. 201710629029.X dated Oct. 17, 2018 (not translated) (2 pages).
First Office Action from the State Intellectual Property Office of the People's Republic of China for CN Patent Application No. 201710629029.X dated Oct. 25, 2018 (not translated) (4 pages).
First Office Action from the State Intellectual Property Office of the People's Republic of China for CN Patent Application No. 201710629029.X dated Oct. 25, 2018 (English translation) (6 pages).

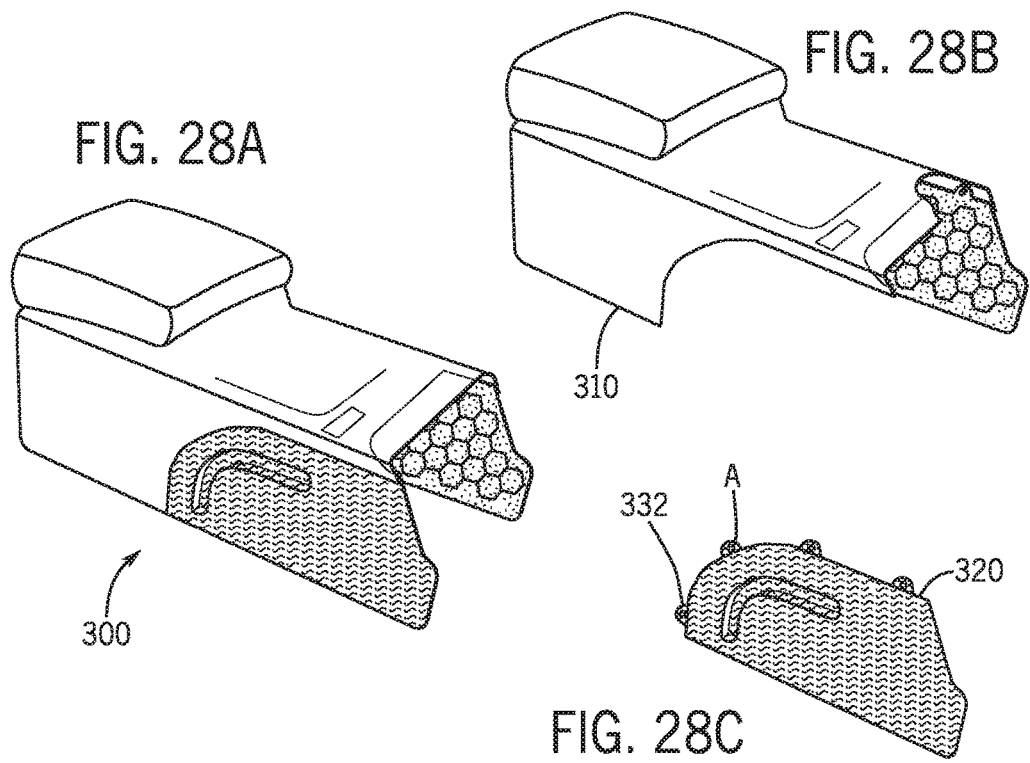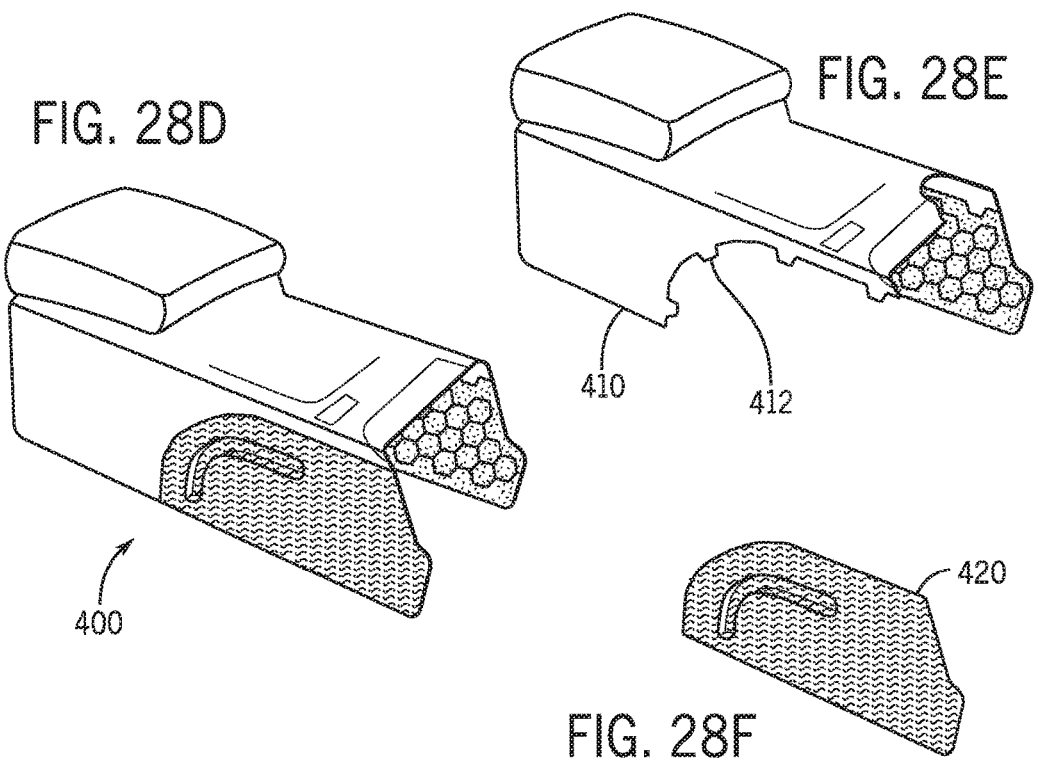

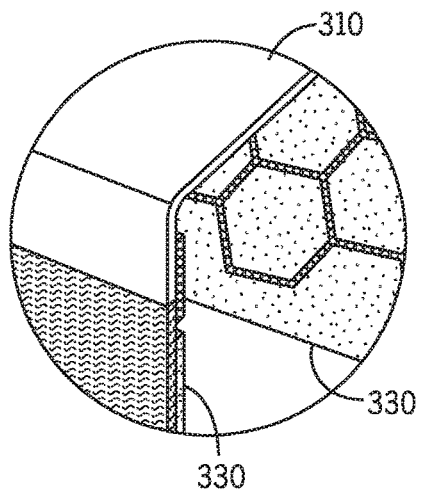
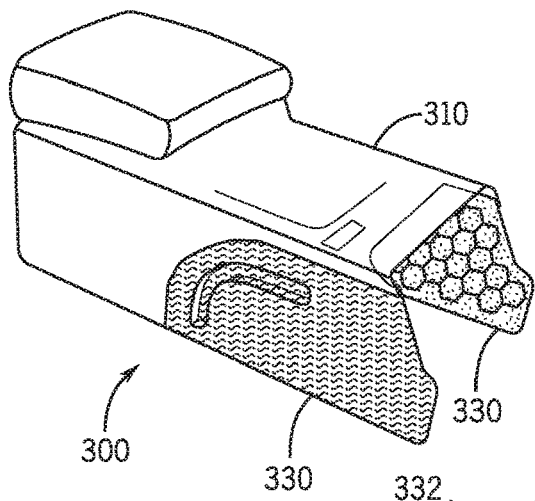
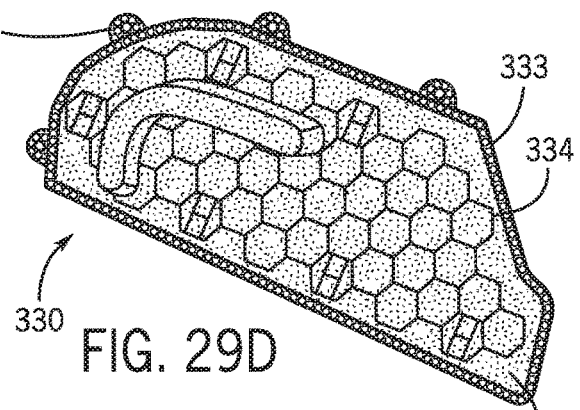
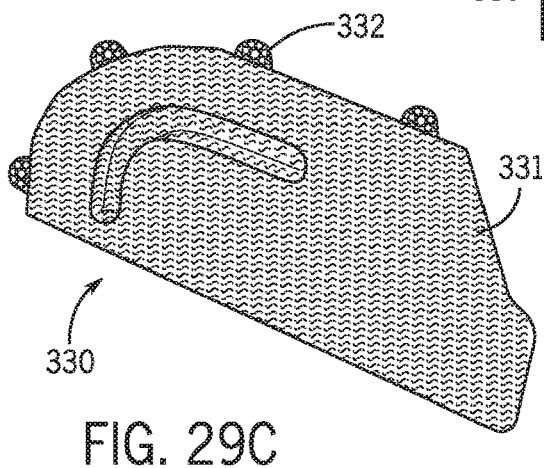
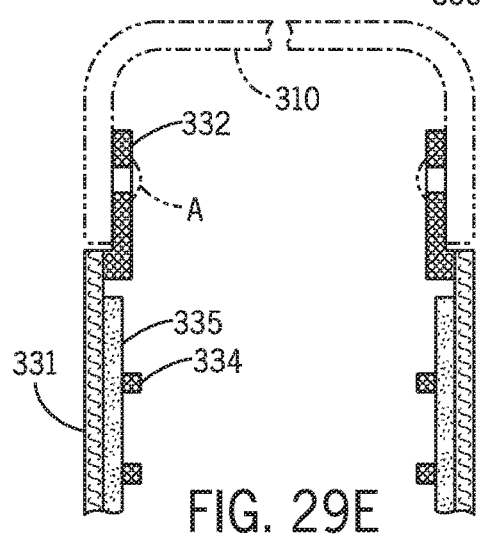

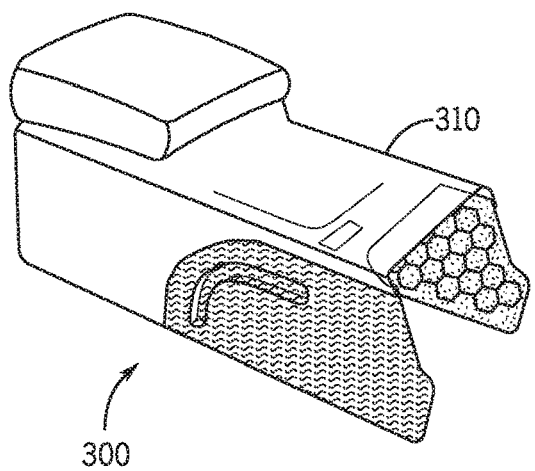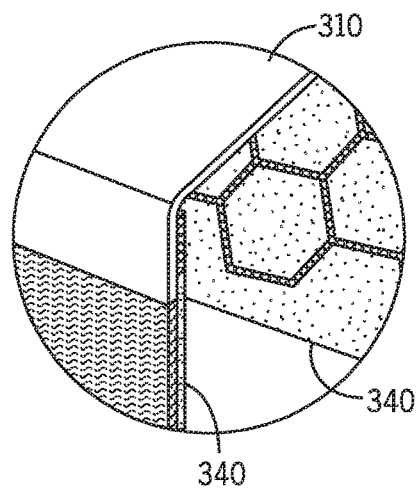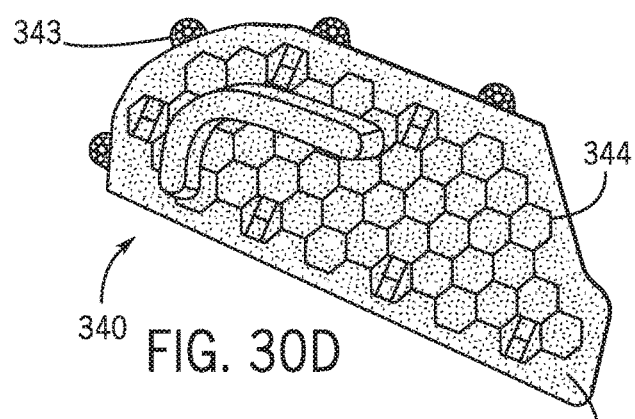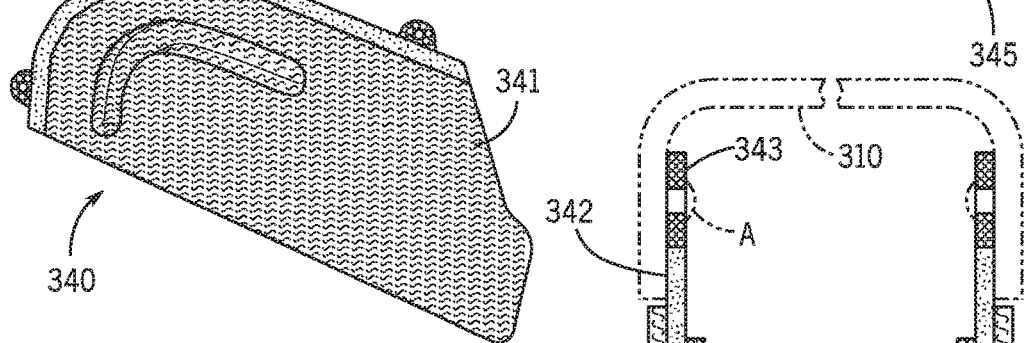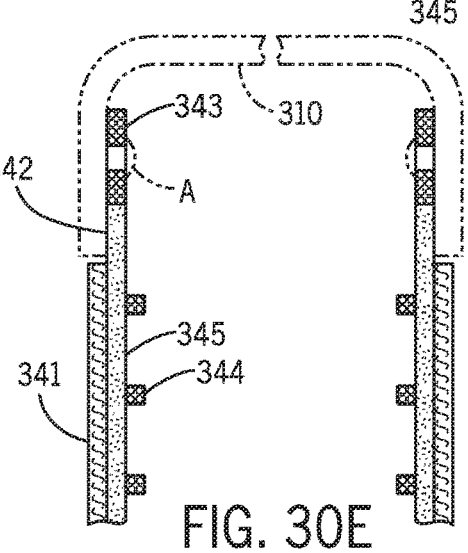

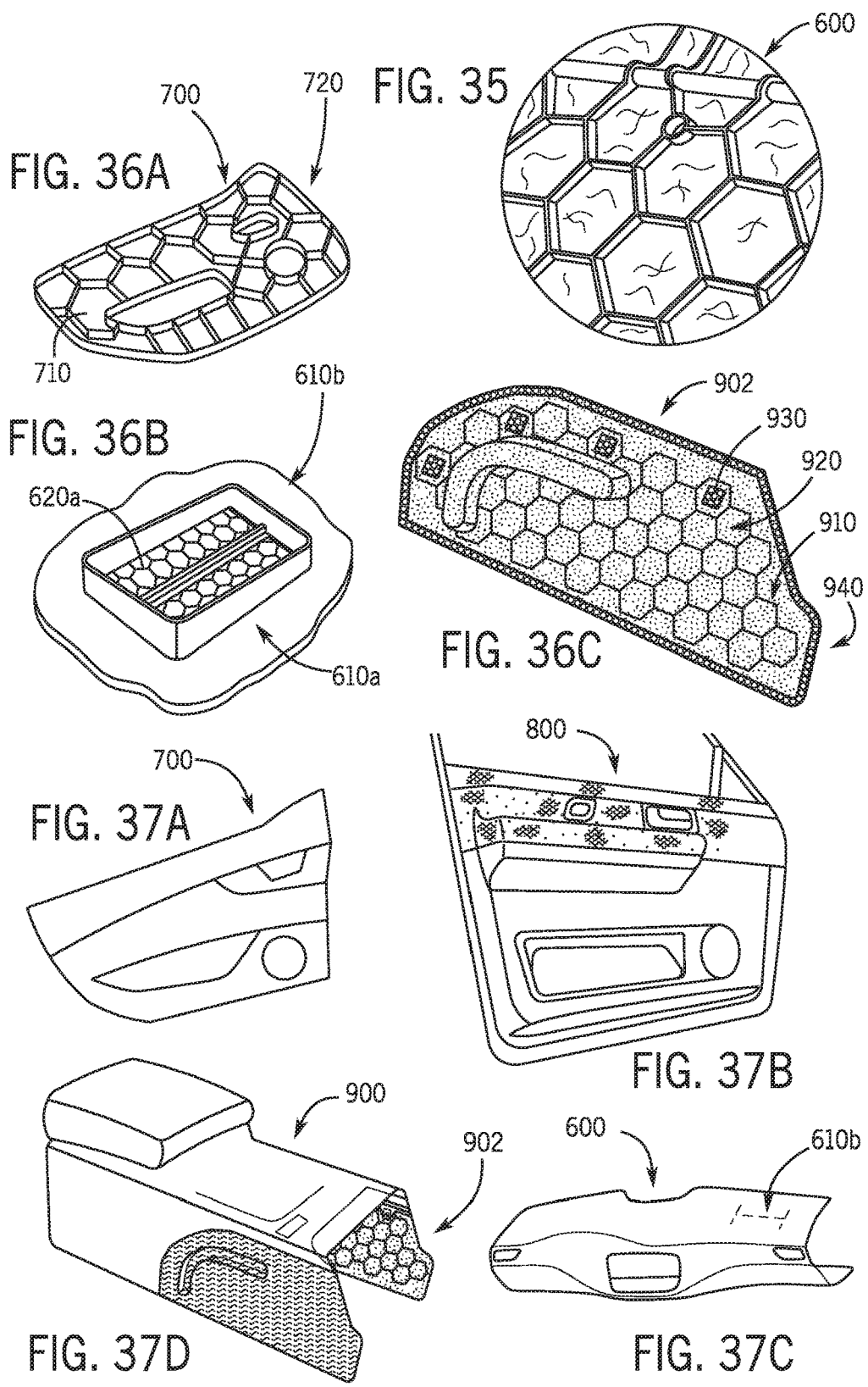

TRIM COMPONENT FOR VEHICLE INTERIOR

CROSS-REFERENCE TO RELATED PATENT APPLICATIONS

The present application is a continuation-in-part of U.S. patent application Ser. No. 14/808,938 entitled "VEHICLE TRIM COMPONENT", filed Jul. 24, 2015. The present application is also a continuation-in-part of International Patent Application No. PCT/US2015/060710 entitled "SYSTEM AND METHOD FOR MANUFACTURING A VEHICLE TRIM COMPONENT HAVING A COVERSTOCK VIA CONCURRENT COMPRESSION FORMING AND INJECTION MOLDING", filed Nov. 13, 2015.

The present application claims priority from and the benefit of and incorporates by reference in entirety of the following applications: (a) U.S. Provisional Application No. 61/528,832, entitled "SYSTEM AND METHOD FOR MANUFACTURING A VEHICLE TRIM COMPONENT VIA CONCURRENT COMPRESSION FORMING AND INJECTION MOLDING", filed Aug. 30, 2011; (b) U.S. patent application Ser. No. 13/595,741, entitled "SYSTEM AND METHOD FOR MANUFACTURING A VEHICLE TRIM COMPONENT VIA CONCURRENT COMPRESSION FORMING AND INJECTION MOLDING", filed Aug. 27, 2012 now U.S. Pat. No. 8,939,745 issued on Jan. 27, 2015; (c) U.S. patent application Ser. No. 13/846,529, entitled "SYSTEM AND METHOD FOR MANUFACTURING A VEHICLE TRIM COMPONENT VIA CONCURRENT COMPRESSION FORMING AND INJECTION MOLDING", filed Mar. 18, 2013 now U.S. Pat. No. 9,149,961 issued on Oct. 6, 2015; (d) U.S. patent application Ser. No. 14/808,938 entitled "VEHICLE TRIM COMPONENT", filed. Jul. 24, 2015; (e) U.S. Provisional Patent Application No. 62/079,932 entitled "SYSTEM AND METHOD FOR MANUFACTURING A VEHICLE TRIM COMPONENT VIA CONCURRENT COMPRESSION FORMING AND INJECTION MOLDING" filed on Nov. 14, 2014; (f) International Patent Application No. PCT/US2015/060710 entitled "SYSTEM AND METHOD FOR MANUFACTURING A VEHICLE TRIM COMPONENT HAVING A COVERSTOCK VIA CONCURRENT COMPRESSION FORMING AND INJECTION MOLDING", filed Nov. 13, 2015.

The present application is related to and incorporates by reference the entirety of the following applications: (a) U.S. Provisional Application No. 61/528,832, entitled "SYSTEM AND METHOD FOR MANUFACTURING A VEHICLE TRIM COMPONENT VIA CONCURRENT COMPRES- SION FORMING AND INJECTION MOLDING", filed Aug. 30, 2011; (b) International Patent Application No. PCT/US2012/052534 entitled "SYSTEM AND METHOD FOR MANUFACTURING A VEHICLE TRIM COMPONENT VIA CONCURRENT COMPRESSION FORMING AND INJECTION MOLDING", filed Aug. 27, 2012; (c) U.S. patent application Ser. No. 13/595,741, entitled "SYSTEM AND METHOD FOR MANUFACTURING A VEHICLE TRIM COMPONENT VIA CONCURRENT COMPRESSION FORMING AND INJECTION MOLDING", filed Aug. 27, 2012 now U.S. Pat. No. 8,939,745 issued on Jan. 27, 2015; (d) U.S. patent application Ser. No. 13/846,529, entitled "SYSTEM AND METHOD FOR MANUFACTURING A VEHICLE TRIM COMPONENT VIA CONCURRENT COMPRESSION FORMING AND INJECTION MOLDING", filed Mar. 18, 2013 now U.S. Pat. No. 9,149,961 issued on Oct. 6, 2015; (e) U.S. patent application Ser. No. 14/808,938 entitled "VEHICLE TRIM COMPONENT", filed Jul. 24, 2015; (f) U.S. Provisional Patent Application No. 62/079,932 entitled "SYSTEM AND METHOD FOR MANUFACTURING A VEHICLE TRIM COMPONENT VIA CONCURRENT COMPRESSION FORMING AND INJECTION MOLDING" filed on Nov. 14, 2014; (g) International Patent Application No. PCT/US2015/060710 entitled "SYSTEM AND METHOD FOR MANUFACTURING A VEHICLE TRIM COMPONENT HAVING A COVERSTOCK VIA CONCURRENT COMPRESSION FORMING AND INJECTION MOLDING", filed Nov. 13, 2015.

FIELD

The present invention relates to a trim component for a vehicle interior.

BACKGROUND

It is known in motor vehicles to provide a vehicle trim component. It is also known to produce a trim component by compression forming a fiber panel into a desired shape. It is further known to produce a trim component with a plastic material such as a thermoplastic resin (e.g. polypropylene (PP), acrylonitrile butadiene styrene (ABS), polycarbonate (PC), etc.).

It would be advantageous to provide an improved trim panel or component formed by compression forming of a fiber material and injection molding of a plastic material.

SUMMARY

The present invention relates to a trim component for a vehicle interior comprising a fiber panel, a structure and a cover coupled to at least one of (a) the fiber panel, (b) the structure. The fiber panel may comprise a plurality of fibers and a resin configured to bind the fibers; the structure may comprise a molded resin. The structure may provide a border formed about at least a portion of a periphery of the fiber panel. The periphery of the fiber panel may comprise an edge. The border of the structure may be formed on the edge of the fiber panel. The structure may be configured to accommodate at least one variation in at least one edge of the fiber panel. The fiber panel may comprise an outer surface. The cover may be coupled to the outer surface of the fiber panel and the structure. The structure may comprise an outer surface. The cover may be coupled to the outer surface of the fiber panel and the outer surface of the structure. The fiber panel may comprise a compression formed component with the periphery. The border of the structure may be formed from a resin. The trim component may comprise a rib configured to extend across an interface between the fiber panel and the structure to enhance the strength of the interface. The fiber panel may comprise a gap. The structure may comprise a resin configured to reinforce the fiber panel in the gap of the fiber panel. The fiber panel and the structure may be configured to provide a substantially continuous structure. The structure may be configured to provide a weakened zone at the gap of the fiber panel configured to facilitate separation of the structure from the fiber panel for deployment of an airbag. The gap in the fiber panel may comprise a tear in the fiber panel and the structure may be configured to fill the gap to form a substantially continuous surface. The fiber panel may comprise a first curvature. The structure may comprise a second curvature different than the first curvature of the fiber panel. The fiber panel may comprise a compression formed component. The structure comprising the resin may be formed into the gap of the fiber panel and may extend along at least a portion of an outer surface of the fiber panel and along at least a portion of an inner surface of the fiber panel to form the structure to the fiber panel. The structure may comprise at least one of (a) an ancillary component, (b) a rib, or (c) a connector configured to facilitate coupling the trim component with at least one of (a) a door frame, (b) an instrument panel, or (c) a support structure within the vehicle interior. The structure may comprise a rib configured to (a) support the fiber panel or (b) reinforce the fiber panel.

The present invention also relates to a trim component for a vehicle interior comprising a fiber panel, a structure comprising a resin and a cover coupled to the fiber panel. The structure may be coupled to at least one of (a) the cover, (b) the fiber panel. The structure may comprise a border coupled to at leak a portion of a periphery of the fiber panel. The fiber panel may comprise a gap. The structure may be configured to reinforce the fiber panel in the gap of the fiber panel.

The present invention also relates to a trim component for a vehicle interior comprising a fiber panel comprising a compression formed component, a structure formed from a molded resin and a cover coupled to the fiber panel. The structure may be coupled to at least one of (a) the cover, (b) the fiber panel. The structure may comprise at least one molded feature. The molded feature may comprise a border coupled to at least a portion of a periphery of the fiber panel.

FIGURES

FIG. 28A is a schematic perspective view of a floor console according to an exemplary embodiment.

FIG. 28B is a schematic perspective view of the base of the floor console according to an exemplary embodiment.

FIG. 28C is a schematic perspective view of a trim component for the floor console according to an exemplary embodiment.

FIG. 28D is a schematic perspective view of a floor console according to an exemplary embodiment.

FIG. 28E is a schematic perspective view of the base of the floor console according to an exemplary embodiment.

FIG. 28F is a schematic perspective view of a trim component for the floor console according to an exemplary embodiment.

FIG. 29A is a schematic perspective view of a floor console according to an exemplary embodiment.

FIG. 29B is a schematic perspective detail view of the floor console according to an exemplary embodiment.

FIG. 29C is a schematic perspective view of a trim component for the floor console according to an exemplary embodiment.

FIG. 29D is a schematic perspective view of the trim component for the floor console according to an exemplary embodiment.

FIG. 29E is a schematic cross-section front view of the floor console according to an exemplary embodiment.

FIG. 30A is a schematic perspective view of a floor console according to an exemplary embodiment.

FIG. 30B is a schematic perspective detail view of the floor console according to an exemplary embodiment.

FIG. 30C is a schematic perspective view of a trim component for the floor console according to an exemplary embodiment.

FIG. 30D is a schematic perspective view of a trim component for the floor console according to an exemplary embodiment.

FIG. 30E is a schematic cross-section front view of the floor console according to an exemplary embodiment.

FIG. 35 is a schematic perspective detail view of the back side of a trim panel according to an exemplary embodiment.

FIGS. 36A to 36C are schematic perspective views of the back side of trim panels showing features according to an exemplary embodiment.

FIGS. 37A to 37D are schematic perspective views of trim components according to an exemplary embodiment.

DESCRIPTION

Figure 1A:
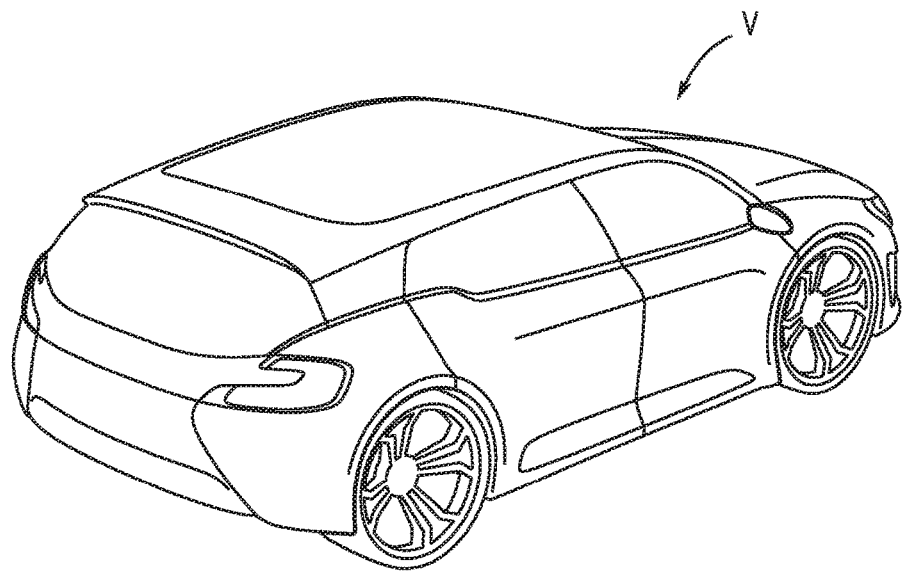
FIG. 1A is a schematic perspective view of a vehicle according to an exemplary embodiment.
Figure 1B:
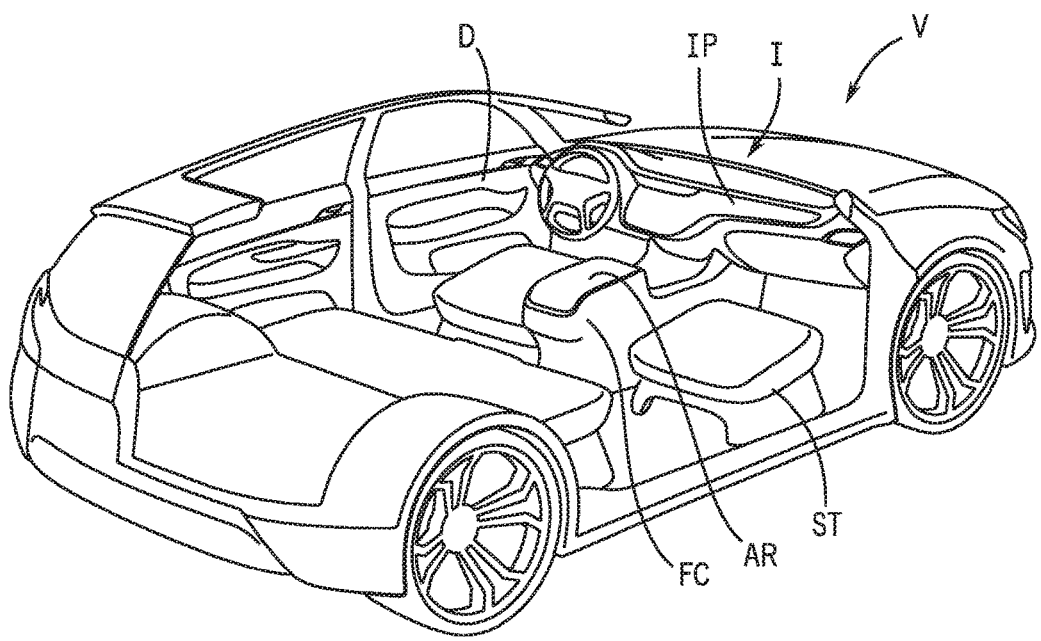
FIG. 1B is a schematic perspective cut-away view of the vehicle showing an interior of the vehicle according to an exemplary embodiment.

Referring to FIGS. 1A and 1B, a vehicle V is shown schematically with an interior I providing vehicle interior trim components such as an instrument panel IP and floor console FC; vehicle V provides doors D and seats ST. As shown schematically according to an exemplary embodiment, interior components of vehicle V such as instrument panel IP and floor console FC may include trim panels or components. See FIG. 1B. As shown schematically in FIGS. 1A, 1B and 2 according to an exemplary embodiment, trim panel and components for vehicle interior I may include a center console CC, headliner HL, visor/sun visor SV, overhead console OH, armrest AR (e.g. for floor console or door), etc.

As indicated schematically and representationally in the FIGURES, trim components and panels for vehicle interior may be formed by a "hybrid" process comprising compression forming (e.g. of fiber material) and injection molding (e.g. of plastic material). As indicated schematically and representationally according to an exemplary embodiment, "hybrid" components (e.g. trim components, trim panel, etc.) may be formed of a fiber material and plastic material using a variety of systems and methods (e.g. apparatus and process steps) to produce a variety of types of components providing a variety of shapes/forms and features. See e.g. FIGS. 8, 9, 10, 23, 28C, 28F, 29C, 29D, 30C, 30D, 31C, 31D, 32C, 32D, 34A-34G, 35, 36A-36C and 38A-38E.

As shown schematically and representationally in the FIGURES according to an exemplary embodiment, apparatus (see e.g. FIGS. 3, 4, 12-18, 21, 22, 25-27, 33A-33F, 40A, 40B, 41A-41C) and processes (see e.g. FIGS. 3, 11-18, 20-22, 24-27, 33A-33F, 39A-39C, 40A-40B and 41A-41C) may produce "hybrid" components having forms and features for use in a vehicle interior (see e.g. FIGS. 5, 8-10, 18, 19, 23, 28A-28F, 29A-29E, 30A-30E, 31A-31E, 32A-32E, 33F, 34A-34G, 35, 36A-36C, 37A-37D, 38A-38E, 40D, 41C, 42A-42C).

According to an exemplary embodiment of the process (as indicated schematically in FIGS. 41A-41C) a fiber sheet or mat is provided. According to an exemplary embodiment, the fiber mat may comprise a combination of structural fibers and thermoplastic resin; the structural fibers may include natural fibers and/or synthetic fibers; thermoplastic resin may include polypropylene (PP), acrylonitrile butadiene styrene (ABS) and/or polycarbonate (PC) binders. According to an exemplary embodiment, the fiber mat is trimmed; the trimmed fiber mat is compressed in a first mold. According to an exemplary embodiment, the trimmed and compressed fiber mat is further compressed in a second mold; plastic resin is injected into the second mold in the subsequent step to form a trim component for vehicle interior.

According to an exemplary embodiment, a fiber sheet or mat may be trimmed to form a shape such as a trimmed fiber mat. According to an exemplary embodiment, the trimmed fiber mat may be generally corresponding to a shape of a vehicle interior trim component (e.g. a door panel, an instrument panel, etc.). See FIGS. 39A and 39B. According to an exemplary embodiment, the trimmed fiber mat may be partially compressed in the first mold to form a compressed fiber mat. See FIG. 39C.

According to an exemplary embodiment, the compressed fiber mat may be placed into the second mold between a first mold part such as a mold top and a second mold part such as a mold bottom. See FIG. 3. According to an exemplary embodiment, the compressed fiber mat may be further compressed within the second mold to form a fiber panel. See FIGS. 4, 33A to 33C. According to an exemplary embodiment, a cover may be provided to the compressed fiber mat within the second mold. See FIGS. 33A to 33C.

According to an exemplary embodiment, at least one of the first mold part and the second mold part from the second mold may provide at least one channel to fill at least one void with plastic resin (e.g. molten plastic, molten thermoplastic, etc.) to form a trim component for a vehicle interior. See FIGS. 4, 18, 23, 33D and 41B.

According to an exemplary embodiment, plastic resin may be injected into the second mold to fill at least one void (e.g. a hole used to secure the compressed fiber mat in the second mold, or a rupture formed during the compression forming process, etc.). See FIGS. 15 to 19. According to an exemplary embodiment, plastic resin may be injected into the second mold to form at least one feature (e.g. ribs, ridges, airbag cover, periphery for the trim component, attachment to the vehicle, attachment for vehicle interior components such as door locks, speakers, air vents, navigation screen, etc). See FIGS. 4, 5, 8, 9, 10, 23 and 33D.

Referring to FIGS. 1A and 1B, a vehicle V is shown including an interior I with an instrument panel IP and a floor console FC; floor console FC provides an armrest AR; vehicle V provides doors D and seats ST. Interior components of vehicle V such as instrument panel IP, floor console FC, armrest AR, doors D, and seats ST may include trim panels formed by a hybrid process of compression forming and injection molding. As shown schematically in FIG. 2 according to an exemplary embodiment, trim panels may be provided in interior I of the vehicle for a center console CC, a headliner HL, sun visor SV, and an overhead console OH.

Figure 12:
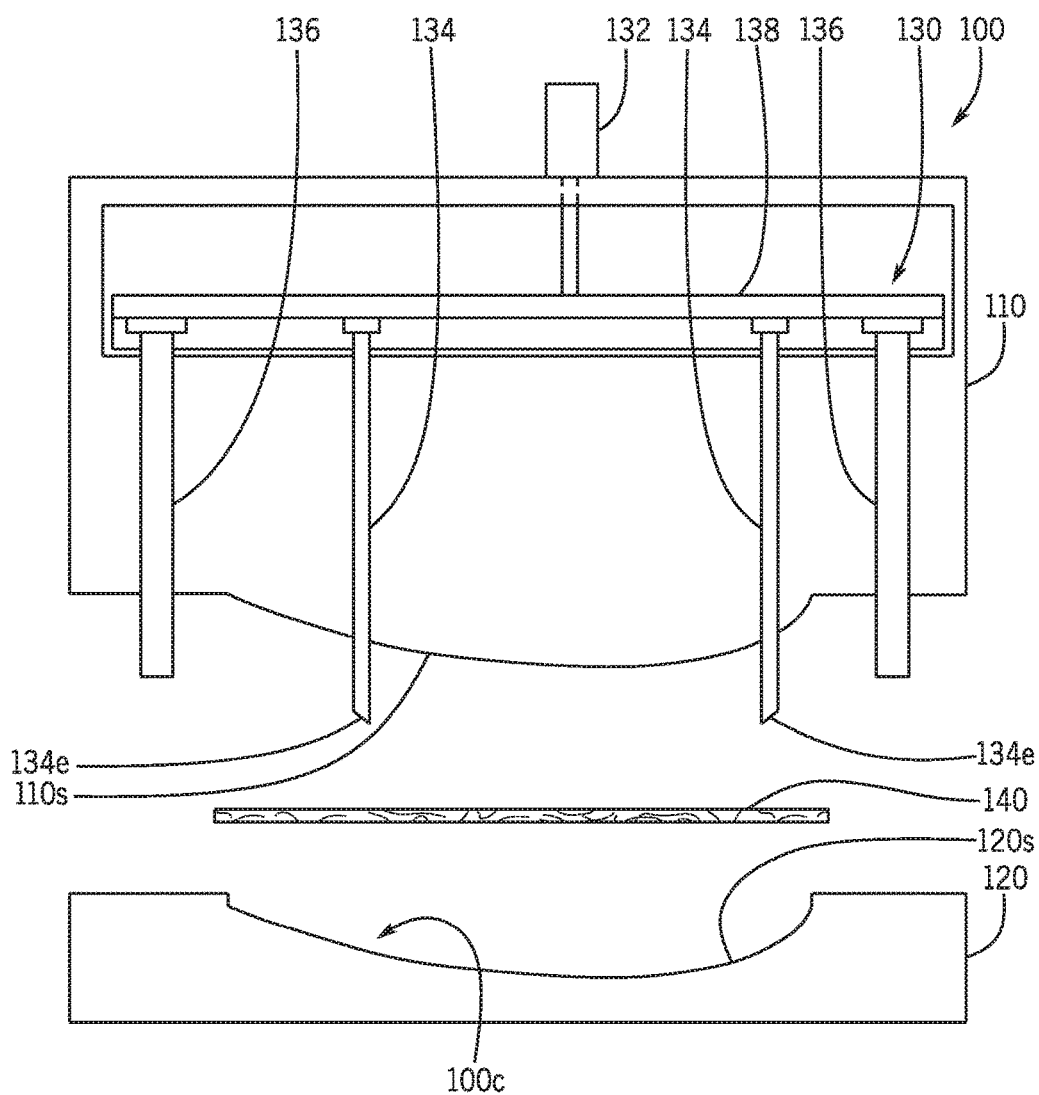
FIG. 12 is a schematic cross-section view of a mold apparatus having retractable pins to secure the fiber panel according to an exemplary embodiment.

As shown schematically in FIG. 12, a fiber panel is placed between a first mold element 110 and a second mold element 120. See also FIG. 15. First mold element 110 comprises pins 134 and pins 136. As shown schematically in FIG. 13, pin 134 may provide a sharp end 134e to pierce through a trim panel 140 to hold trim panel 140 in place. See also FIG. 16. As shown schematically in FIG. 12, first mold element 110 is placed on top of second mold element 120. According to an exemplary embodiment, first mold element 110 and second mold element 120 may be placed next to one another horizontally; pin 134 may provide a smooth end (e.g. not sharp); the fiber panel may provide holes for pins 134 to fit through.

Figure 14:
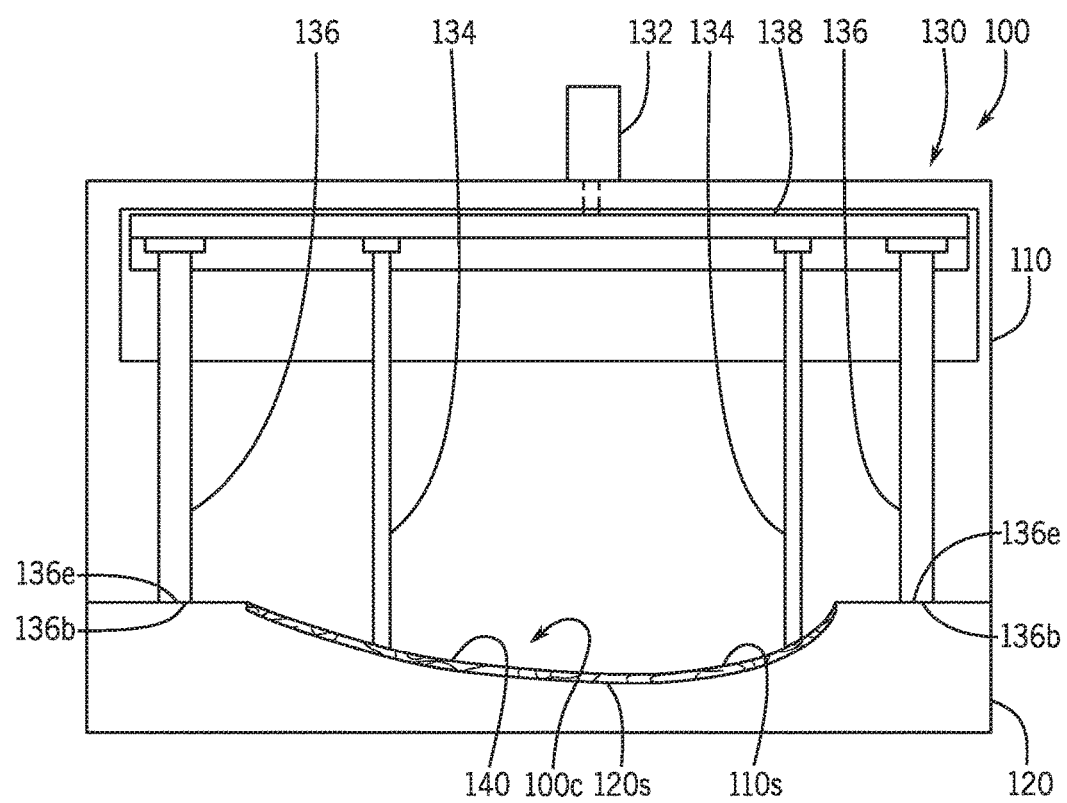
FIG. 14 is a schematic cross-section view of the mold apparatus in the closed position with the fiber panel being compressed according to an exemplary embodiment.

As shown schematically in FIG. 14, first mold element 110 and second mold element 120 are in the closed position; pins 134 and pins 136 are in the retracted position. As shown schematically in FIG. 14, pins 134 and pins 136 are connected to plate 138; as first mold element 110 and second mold element 120 move towards each other, a flat end 136e on pin 136 engages with a surface 136b on second mold element 120; contact between flat end 136e on pin 136 and flat surface 148 on second mold element 120 drives pins 134 towards the retracted position; fiber panel 140 is compressed between first mold element 110 and second mold element 120. See also FIG. 17.

Figure 16:
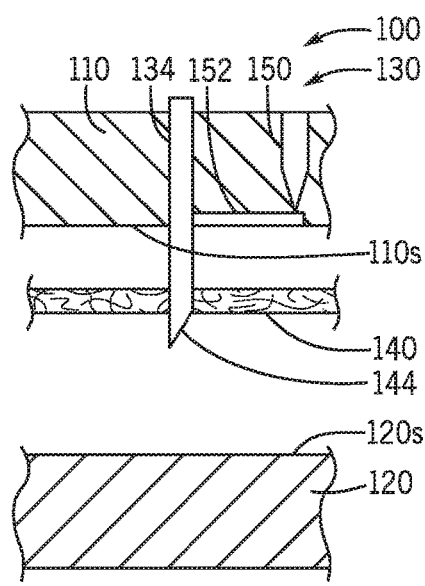
FIG. 16 is a schematic cross-section detail view of the fiber panel secured on the retractable pins according to an exemplary embodiment.
Figure 17:
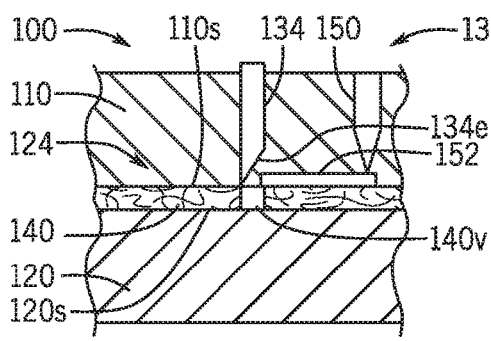
FIG. 17 is a schematic cross-section detail view of the mold apparatus in the closed position with the fiber panel being compressed according to an exemplary embodiment.

As shown schematically in FIG. 17, pin 134 is at the retracted position, leaving a hole 140v in fiber panel 140. As shown schematically in FIGS. 15 to 18, first mold element 110 provides a fluid pathway comprised of fluid pathway 150 and fluid pathway 152. As shown schematically in FIG. 18, resin is used to fill hole 140v and fluid pathway 152; after resin is cooled and hardened, feature 162 and feature 164 are formed onto fiber panel 140. According to an exemplary embodiment, feature 164 may be a rib on the back side of fiber panel 140 to provide additional strength and rigidity for fiber panel 140.

Figure 21:
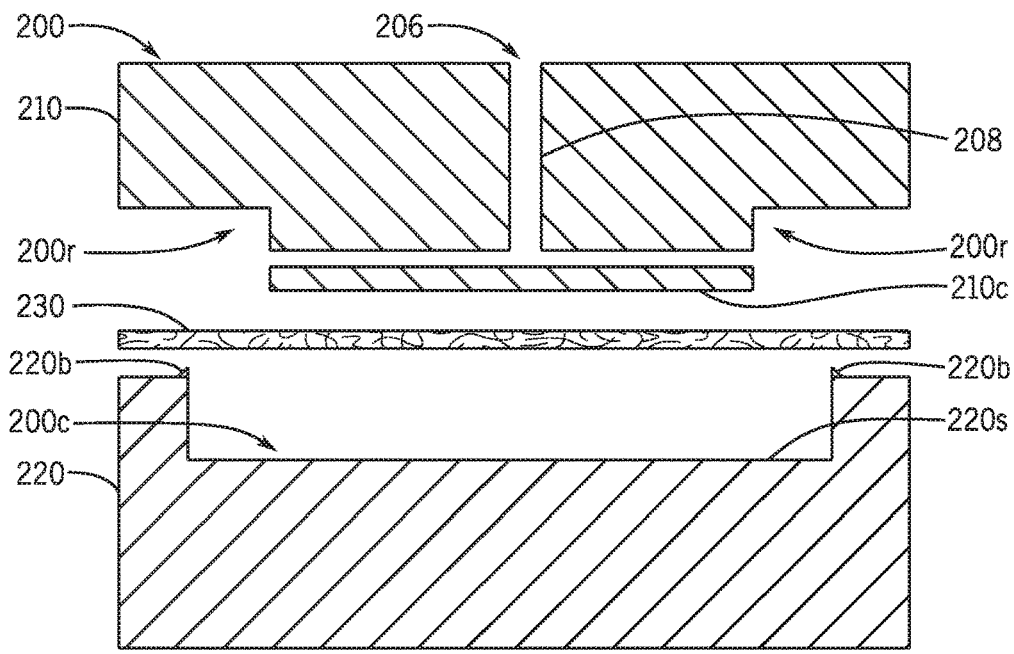
FIG. 21 is a schematic cross-section view of a mold apparatus having a fluid pathway for injecting resin and blades for trimming the fiber panel according to an exemplary embodiment.
Figure 22:
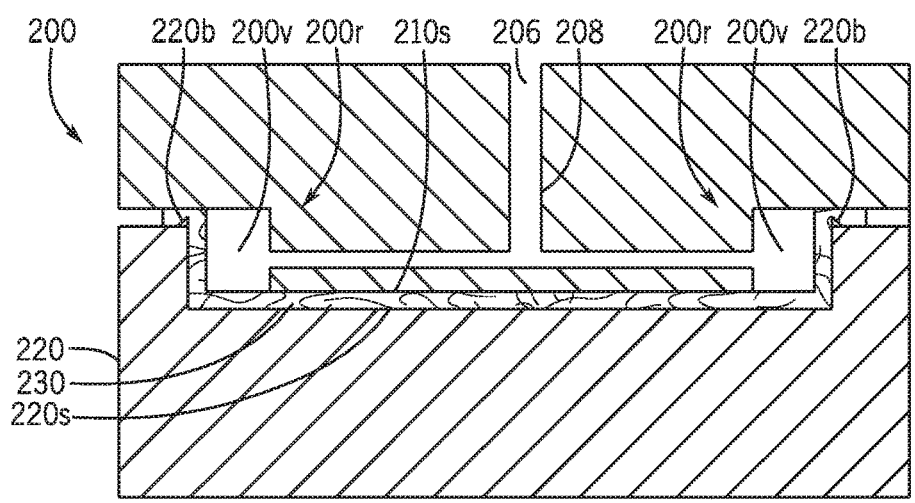
FIG. 22 is a schematic cross-section view of the mold apparatus in the closed position according to an exemplary embodiment.

As shown schematically in FIGS. 21 and 22, a first mold element 220 provides blades 220b to trim fiber panel 230 into a desired shape and size as first mold element 220 and second mold element 210 move toward the closed position. As shown schematically in FIG. 22, a void 200v around the periphery of fiber panel 230 may be filled with resin to increase strength and rigidity of fiber panel 230. As shown schematically in FIG. 23, a vehicle trim component 240 is formed; vehicle trim component 240 comprises fiber panel 230 and resin feature 240r around the periphery of fiber panel 230 to increase strength and rigidity of vehicle trim component 240. According to an exemplary embodiment, a blade may be provided on the second mold element to trim the excess material of a fiber panel.

Figure 25:
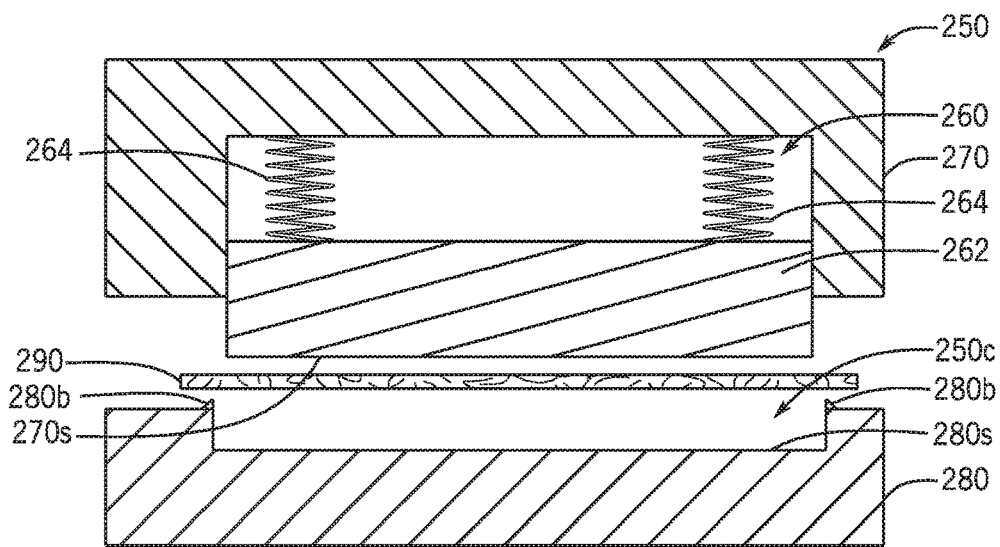
FIG. 25 is a schematic cross-section view of a mold apparatus having a retractable first mold element according to an exemplary embodiment.
Figure 26:
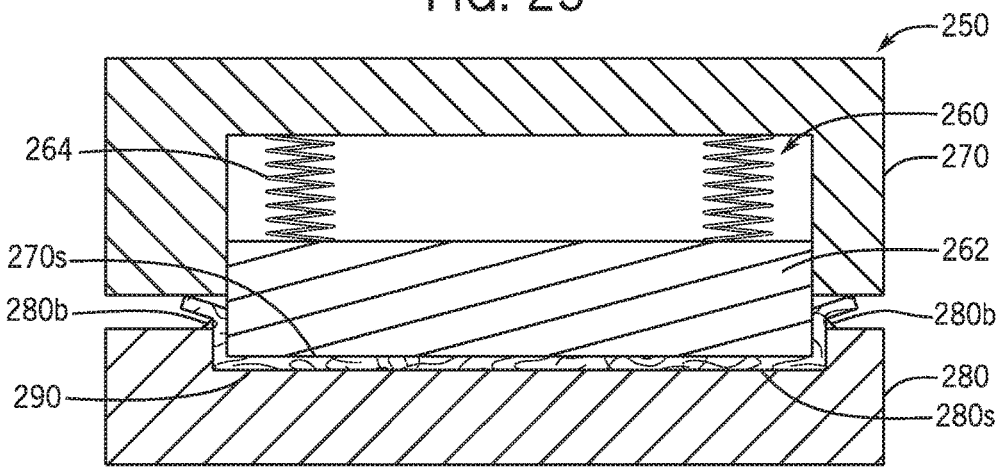
FIG. 26 is a schematic cross-section view of the mold apparatus having a retractable first mold element partially closed according to an exemplary embodiment.
Figure 27:
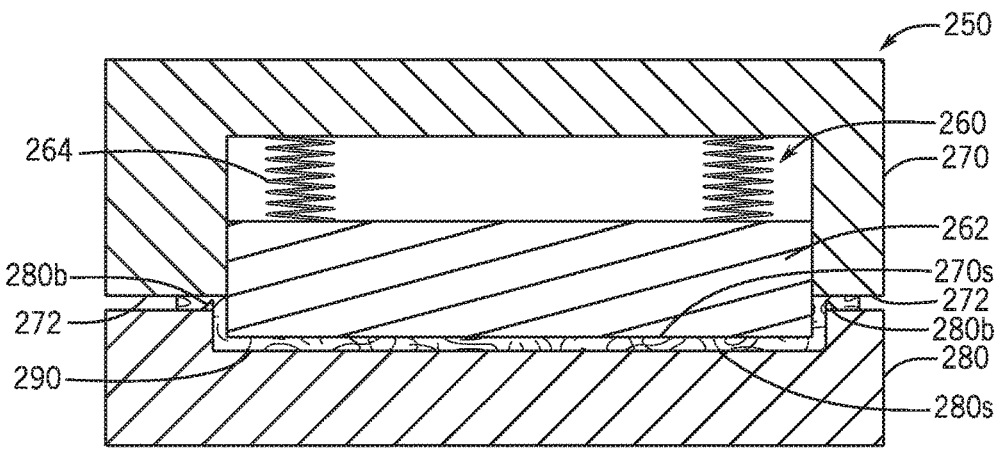
FIG. 27 is a schematic cross-section view of the mold apparatus having a retractable first mold element in the closed position according to an exemplary embodiment.
Figure 31A:
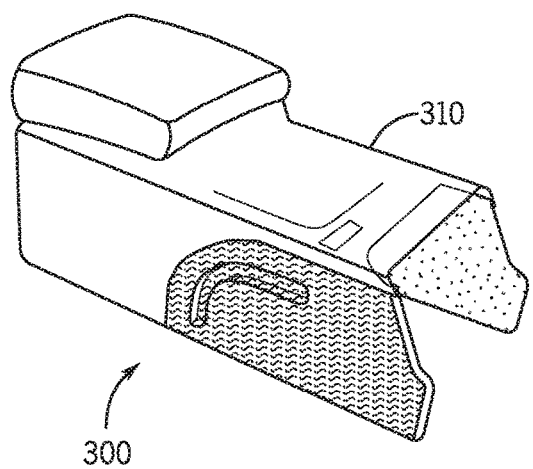
FIG. 31A is a schematic perspective view of a floor console according to an exemplary embodiment.
Figure 31B:
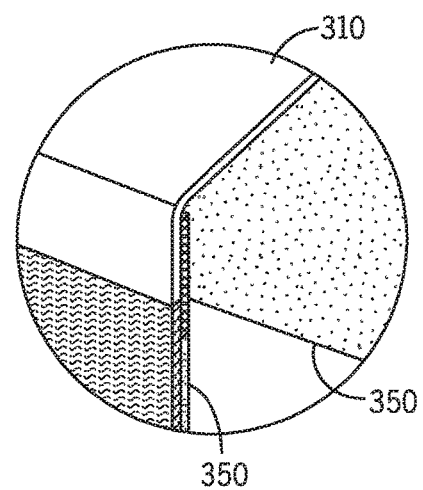
FIG. 31B is a schematic perspective detail view of the floor console according to an exemplary embodiment.
Figure 31D:
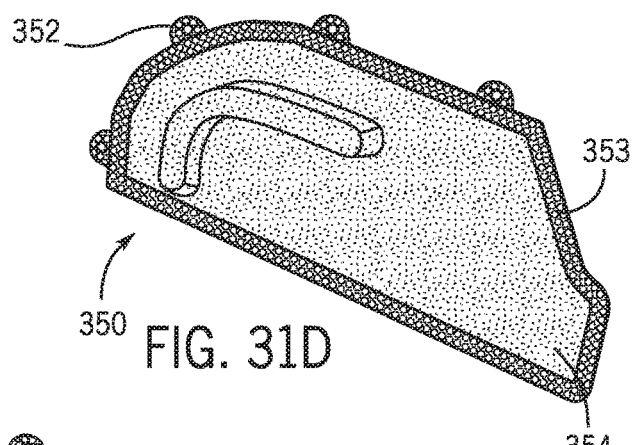
FIG. 31D is a schematic perspective view of a trim component for the floor console according to an exemplary embodiment.
Figure 31C:
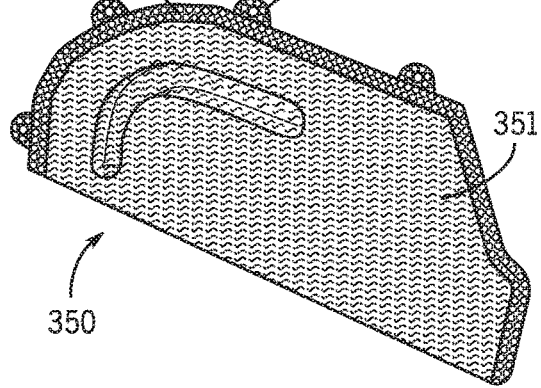
FIG. 31C is a schematic perspective view of a trim component for the floor console according to an exemplary embodiment.
Figure 31E:
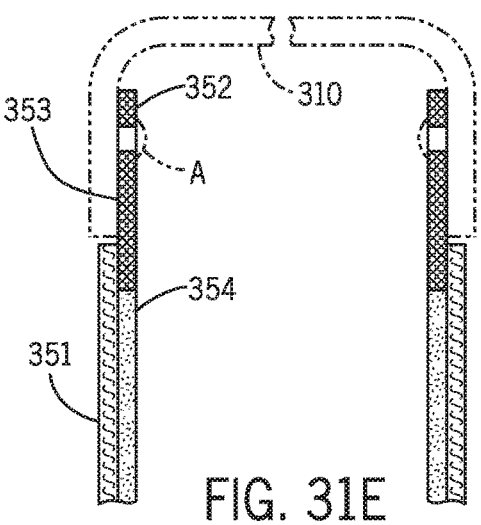
FIG. 31E is a schematic cross-section front view of the floor console according to an exemplary embodiment.
Figure 32A:
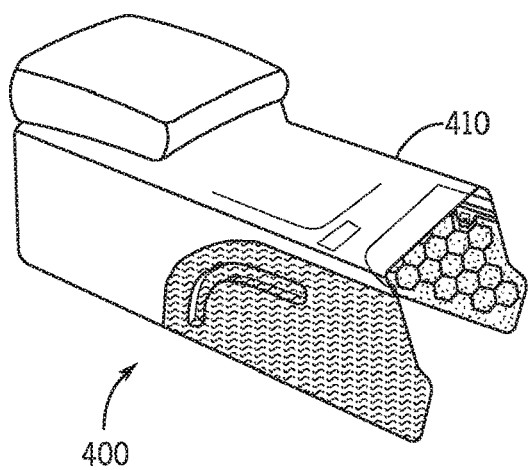
FIG. 32A is a schematic perspective view of a floor console according to an exemplary embodiment.
Figure 32B:
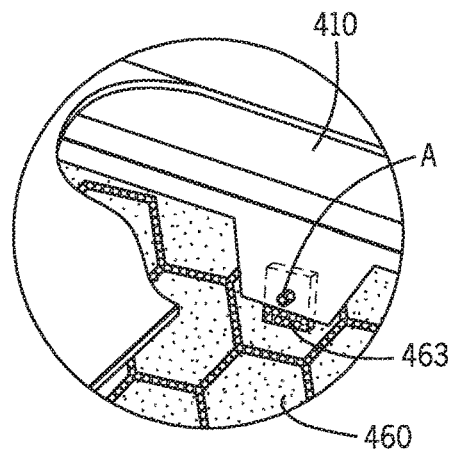
FIG. 32B is a schematic perspective detail view of the floor console according to an exemplary embodiment.
Figure 32D:
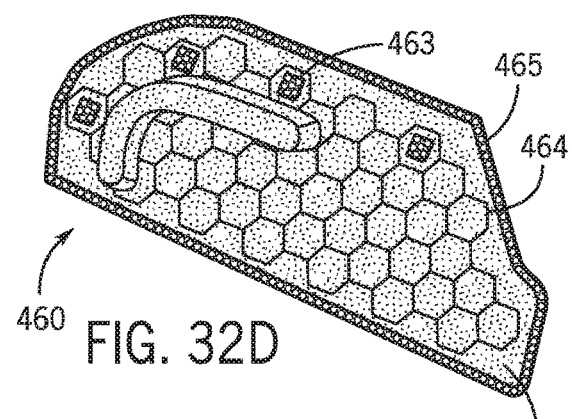
FIG. 32D is a schematic perspective view of a trim component for the floor console according to an exemplary embodiment.
Figure 32C:
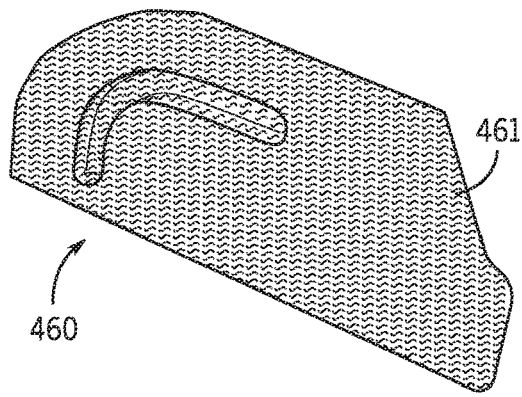
FIG. 32C is a schematic perspective view of a trim component for the floor console according to an exemplary embodiment.
Figure 32E:
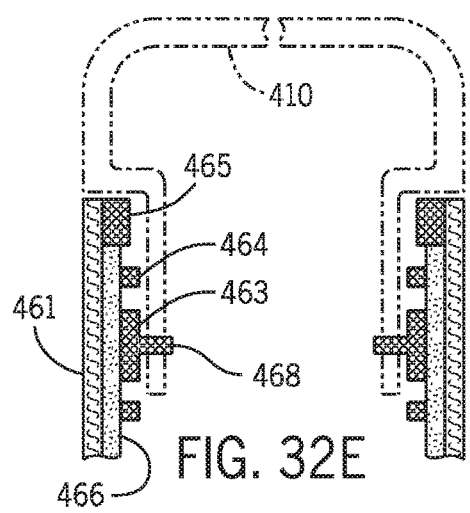
FIG. 32E is a schematic cross-section front view of the floor console according to an exemplary embodiment.

As shown schematically in FIGS. 25, 26 and 27, a first mold element 280 may provide blades 280b to trim fiber panel 290 into a desired dimension; a second mold element 270 may comprise a retractable pressing portion 262 supported by springs 264.

As shown schematically in FIG. 29A, a floor console 300 is shown with a base 310 and trim components 330. As shown schematically in FIGS. 29B and 29E, trim component 330 comprises a cover layer 331 visible to vehicle occupants and a fiber panel 335 underneath cover layer 331. As shown schematically in FIGS. 29C and 29D, trim component 330 provides connectors 332 and holes A configured to attach trim component 330 to base 310 of floor console 300. As shown schematically in FIGS. 29D and 29E, connector feature 332 and resin feature 334 are formed onto the backside of fiber panel 335 and/or the backside of cover layer 331 by an injection molding process.

Figure 33A:
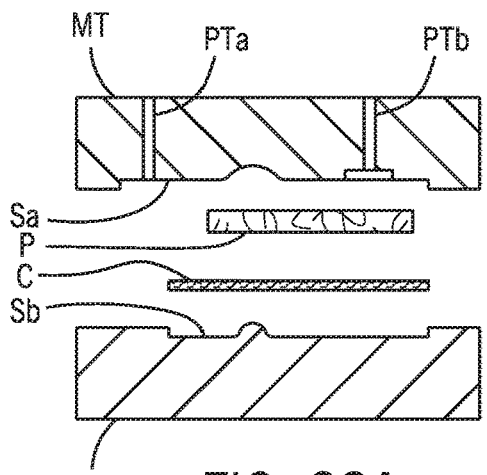
FIG. 33A is a schematic cross-section view of a mold apparatus according to an exemplary embodiment.

As shown schematically in FIG. 33A, a molding press comprises a top molding element MT and a bottom molding element MB; a cover layer C and a fiber panel P are placed between a surface Sa of top molding element MT and a surface Sb of bottom molding element MB.

Figure 33B:
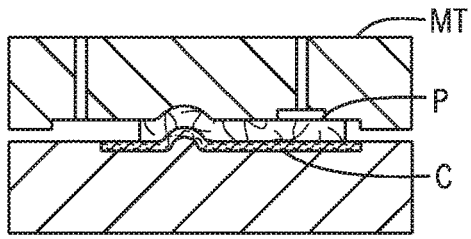
FIG. 33B is a schematic cross-section view of a fiber panel and a cover being compressed between a top molding element and a bottom molding element of the mold apparatus according to an exemplary embodiment.

As shown schematically in FIG. 33B, top molding element MT moves towards the bottom molding element MB; cover layer C and fiber panel P are joined together and pressed to conform to the shape of the mold cavity between surface Sa of top molding element MT and surface Sb of bottom molding element MB.

Figure 33C:
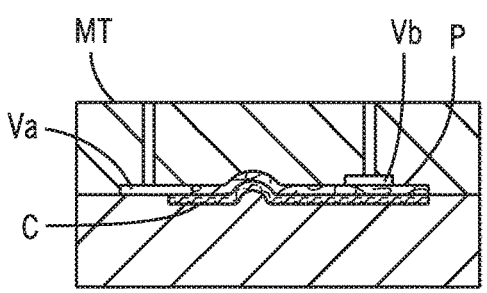
FIG. 33C is a schematic cross-section view of the mold apparatus in the closed position according to an exemplary embodiment.

As shown schematically in FIG. 33C, the molding press is at the closed position; fiber panel P is compressed. As shown schematically in FIG. 33C, cover layer C and fiber panel P may not fill the entire mold cavity leaving empty spaces such as a void Va and a void Vb.

Figure 33D:
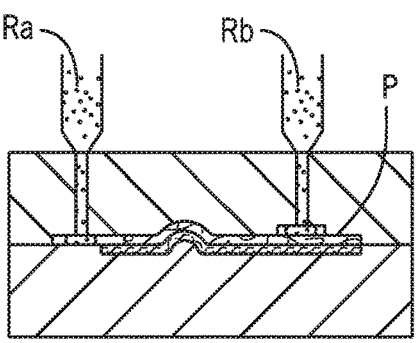
FIG. 33D is a schematic cross-section view of resin being injected into a mold cavity according to an exemplary embodiment.

As shown schematically in FIG. 33D, void Va of the mold cavity is around the periphery of fiber panel P; void Va may be filled with resin Ra; void Vb of the mold cavity is on a surface of fiber panel P; void Vb may be filled with resin Rb. According to an exemplary embodiment, resin feature Ra and resin feature Rb may increase the structure integrity of the trim component made from fiber panel P. See FIG. 33F. According to an exemplary embodiment, resin Ra and resin Rb may be the same material. According to an exemplary embodiment, resin features may be applied in different arrangements. See FIGS. 34A to 34G.

As shown schematically in FIG. 35, trim panel 600 may provide features made with a plastic material such as thermoplastic resin. According to an exemplary embodiment, trim panel 600 comprises a compressed fiber panel; plastic resin is heated and injected on the back side of fiber panel to form features.

As shown schematically in FIG. 36A, a door panel 700 comprises a fiber panel 710; according to an exemplary embodiment, fiber panel 710 is compression molded from a loose fiber mat within a mold apparatus; plastic resin is injected on the back side of fiber panel 710 to form features 720 configured to provide a border for door panel 700 and to increase the overall strength of door panel 700.

As shown schematically in FIG. 36B, an instrument panel may provide an airbag chute or exit 610b on the back side of fiber panel 610a. According to an exemplary embodiment, plastic resin is injected on the back side of fiber panel 610a to form airbag chute or exit 610b. As shown schematically in FIG. 36B, features 620a may be provided to increase the strength of the trim component.

As shown schematically in FIG. 36C, according to an exemplary embodiment a trim component 902 is shown as a side panel for a vehicle floor console (see also FIG. 37D); trim component 902 may provide features such as plastic ribs 910, connectors 930 and border 940. According to an exemplary embodiment, features are formed by injecting plastic on the back side of fiber panel 920. According to an exemplary embodiment, plastic ribs 910 are intended to improve the structural integrity of trim component 902; connectors 930 are configured to attach trim component 902 to a floor console (e.g. for a vehicle interior).

As shown schematically in FIGS. 37A to 37D, the method of forming a trim component by the process of concurrent compression forming and injection molding within a single mold may be applied to door panel 700, door panel 800, instrument panel 600 and floor console 900. According to an exemplary embodiment, a fiber mat is first compressed within a mold to form a fiber panel corresponding to the shape of the mold cavity; plastic resin is injected into the mold to form features on the back side of the fiber panel after the plastic cools and hardens.

Figure 38A:
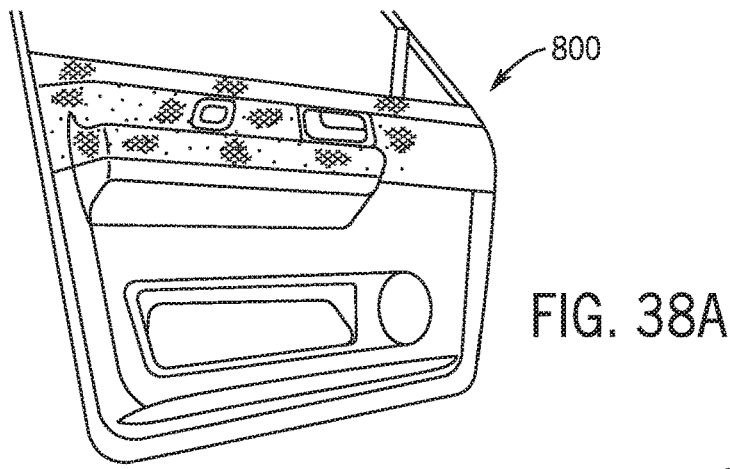
FIG. 38A is a schematic perspective view of a door panel according to an exemplary embodiment.
Figure 38B:
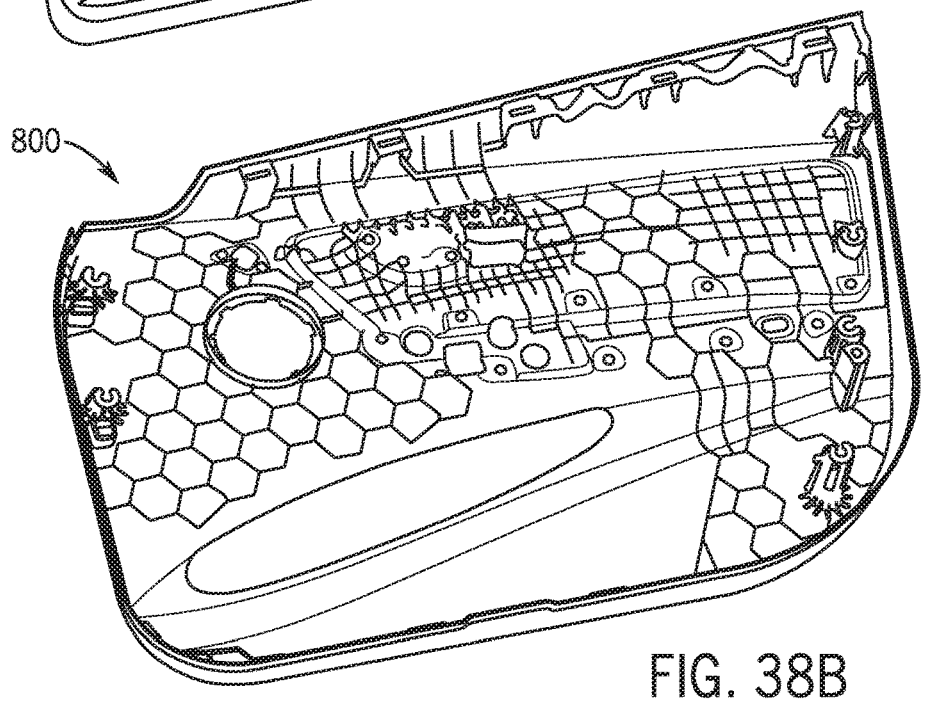
FIG. 38B is a schematic perspective view of the back side of the door panel showing features according to an exemplary embodiment.
Figure 38C:
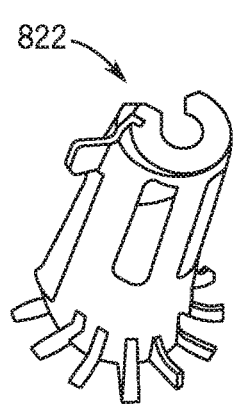
FIGS. 38C to 38E are schematic perspective detail views of features on the back side of the door panel according to an exemplary embodiment.
Figure 38D:
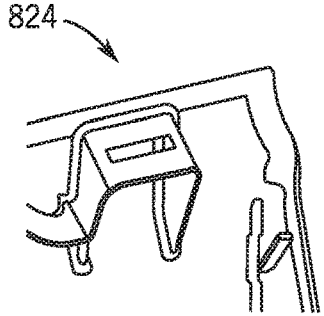
Figure 38E:
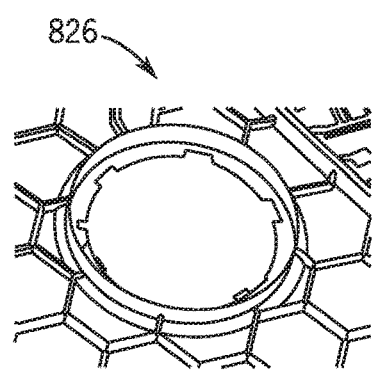

As shown schematically in FIG. 38A, door panel 800 provides a visible surface to vehicle occupants. As shown schematically in FIG. 38B, plastic resin is injected onto the back side of door panel 800 to form features. As shown schematically in FIGS. 38C, 38D and 38E, door panel 800 may provide feature 822 and feature 824 configured to attach door panel 800 to a vehicle door; door panel 800 may feature 826 configured to mount a speaker to the door panel 800.

Figure 39A:
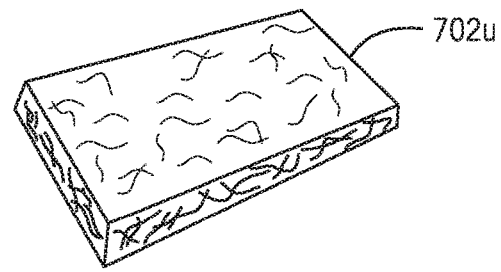
FIGS. 39A to 39C are schematic perspective views of a process to form a compressed fiber mat for vehicle interior according to an exemplary embodiment.
Figure 39B:
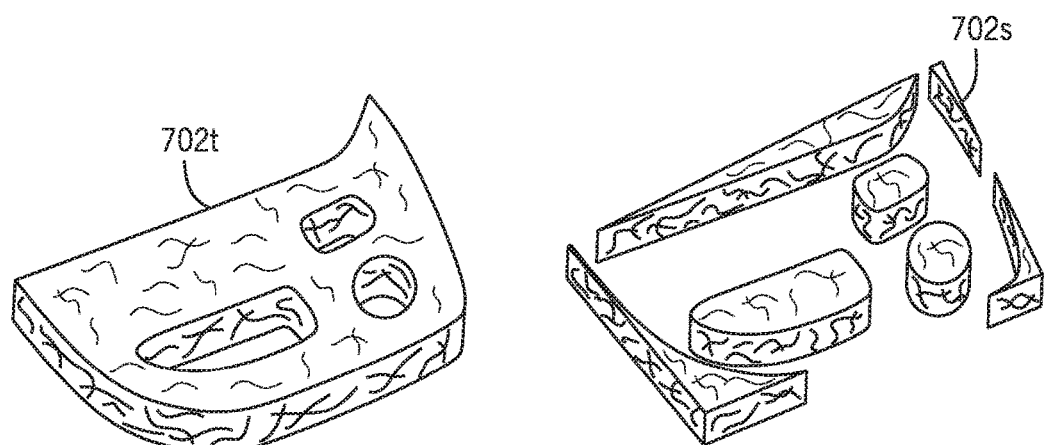
Figure 39C:
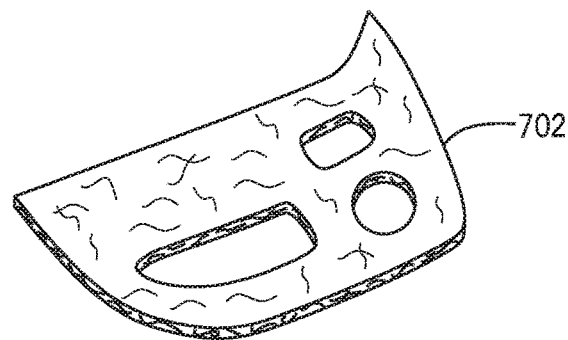

As shown schematically in FIG. 39A, a fiber mat 702u is provided to make various vehicle trim components (e.g. door panels, instrument panels, floor consoles, etc.). According to an exemplary embodiment, a fiber mat 702u may include a combination of structural fibers natural and/or synthetic fibers) and thermoplastic resin (e.g. polypropylene (PP), acrylonitrile butadiene styrene (ABS), polycarbonate (PC), etc.). As shown schematically in FIG. 39B, fiber mat 702u is trimmed into a fiber mat 702t configured to make a door panel; offal 702s from trimming fiber mat 702u results. As shown schematically in FIG. 39C, fiber mat 702t is heated and partially compressed into a compressed fiber mat 702. According to an exemplary embodiment, fiber mat 702t may be placed into a low-temperature mold; fiber mat 702t is heated in the low-temperature mold to induce the thermoplastic resin to liquefy. As compressed fiber mat 702 cools, the thermoplastic within fiber mat 702t solidifies within the low-temperature mold into a desired shape to establish a substantially rigid composite panel (i.e. compressed fiber mat 702).

According to an exemplary embodiment, fiber mat 702u may include a combination of structural fibers and thermoset resin (e.g. epoxy, polyester, etc.). According to an exemplary embodiment, trimmed fiber mat 702t may be compressed within a heated mold to form a partially compressed fiber mat 702 and to induce curing of the resin. According to an exemplary embodiment, a substantially rigid composite panel is formed after the resin is cured.

Figure 40A:
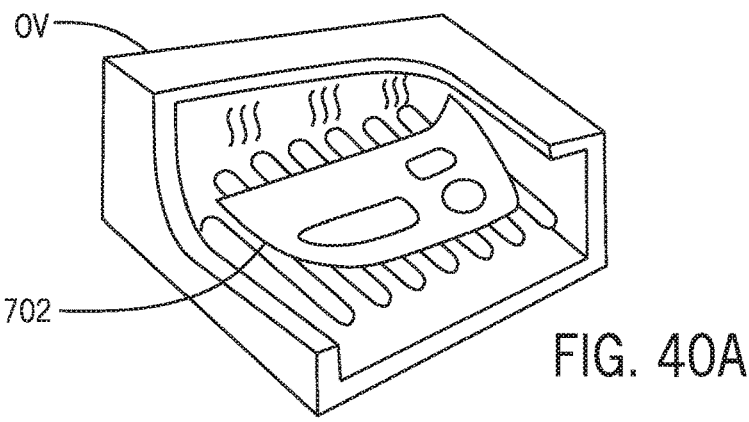
FIGS. 40A to 40C are schematic perspective views of a process to form a vehicle trim panel from the compressed fiber mat according to an exemplary embodiment.
Figure 40B:
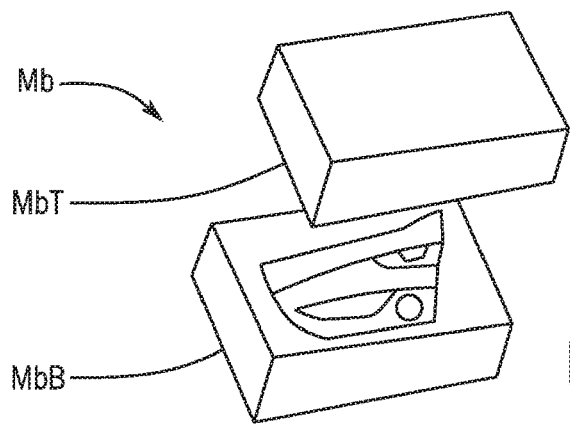
Figure 40C:
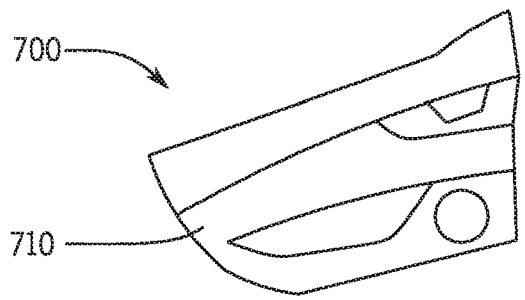
Figure 40D:
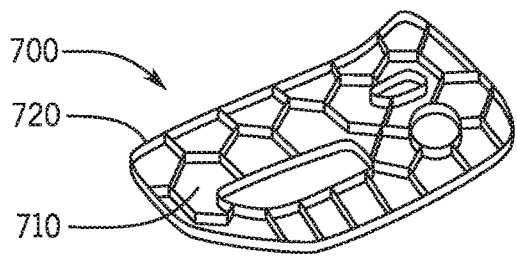
FIG. 40D is a schematic perspective detail view of the back side of the trim panel according to an exemplary embodiment.

As shown schematically in FIG. 40A, compressed fiber mat 702 is heated in an oven OV. As shown schematically in FIG. 40B, the heated compressed fiber mat 702 is transferred into a mold Mb. As shown schematically in FIG. 40C, a trim component shown as a door panel 700 is produced by a process of concurrent compression forming and injection molding. According to an exemplary embodiment, compressed fiber mat 702 is heated and further compressed into a fiber panel 710; plastic resin is injected on the back side of fiber panel 710 and on the edges of fiber panel 710 to form features 720. See FIG. 40D. As shown schematically in FIG. 40D, door panel 700 may be formed into a desired form and dimension with features 720 around to edges of fiber panel 710; door panel 700 may provide features shown as plastic ribs on the back side of fiber panel 710 to improve structural integrity and rigidity. According to an exemplary embodiment, a plastic rib may be placed at various locations on the back side of a fiber panel (e.g. along the edge of the fiber panel, in the middle of the fiber panel, etc). According to an exemplary embodiment, multiple plastic ribs may be placed at various different locations on the back side of a fiber panel.

Figure 41A:
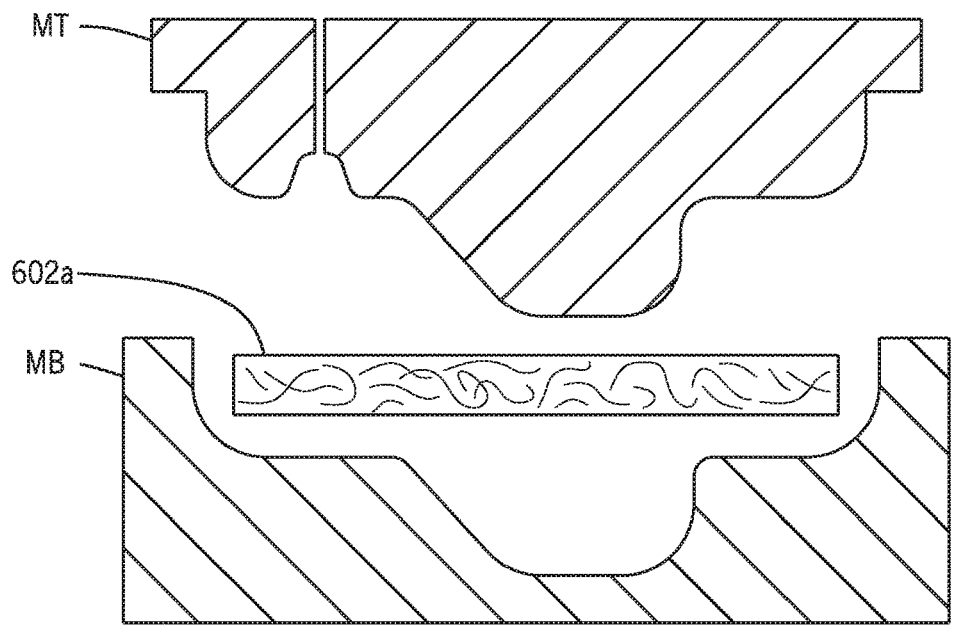
FIGS. 41A to 41C are schematic cross-section views of a process to form a trim component within a mold apparatus according to an exemplary embodiment.
Figure 41B:
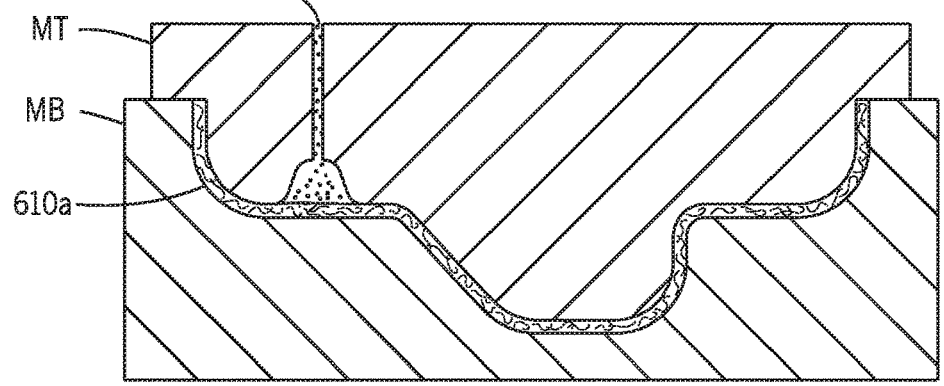
Figure 41C:
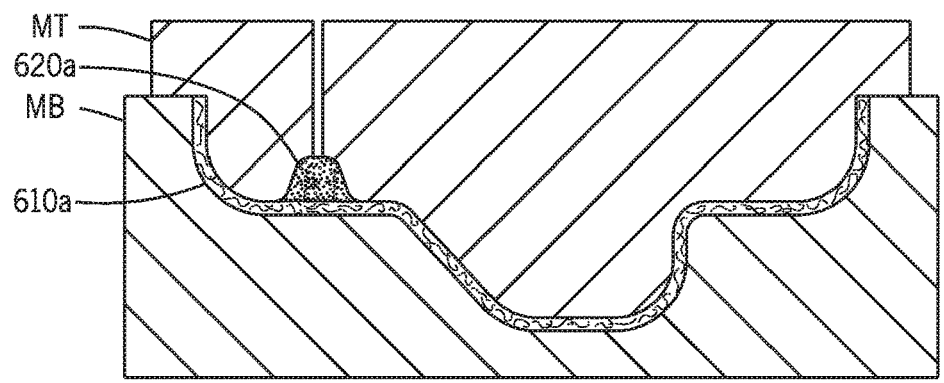

As shown schematically in FIG. 41A, a mold apparatus comprises a mold top MT and a mold bottom MB; a compressed fiber mat 602a is placed between mold top MT and mold bottom MB. As shown schematically in FIG. 41B, mold top MT and mold bottom MB are at the closed position; compressed fiber mat 602a is heated and further compressed into a fiber panel 610a; plastic resin R is injected into the mold cavity through a nozzle on mold top MT. As shown schematically in FIG. 41C, the mold apparatus is at a closed position; a trim component shown as instrument panel 600 is formed between mold top MT and mold bottom MB. Instrument panel 600 comprises fiber panel 610a and a plastic rib 620a on the back side of fiber panel 610a; compressed fiber mat 602a is further compressed to form fiber panel 610a. According to an exemplary embodiment, plastic rib 620a may be formed by injecting plastic resin into a mold cavity on the back side of fiber panel 610a.

Figure 42A:
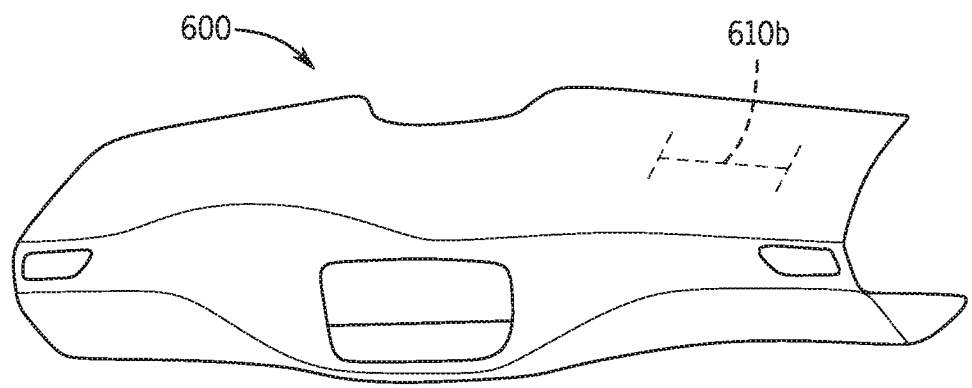
FIG. 42A is a schematic perspective view of an instrument panel according to an exemplary embodiment.
Figure 42B:
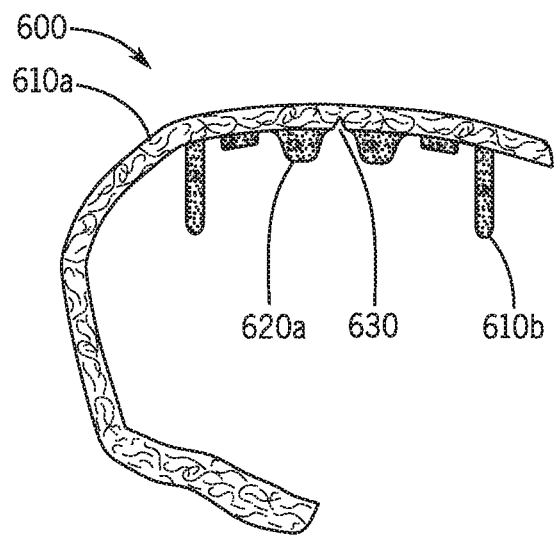
FIG. 42B is a schematic cross section view of the instrument panel showing an airbag chute or exit according to an exemplary embodiment.
Figure 42C:
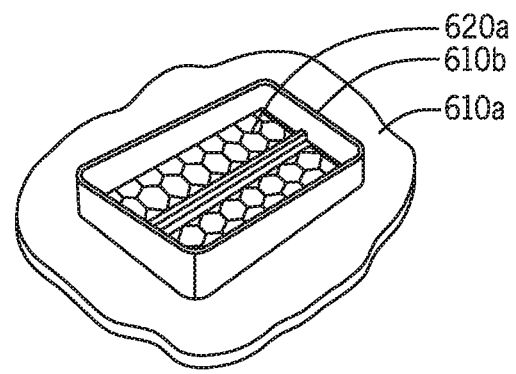
FIG. 42C is a schematic perspective detail view of the back side of the instrument panel showing an airbag chute or exit according to an exemplary embodiment.

As shown schematically in FIG. 42A, an instrument panel 600 may provide an airbag chute or exit 610b. As shown schematically in FIGS. 42B and 42C, airbag chute or exit 610b is mounted on the back side of fiber panel 610a, plastic ribs 620a are provided to increase strength of local area near plastic ribs 620a; a notch 630 is provided to reduce the strength at the score line.

According to an exemplary embodiment, a trim component for a vehicle interior comprises a fiber panel, a structure and a cover coupled to at least one of (a) the fiber panel, (b) the structure. See FIGS. 1, 2, 5 and 6. See also FIGS. 34A-34G. The fiber panel may comprise a plurality of fibers and a resin configured to bind the fibers; the structure may comprise a molded resin. See FIG. 5. The structure may provide a border formed about at least a portion of a periphery of the fiber panel. See FIGS. 1, 2 and 5. See also FIGS. 34A, 34B, 34D and 34E. The periphery of the fiber panel may comprise an edge. The border of the structure may be formed on the edge of the fiber panel. See FIG. 5. See also FIGS. 34A, 34B, 34D and 34E. The structure may be configured to accommodate at least one variation in at least one edge of the fiber panel. See FIG. 5. See also FIGS. 34A, 34B, 34D and 34E. The fiber panel may comprise an outer surface. The cover may be coupled to the outer surface of the fiber panel and the structure. See FIG. 6. See also FIGS. 34B, 34D and 34E. The structure may comprise an outer surface. The cover may be coupled to the outer surface of the fiber panel and the outer surface of the structure. See FIG. 6. See also FIGS. 34B and 34E. The fiber panel may comprise a compression formed component with the periphery. The border of the structure may be formed from a resin. See FIG. 5. See also FIGS. 34A, 34B, 34D and 34E. The trim component may comprise a rib configured to extend across an interface between the fiber panel and the structure to enhance the strength of the interface. See FIG. 5. The fiber panel may comprise a gap. The structure may comprise a resin configured to reinforce the fiber panel in the gap of the fiber panel. See FIGS. 1, 2 and 5. See also FIG. 34G. The fiber panel and the structure may be configured to provide a substantially continuous structure. See FIGS. 2, 5, 7 and 9. See also FIG. 34G. The structure may be configured to provide a weakened zone at the gap of the fiber panel configured to facilitate separation of the structure from the fiber panel for deployment of an airbag. See FIGS. 2, 5 and 7. See also FIG. 34G. The gap in the fiber panel may comprise a tear in the fiber panel and the structure may be configured to fill the gap to form a substantially continuous surface. See FIGS. 2, 5 and 9. See also FIG. 34G. The fiber panel may comprise a first curvature. The structure may comprise a second curvature different than the first curvature of the fiber panel. See FIGS. 2, 5 and 9. The fiber panel may comprise a compression formed component. The structure comprising the resin may be formed into the gap of the fiber panel and may extend along at least a portion of an outer surface of the fiber panel and along at least a portion of an inner surface of the fiber panel to form the structure to the fiber panel. See FIGS. 5 and 8. The structure may comprise at least one of (a) an ancillary component, (b) a rib, or (c) a connector configured to facilitate coupling the trim component with at least one of (a) a door frame, (b) an instrument panel, or (c) a support structure within the vehicle interior. See FIGS. 2 and 5. See also FIGS. 34A-34F. The structure may comprise a rib configured to (a) support the fiber panel or (b) reinforce the fiber panel. See FIG. 5. See also FIGS. 34A-34F.

According to an exemplary embodiment, a trim component for a vehicle interior comprises a fiber panel, a structure comprising a resin and a cover coupled to the fiber panel. See FIGS. 1, 2, 5 and 6. See also FIGS. 34A-34G. The structure may be coupled to at least one of (a) the cover, (b) the fiber panel. See FIGS. 1, 2, 5 and 6. See also FIGS. 34A-34G. The structure may comprise a border coupled to at least a portion of a periphery of the fiber panel. See FIGS. 1, 2 and 5. See also FIGS. 34A, 34B, 34D and 34E. The fiber panel may comprise a gap. The structure may be configured to reinforce the fiber panel in the gap of the fiber panel. See FIGS. 1, 2, 5 and 6. See also FIG. 34G.

According to an exemplary embodiment, a trim component for a vehicle interior comprises a fiber panel comprising a compression formed component, a structure formed from a molded resin and a cover coupled to the fiber panel. The structure may be coupled to at least one of (a) the cover, (b) the fiber panel. The structure may comprise at least one molded feature. See FIGS. 1, 2, 5 and 6. See also FIGS. 34A-34G. The molded feature may comprise a border coupled to at least a portion of a periphery of the fiber panel. See FIGS. 1, 2 and 5. See also FIGS. 34A, 34B, 34D and 34E.

Exemplary Embodiments—Part 1

Figure 2:
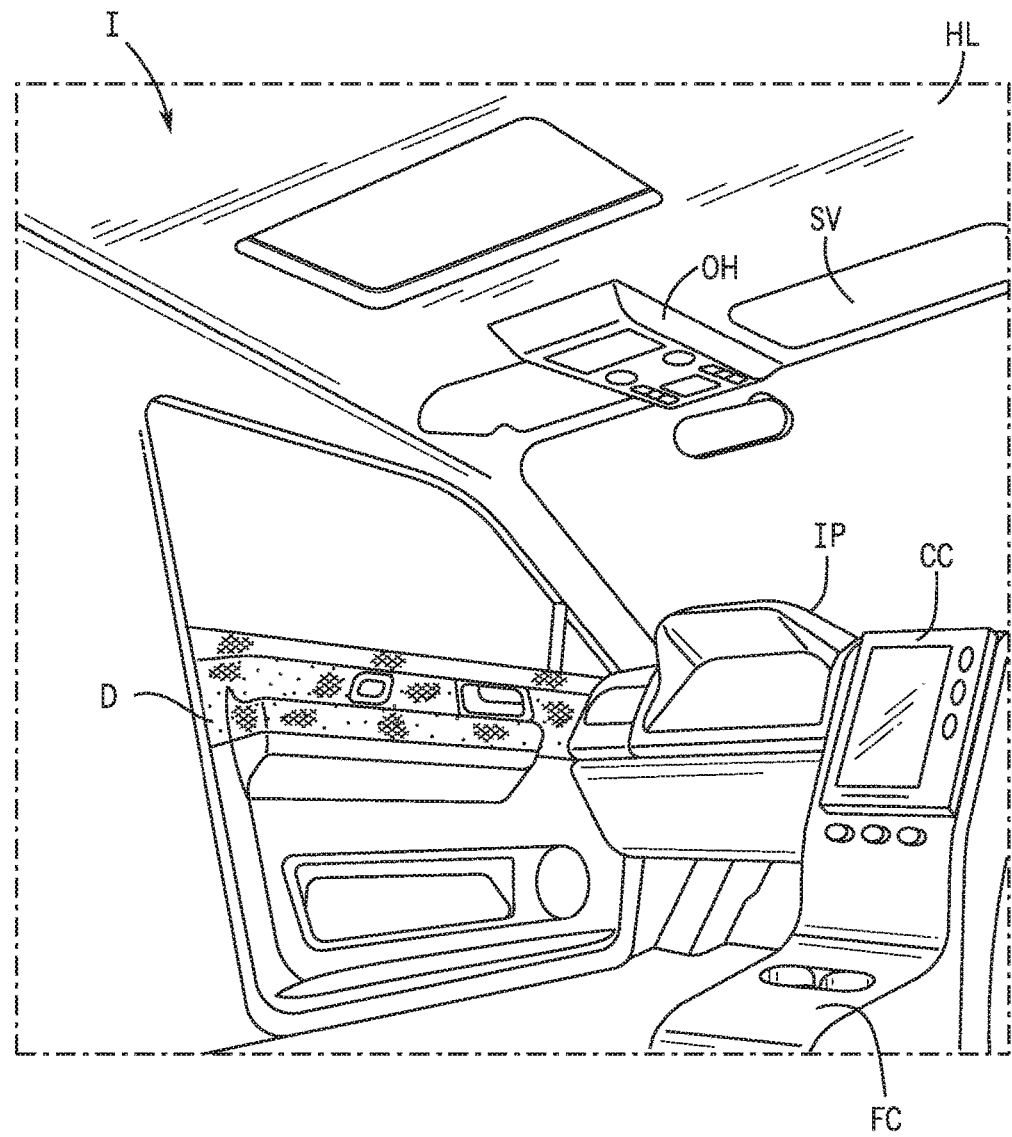
FIG. 2 is a schematic perspective partial view of a vehicle interior according to an exemplary embodiment.

As shown schematically in FIGS. 1A, 1B, and 2, a vehicle V includes an interior I having a seat S, an armrest AR and a center console CC. Trim components of the seat S, the armrest AR, the center console CC and/or other areas within the interior I may be manufactured by a process of concurrent compression forming and injection molding. A vehicle trim component is prepared by a process including disposing a fiber panel onto a first surface of a mold cavity and compressing the fiber panel between the first surface and a second surface of the mold cavity to form the fiber panel into a desired shape. Resin is injected into the mold cavity to fill a void between the first surface and the second surface adjacent to the fiber panel; injected resin will fill the void and establish a border about the fiber panel as the resin hardens and/or cures. Each edge of the resultant trim component will substantially correspond to the desired dimensions. The process of trimming the edges of the component after formation may be prevented which decreases the duration of the manufacturing process and reduces excess material.

Resin is injected into at least one secondary void between the fiber panel and the second surface to form an ancillary component of the vehicle trim component. The mold cavity may include multiple secondary voids configured to establish ribs along a surface of the fiber panel; ribs are configured to support the fiber panel by providing a stronger component and/or reducing the weight of the component. According to an exemplary embodiment, the thickness of the fiber panel may be reduced due to the added strengthening from the ribs. Because the fiber panel and the ancillary components are formed within a single mold cavity the process of transferring the part between a compression mold and an injection mold is prevented (which reduces the duration of the manufacturing process). Employing a single mold reduces design and manufacturing costs compared to producing a first mold for the compression forming process and a second mold for the injection molding process.

As shown schematically in FIG. 2, the vehicle interior I includes center console CC, floor console FC, interior door panel D, instrument panel IP, headliner HL, overhead console OH and sun visor SV. Each element of the vehicle interior I may include one or more trim components manufactured by a combination of compression forming and injection molding. The concurrent compression forming and injection molding process may facilitate formation of a trim component having dimensionally accurate edges (preventing the post-molding trimming process). By forming the fiber panel and molding certain ancillary components within a single mold cavity, the manufacturing process may be substantially reduced, compared to processes that include a compression molding process in a first mold and an injection molding process in a second mold.

Figure 3:
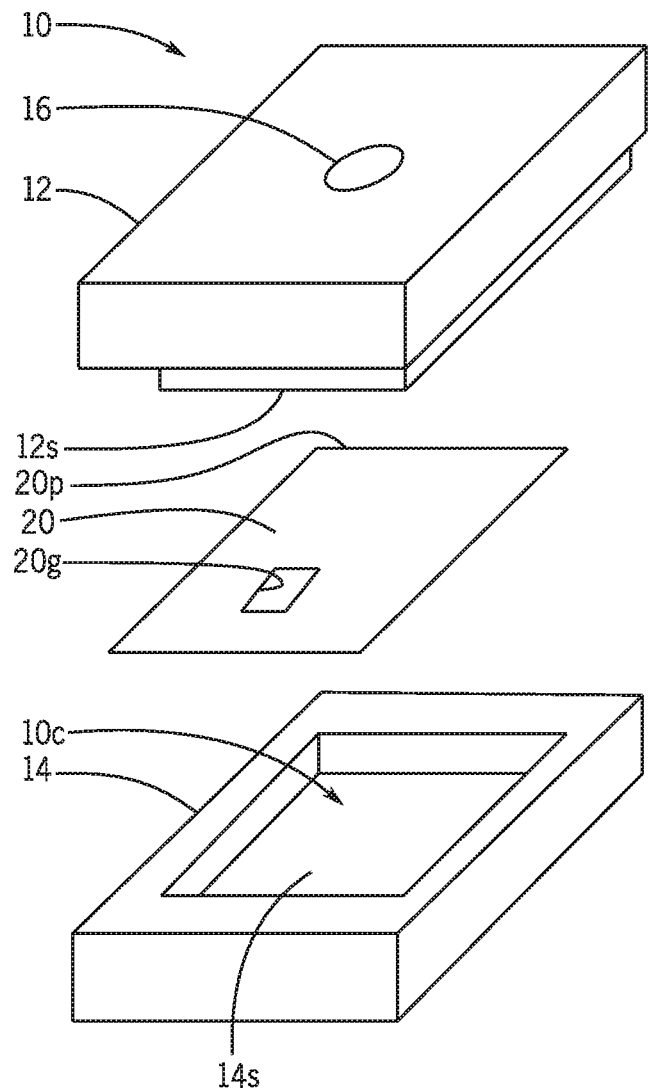
FIG. 3 is a schematic perspective view of a mold apparatus with a fiber panel according to an exemplary embodiment.

As shown schematically in FIG. 3, a molding assembly 10 includes a first (e.g. lower) mold element 14 and a second (e.g. upper) mold element 12. First mold element 14 includes a first surface 14s defining a first portion of a mold cavity 10c and the second mold element 12 includes a second surface 12s defining a second portion of the mold cavity 10c; first surface 14s is configured to receive a fiber panel 20 and the second surface 12s is configured to compress fiber panel 20 against first surface 14s to form fiber panel 20 into a desired shape.

Fiber panel 20 includes a combination of structural fibers and thermoplastic resin; structural fibers may include natural fibers (e.g. hemp, wood, flax, kenaf and sisal) and/or synthetic fibers (e.g. glass fibers, carbon fibers and polymeric fibers); thermoplastic resin may include polypropylene (PP), acrylonitrile butadiene styrene (ABS) and/or polycarbonate (PC) binders. According to an exemplary embodiment, fiber panel 20 may be constructed from about 50 percent natural fibers and about 50 percent polypropylene (PP). To facilitate compression forming, fiber panel 20 is heated (e.g. to about 200 degrees Celsius) to induce thermoplastic resin to liquefy; fiber panel 20 is disposed onto first surface 14s of cavity 10c and compressed between first surface 14s and second surface 12s as second mold element 12 is driven toward first mold element 14. As fiber panel 20 cools within mold assembly 10 the thermoplastic solidifies, establishing a substantially rigid composite panel that conforms to the shape of mold cavity 10c.

According to an exemplary embodiment, fiber panel may include a combination of structural fibers and a thermoset resin; structural fibers may include natural fibers (e.g. hemp, wood, flax, kenaf and sisal) and/or synthetic fibers (e.g. glass fibers, carbon fibers and polymeric fibers); thermoset resin may include epoxy resin, polyimide resin, polyester resin and/or vinylester resin. To facilitate compression forming, the fiber panel 20 is disposed onto first surface 14s of cavity 10c and compressed between first surface 14s and second surface 12s as second mold element 12 is driven toward first mold element 14. Panel 20 is heated during the compression process (e.g. via a heated mold assembly 10) to induce the thermoset resin to cure; a substantially rigid composite panel that conforms to the shape of the mold cavity 10c is formed. See FIG. 3.

After fiber panel 20 is compressed between first surface 14s and second surface 12s, resin is injected into mold cavity (e.g. via a port 16) to fill at least one void between first surface 14s and second surface 12s adjacent to fiber panel 20; void extends about a periphery 20p of fiber panel 20. Injected resin will fill the void and establish a border about fiber panel 20 as resin hardens and/or cures; each edge of the resultant trim component will substantially correspond to the desired dimensions; the process of trimming the edges of the component after formation may be prevented, decreasing the duration of the manufacturing process and reducing excess material. See FIG. 3.

As shown schematically in FIG. 3, void corresponds to a gap 20g within fiber panel 20; resin will fill the gap establishing a substantially continuous structure; gap 20g may be configured to establish a weakened zone extending along the interface between fiber panel 20 and molded resin within gap 20g; weakened zone may be configured to facilitate separation of the molded resin from fiber panel 20 enabling deployment of an airbag. According to an exemplary embodiment, the resin may fill gaps formed by unintentional tearing of fiber panel 20 during the compression forming process, forming a trim component having a substantially continuous surface; gap 20g may be configured to establish a high curvature region of trim component. According to an exemplary embodiment, mold cavity 10c may be contoured to form fiber panel into a shape having a relatively low curvature and to form resin into an element having a high curvature; a trim component having a desired shape and structural properties may be formed. According to an exemplary embodiment, fiber panels may include additional gaps to establish weakened zones to fill torn areas of fiber panel and/or to form high curvature regions of trim component. See FIGS. 8, 9 and 10.

Figure 4:
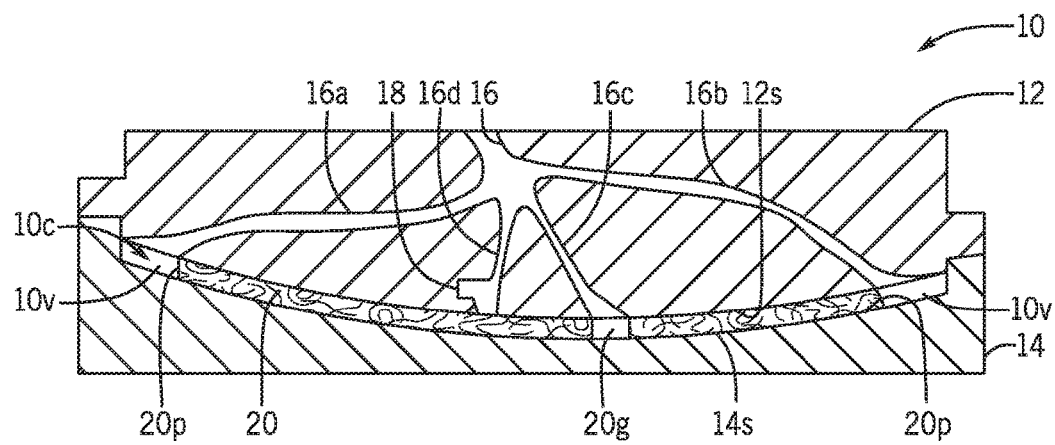
FIG. 4 is a schematic cross-section view of a mold apparatus with the fiber panel in between the mold top and the mold bottom according to an exemplary embodiment.

As shown schematically in FIG. 4, mold cavity 10c includes a void 10v extending about periphery 20p of fiber panel 20. Resin may be injected into void 10v to establish a border about fiber panel 20 as the resin hardens and/or cures; molding assembly 10 includes a first fluid pathway 16a extending between port 16 and first portion of the void 10v and a second fluid pathway 16b extending between port 16 and second portion of the void 10v. In the configuration when liquid resin is injected into port 16 the resin will flow into void 10v establishing a border surrounding fiber panel 20; molding assembly 10 includes a third fluid pathway 16c extending between port 16 and gap 20g, facilitating resin flow to gap 20g.

Mold cavity 10c includes a secondary void 18 positioned between fiber panel 20 and second surface 12s of mold cavity 10c; secondary void 18 is configured to form an ancillary component of vehicle trim component (e.g. a support rib or a connector). A fourth fluid pathway 16d extends between port 16 and second void 18; liquid resin is injected into port 16; resin will flow into void 18, establishing the ancillary component as resin cures and/or hardens. See FIG. 4.

Fiber panel 20 is disposed onto first surface 14s of mold cavity 10c and fiber panel 20 is compressed between first surface 14s and second surface 12s of mold cavity 10c to form fiber panel 20 into a desired shape; as the fiber panel 20 solidifies within mold cavity 10c, resin is injected into port 16 filling the void 20g, void 10v and void 18. As resin cures and hardens it binds to fiber panel 20, forming a trim component having a desired shape, structural properties and/or ancillary components; resin may include a thermoplastic material (e.g. polypropylene (PP), acrylonitrile butadiene styrene (ABS) or polycarbonate (PC)) or a thermoset material (e.g. epoxy resin, polyimide resin, polyester resin or vinylester resin). The resin is injected into mold in a liquid state and solidifies as resin cures/hardens; resin parts are formed having shapes corresponding to the shapes of the respective voids within mold cavity 10c; injected resin may be molded with a cellular structure (e.g. via a chemical or mechanical blowing agent) to reduce a mass of trim component and/or to enhance processing properties. See FIG. 4.

Figure 5:
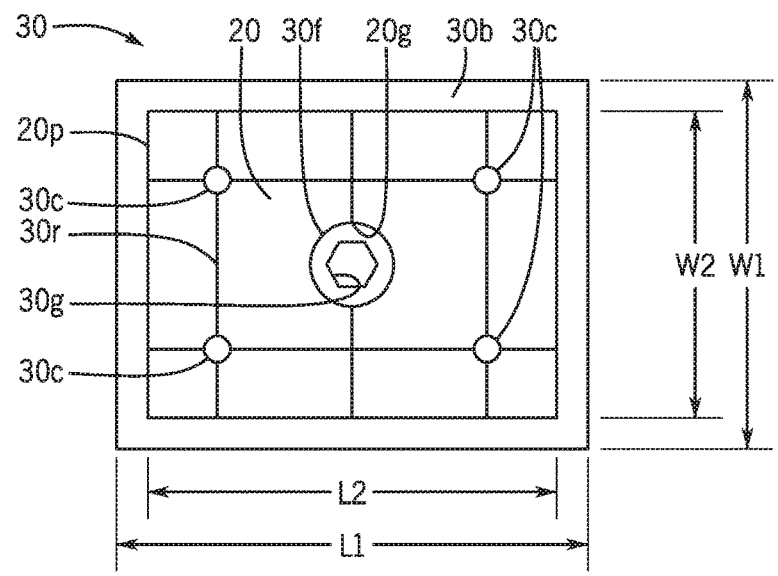
FIG. 5 is a schematic back view of a trim component according to an exemplary embodiment.

As shown schematically in FIG. 5, trim component 30 includes fiber panel 20 and a resin border 30b disposed about the periphery 20p of fiber panel 20. The dimensional accuracy of mold cavity 10c facilitates formation of resin border 30b having desired dimensions, obviating the post-formation panel trimming process. To form trim component 30 having a length L1 and a width W1, fiber panel 20 is trimmed to a length L2 smaller than the desired length L1 and to a width W2 smaller than the desired width W1. Fiber panel 20 is placed within mold cavity 10c having desired dimensions (e.g. length L1 and width W1). After fiber panel 20 is compressed between first surface 14s and second surface 12s resin is injected into void 10v surrounding periphery 20p, forming border 30b and establishing trim component 30 having the desired dimensions. See FIG. 5.

According to an exemplary embodiment, fiber panel 20 is trimmed prior to the compression forming process. According to an exemplary embodiment, recycling post-formation excess material may be difficult because the thermoset resin within fiber panel 20 has cured/hardened and/or the thermoplastic resin has bonded to the structural fibers; resin fills the void between the periphery 20p of fiber panel 20 and the edges of mold cavity 10c; edges of trim component 30 may be dimensionally accurate despite variations in the fiber panel edges; edges of fiber panel may be trimmed to rough dimensions prior to the compression forming process, reducing the duration associated with fiber panel trimming. See FIG. 5.

As shown schematically in FIG. 5, trim component 30 includes a resin feature 30f formed within gap 20g of fiber panel 20; feature 30f includes an opening 30g having dimensionally accurate edges. To form opening 30g mold cavity 10c includes a protrusion having the shape of opening 30g. As resin is injected into gap 20g the protrusion blocks the flow of resin to the opening 30g establishing desired feature 30f; feature 30f may be utilized to secure other components to trim component 30 and/or to secure trim component 30 to vehicle interior I. A substantially hexagonal opening 30g is shown schematically in FIG. 5. According to an exemplary embodiment, the opening may be configured to be any shape (e.g. square, circular, elliptical, etc.); trim component 30 may include additional features 30f distributed throughout fiber panel 20. According to an exemplary embodiment, feature 30f is formed during the concurrent compression forming and injection molding process; the practice of applying a feature to fiber panel after the formation of the trim component is removed; duration and expense associated with trim component manufacturing may be substantially reduced.

As shown schematically in FIG. 5, trim component 30 includes ancillary components coupled to the surface of fiber panel 30; ancillary components may be formed by injecting resin into a secondary void between fiber panel and second surface of mold cavity; ancillary components include ribs 30r and connectors 30c. According to an exemplary embodiment, a trim component may include other ancillary components (e.g. pins, mounts, etc.). Connectors 30c are configured to facilitate coupling between trim component 30 and another surface (e.g. door frame, instrument panel support structure, etc.) within interior I of vehicle V; ribs 30r are configured to improve the structural integrity of fiber panel 20 by increasing the strength of trim component and/or reducing the weight of trim component; the thickness of the fiber panel may be reduced to provide sufficient rigidity due to added strength by the ribs. Ribs 30r may extend across the interface between fiber panel 20 and border 30b and/or across the interface between fiber panel 20 and resin feature 30f; ribs 30r may enhance the strength of the panel/border interface and/or the panel/feature interface. According to an exemplary embodiment, fiber panel and ancillary components are formed within a single mold cavity; the process of transferring the part between compression mold and injection mold is removed, reducing the duration of the manufacturing process; employing a single mold reduces design and manufacturing costs (compared to producing first mold for the compression forming process and second mold for the injection molding process).

Figures 6, 7:
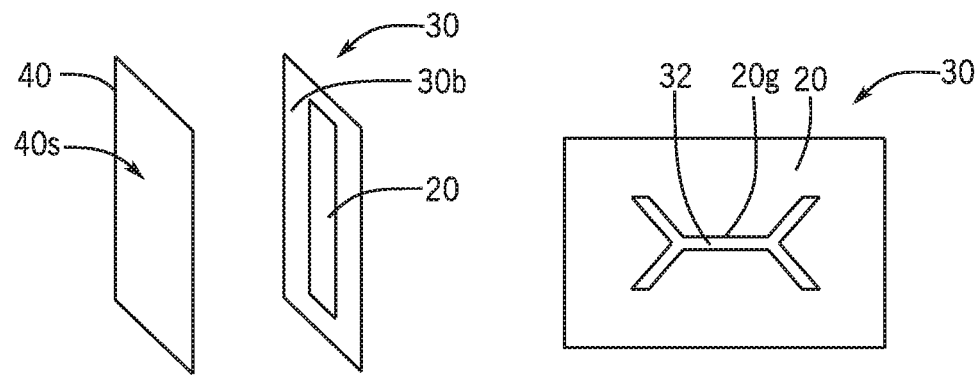
FIG. 6 is a schematic perspective view of a cover being applied to a trim component according to an exemplary embodiment.
FIG. 7 is a schematic front view of a trim component having a weakened area for airbag deployment according to an exemplary embodiment.

As shown schematically in FIG. 6, a cover stock 40 is applied to fiber panel 20 (e.g. via an adhesive layer) to form a visible surface 40s; cover stock 40 may be a woven or non-woven fabric, an appliqué, a vinyl layer, a foam layer, a foil layer or a leather covering; cover stock 40 may establish visible surface 40s that matches vehicle interior I, enhancing the appearance of trim component 30. Cover stock 40 is applied to fiber panel 20 after trim component 30 is formed; cover stock may be applied during the compression molding process (e.g. cover stock may be positioned between first surface 14s of the mold cavity 10c and fiber panel 20 prior to compression forming). As fiber panel 20 solidifies mold cavity 10c, cover stock may bind to fiber panel establishing a desired visible surface; cover stock 40 may be applied to at least a portion of fiber panel 22 and/or at least a portion of resin component to provide the visible surface 40s.

As shown schematically in FIG. 7, trim component 30 includes a resin feature 32 formed within gap 20g of fiber panel 20; resin feature 32 is H-shaped establishing a long interface between feature 32 and fiber panel 20. According to an exemplary embodiment, long interface may provide a weakened zone; resin feature 32 may be separated from fiber panel 20 when sufficient force is applied to trim component 30; trim component 30 may be an interior door panel or instrument panel configured to conceal an airbag. Upon deployment, the airbag will apply a force to trim component 30 to induce separation of resin feature 32 from fiber panel 20 facilitating airbag deployment.

As shown schematically in FIG. 7, feature 32 is H-shaped; according to an exemplary embodiment, the weakened zone feature may include other shapes (e.g. U-shaped, T-shaped, circular, square, etc.). Certain trim components 30 may include a substantially continuous fiber panel 20 surrounded by resin border 30b forming a weakened zone about the periphery 20p of fiber panel 20; trim component may include various reinforcing features (e.g. ribs 30r, additional fiber panels, thicker resin regions, etc.) configured to adjust the strength of the weakened zone such that the trim component remains substantially intact until the airbag is deployed; weakened zone between resin feature 32 and fiber panel 20 may be further weakened by scoring (e.g. via in-mold scoring, laser scoring, etc.) ensuring that the force of the airbag moves resin feature 32 to separate from fiber panel 20.

According to an exemplary embodiment, additional elements may be utilized to reinforce the weakened zone and/or to tether components during airbag deployment. After trim component 30 is formed, a flexible panel (e.g. carbon fiber, glass fiber, synthetic fiber, etc.) may be coupled to fiber panel 20 and to resin feature 32; during airbag deployment, flexible panel may tether resin feature 32 to fiber panel 20, retaining resin feature 32 as resin feature 32 separates from fiber panel 20 at the weakened zone. Flexible panel may be coupled to trim component 30 during the compression forming and injection molding process; flexible panel may be placed in mold cavity adjacent to fiber panel; fiber panel 20 solidifies within the mold cavity; flexible panel will bond to fiber panel; resin injected into gap will bond to flexible panel and establish trim component configured to retain resin feature 32 during airbag deployment. See FIG. 7.

Figures 8, 9, 10:
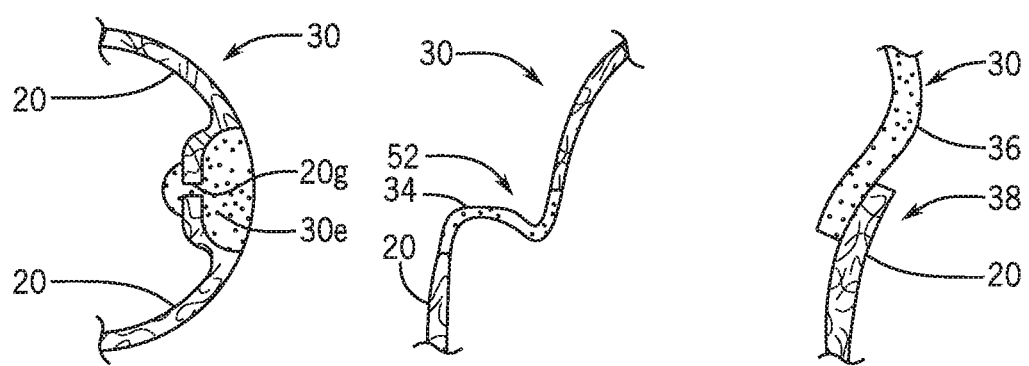
FIG. 8 is a schematic cross-section partial view of a trim component according to an exemplary embodiment.
FIG. 9 is a schematic cross-section partial view of a trim component according to an exemplary embodiment.
FIG. 10 is a schematic cross-section partial view of a trim component according to an exemplary embodiment.

As shown schematically in FIG. 8, fiber panel 20 includes gap 20g that enables resin to flow through fiber panel 20 during the injection molding process; portions of a resin reinforcement element 30e are formed on each side of fiber panel 20 locking element 30e to panel 20. Due to the thickness of reinforcement element 30e, the resin component may provide additional structural rigidity to a region of trim component that may experience high loading; by combining various resin and fiber elements trim component 30 may form a desired shape with increased strength. Reinforcement element 30e is formed by compressing fiber panel 20 between opposite surfaces of mold cavity; once fiber panel solidifies at least one of the surfaces is partially retracted, establishing a void having the shape of reinforcement element 30e. Resin is then injected into the void to form element 30e; shape of fiber panel 20 adjacent to gap 20g is formed by the pressure of the injected resin; the step of retracting the mold surface after the compression molding process may be avoided according to an exemplary embodiment.

As shown schematically in FIG. 9, mold cavity 10c may be contoured to form fiber panel into a shape having a relatively low curvature and form the resin into a resin element 34 having a high curvature; curvature of fiber panel may be limited due to the rigidity of the fibers forming trim component 30; gap 52 in fiber panel 20 may be intentionally positioned within a high curvature region and/or unintentionally formed by fiber panel tearing within the high curvature region.

As shown schematically in FIG. 10, resin component 36 overlaps a portion of fiber panel 20 forming a lap joint 38. By increasing the contact area between resin component 36 and fiber panel 20, the structural integrity of the interface may be enhanced; the overlap may be particularly configured to establish the desired bonding strength between resin component 36 and fiber panel 20; fiber panel 20 may overlap a portion of resin component 36.

Figure 11:
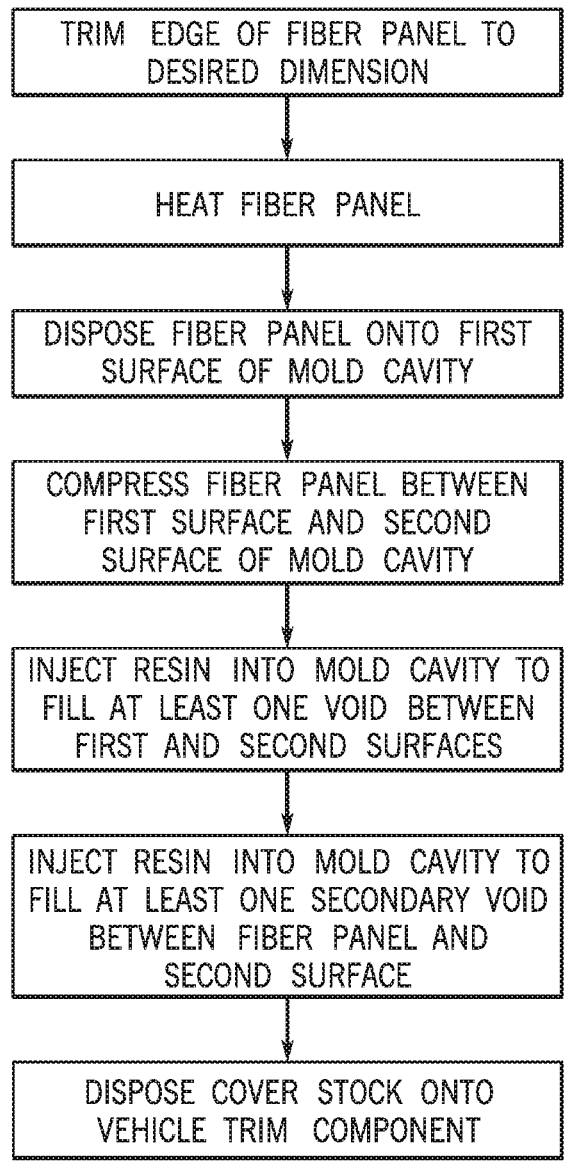
FIG. 11 is a schematic flow diagram of a method for manufacturing a vehicle trim component according to an exemplary embodiment.

As shown schematically, FIG. 11 is a flow diagram of the method of manufacturing vehicle trim components via concurrent compression forming and injection molding according to an exemplary embodiment. The method contains seven steps. During the first step, at least one edge of fiber panel is trimmed to a desired dimension. According to an exemplary embodiment, excess material may be recycled by trimming fiber panel prior to the compression forming process; the excess material may otherwise be deposited in a landfill. Once the fiber panel is trimmed, the panel is heated (i.e. the second step of the method). If the fiber panel includes thermoplastic resin, heating the panel will liquefy the thermoplastic resin and facilitate compression forming of the panel; if fiber panel includes thermoset resin the step of heating fiber panel prior to placing the panel into mold cavity may be obviated. In the third step, fiber panel is disposed onto a first surface of a mold cavity. In the fourth step, fiber panel is compressed between first surface and second surface of mold cavity to form fiber panel into a desired shape. In the fifth step, resin is injected into mold cavity to fill at least one void between first surface and second surface adjacent to fiber panel; resin may fill void extending about a portion of periphery of fiber panel to form a border; resin may fill void corresponding to gap within fiber panel providing a substantially continuous structure. In the sixth step, resin is injected into mold cavity to fill at least one secondary void between fiber panel and second surface. According to an exemplary embodiment, secondary void may be shaped to form an ancillary component (e.g. supporting rib or connector); step five and step six may be performed at the same time by injecting resin into a port that splits into a primary void and a secondary void. In the seventh step, a cover stock may be disposed onto vehicle trim component after interior trim component is removed from the mold cavity.

According to an exemplary embodiment, fiber panel 44 and/or various resin components may be particularly configured to provide a visible surface for trim component 30; cover stock 40 may be obviated to reduce manufacturing costs; mold cavity may be configured to receive multiple fiber panels and to compression mold fiber panels into trim component 30. Multiple resins (e.g. shots of resin) may be injected into mold cavity to form resin components having varying aesthetic and/or structural properties; glass-filled resin may be injected into regions where additional structural support is required; resin may be injected into regions which form a portion of the visible surface; harder and/or softer resins may be injected into various regions to provide the desired texture/structural properties.

According to an exemplary embodiment, resin may be injected through first fluid pathway extending to first surface of mold cavity and through second fluid pathway extending to second surface of mold cavity; a portion of each side of fiber panel may be coated with a layer of resin; resin may be injected through a fluid pathway extending through one surface of mold cavity. The resin may flow through gap in the fiber panel (enabling the resin to coat at least a portion of each side of fiber panel); pressure of the injected resin may induce the formation of a gap that facilitates resin flow through fiber panel 20.

According to an exemplary embodiment, certain components of an airbag assembly may be formed by the concurrent compression forming and injection molding process (e.g. airbag door may include a first half formed by a compression formed fiber panel and a second half formed by an injection molded resin). The airbag door may be configured to separate along the interface between fiber panel and resin component; mold cavity may include a void configured to form an injection molded airbag chute adjacent to the airbag door; additional components (e.g. hinges, reinforcement elements and/or tethers) may be placed into mold cavity prior to the compression forming and injection molding process; components may be integrated into the airbag door as fiber panel is compressed and/or the resin is injection.

According to an exemplary embodiment, trim component 30 may include structurally weakened and/or strengthened regions to provide a desired rigidity and/or to absorb energy associated with an impact (e.g. fiber panel 20 may include scores, seams and/or perforations to enable fiber panel 20 to collapse during an impact, absorbing a portion of the impact energy). Resin ribs coupled to fiber panel may be arranged (e.g. oriented perpendicular to a desired collapse direction) to facilitate a desired degree of energy absorption; scores, seams and/or perforations may be filled with resin to provide a visible surface while enabling trim component to collapse during an impact.

Retractable Pin Assembly for Securing Fiber Panel to Mold

Certain mold assemblies include a first mold element configured to receive a fiber panel and multiple pins configured to penetrate the fiber panel to secure the fiber panel to the first mold element. The pins hold the fiber panel in a desired position and/or orientation, enabling a second mold element to compress the fiber panel against the first mold element to form a component of a desired shape; the pins may leave irregular voids in the fiber panel, establishing a component having an uneven texture; the second mold element may include recesses configured to accommodate the pins extending from first mold element. Forming recesses within the second mold element may increase cost and complexity of the mold assembly.

According to an exemplary embodiment, a mold assembly includes a retractable pin assembly configured to retract holding pins prior to or during compression of a fiber panel, enabling resin to fill voids formed by the holding pins. The component may have a smooth texture. A mold assembly for manufacturing a vehicle trim component includes a first mold element configured to receive a fiber panel; the mold assembly includes a retractable pin assembly having multiple holding pins configured to penetrate the fiber panel to secure the fiber panel to a first mold element; the mold assembly includes a second mold element configured to compress the fiber panel between a first surface of the first mold element and a second surface of the second mold element to form the fiber panel into a desired shape. The retractable pin assembly is configured to withdraw the holding pins from the fiber panel prior to or during compression of the fiber panel between the first surface and the second surface; the mold assembly may include fluid pathways configured to inject resin into voids in the fiber panel formed by the holding pins; a smooth component may be formed when the resin cures and hardens.

As shown schematically, FIG. 12 is a diagram of an embodiment of mold assembly 100 having retractable pin assembly configured to secure fiber panel within mold cavity; mold assembly 100 includes first (e.g. upper) mold element 110 and second (e.g. lower) mold element 120; first mold element 110 includes first surface 110s defining first portion of mold cavity 100c, and second mold element 120 includes second surface 120s defining second portion of mold cavity 100c; first surface 110s is configured to receive fiber panel 140 and second surface 120s is configured to compress fiber panel 140 against first surface 110s to form fiber panel 140 into a desired shape.

According to an exemplary embodiment, fiber panel 140 includes a combination of structural fibers and thermoplastic resin. The structural fibers may include natural fibers (e.g. hemp, wood, flax, kenaf and sisal) and/or synthetic fibers (e.g. glass fibers, carbon fibers and polymeric fibers). The thermoplastic resin may include polypropylene (PP), acrylonitrile butadiene styrene (ABS) and/or polycarbonate (PC) binders; fiber panel 140 may be constructed from about 50 percent natural fibers and about 50 percent polypropylene (PP). To facilitate compression forming, fiber panel 140 is heated (e.g. to about 200 degrees Celsius) to induce the thermoplastic resin to liquefy; fiber panel 140 is disposed onto first surface 110s of the cavity 100c and compressed between first surface 110s and second surface 120s as second mold element 120 is driven toward first mold element 110; as the fiber panel 140 cools within mold assembly 100 the thermoplastic solidifies, establishing a substantially rigid composite panel that conforms to the shape of mold cavity 100c.

According to an exemplary embodiment, fiber panel 140 includes a combination of structural fibers and thermoset resin; structural fibers may include natural fibers (e.g. hemp, wood, flax, kenaf and sisal) and/or synthetic fibers (e.g. glass fibers, carbon fibers and polymeric fibers); thermoset resin may include epoxy resin, polyimide resin, polyester resin and/or vinylester resin. To facilitate compression forming, fiber panel 140 is disposed onto first surface 110s of cavity 100c and compressed between first surface 110s and second surface 120s as second mold element 120 is driven toward first mold element 110; during the compression process panel 140 is heated (e.g. via a heated mold assembly 100) to induce the curing of the thermoset resin; a substantially rigid composite panel that conforms to the shape of the mold cavity 100c is formed.

As shown schematically in FIG. 12, mold assembly 100 includes a retractable pin assembly 130 configured to hold fiber panel 140 in a desired position until second mold element 120 is proximate to first mold element 110; retractable pin assembly 130 includes multiple holding pins 134 configured to penetrate fiber panel 140 to secure fiber panel 140 to first mold element 110. According to an exemplary embodiment, the retractable pin assembly may include more or less holding pins.

According to an exemplary embodiment, the retractable pin assembly 130 is configured to withdraw holding pins from fiber panel 140 prior to or during compression of fiber panel between first surface 110s and second surface 120s; retractable pin assembly 130 may retract holding pins 134 when first surface and second surface are sufficiently close to substantially block movement of fiber panel 140 within mold cavity 100c. According to an exemplary embodiment, holding pins 134 are withdrawn from fiber panel 140 prior to or during compression forming process, resin may be injected into voids formed by the holding pins 134, establishing vehicle trim component having a smooth surface. According to an exemplary embodiment, holding pins 134 retract instead of entering openings within second mold element 120; the cost and/or complexity of the second mold element may be reduced.

As shown schematically in FIG. 12, retractable pin assembly 130 includes return pins 136 configured to drive holding pins 134 to withdraw from fiber panel 140; contact between return pins 136 and a surface of second mold element 120 drives a connecting plate 138 away from first surface 110s; connecting plate 138 drives holding pins 134 to retract; holding pins 134 and return pins 136 are coupled to connecting plate 138 by a suitable connection (e.g. a welded connection, a mechanical interlock or a fastener); according to an exemplary embodiment, retractable pin assembly 130 may include more or less return pins 136.

As shown schematically in FIG. 12, retractable pin assembly 130 includes an actuator 132 configured to extend holding pins 134 after mold elements are separated from one another and fiber panel is removed from mold cavity; according to an exemplary embodiment, actuator may include a pneumatic cylinder configured to drive connecting plate 138 to an initial position that enables holding pins 134 to penetrate a subsequent fiber panel 140; actuator may include a hydraulic cylinder, an electromechanical drive unit or a mechanical actuator.

To secure fiber panel 140 to first mold element 110, fiber panel 140 is moved towards the holding pins 134 such that a pointed end 134e of each holding pin 134 penetrates fiber panel 140; an operator may position fiber panel 140 at a desired position/orientation within mold cavity 100c and move fiber panel 140 toward the first mold element 110 such that holding pins 134 penetrate fiber panel; contact between holding pins 134 and fiber panel 140 secures fiber panel 140 in the desired position/orientation.

Figure 13:
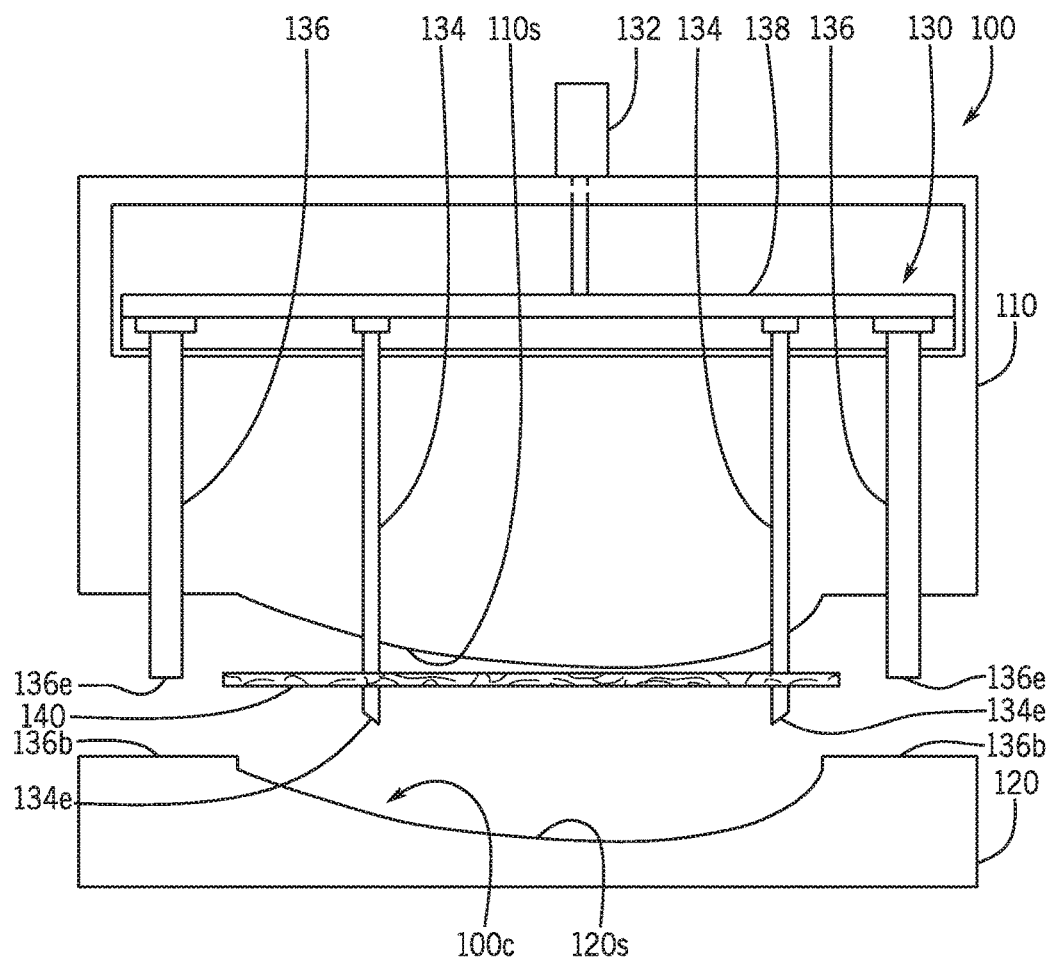
FIG. 13 is a schematic cross-section view of the fiber panel secured on the retractable pins according to an exemplary embodiment.

As shown schematically in FIG. 13, fiber panel 140 is secured to first mold element 110 via holding pins 134; holding pins 134 are configured to secure fiber panel 140 in a desired position/orientation until first surface and second surface are sufficiently close to substantially block movement of fiber panel 140 within mold cavity 100c. Once fiber panel 140 is secured to first mold element 110, second mold element 120 is driven towards the first mold element 110; second mold element 120 is proximate to first mold element 110, a distal end 136e of each return pin 136 contacts a bearing surface 136b of second mold element 120; second mold element 120 continues to move towards the first mold element 110, contact between bearing surface 136b and distal end 136e of each return pin 136 drives connecting plate 138 away from the fiber panel 140; holding pins 134 are driven away from fiber panel 140, withdrawing holding pins 134 from fiber panel 140. According to an exemplary embodiment, holding pins 134 are withdrawn from fiber panel 140 when mold elements are moving towards the closed direction; movement of fiber panel 140 is substantially blocked by first surface 110s and second surface 120.

According to an exemplary embodiment, length of holding pins 134 and/or return pins 136 may be adjusted to control withdrawal of holding pins 134 from fiber panel 140; longer holding pins 134 may secure fiber panel 140 to first mold element 118 until mold elements are closer to one another; shorter holding pins 134 may release fiber panel 140 from first mold element 110 when mold elements are farther apart; longer return pins 136 may induce holding pins 134 to withdraw from fiber panel 140 while mold elements are farther apart; shorter return pins 136 may induce holding pins 134 to secure fiber panel 140 to first mold element 110 until mold elements are closer to one another. Controlling the withdrawal of holding pins 134 may facilitate accurate placement of fiber panel within mold cavity and may control tension within the fiber panel (prior to or during the compression forming process).

As shown schematically in FIG. 14, contact between distal end 136e of each return pin 136 and bearing surface 136b of second mold element drives return pins 136 away from fiber panel 140; connecting plate 138 (which is coupled to return pins 136) drives holding pins 134 away from fiber panel 140, withdrawing holding pins 134 from fiber panel; holding pins 134 are withdrawn from fiber panel 140 and fiber panel 140 is compressed between first surface 110s of first mold element 110 and second surface 120s of second mold element 120.

According to an exemplary embodiment, second mold element 120 is driven away from first mold element 110 after fiber panel is compression-formed into the desired shape; fiber panel 140 is removed from mold cavity 100c (e.g. via an ejection system); actuator 132 drives connecting plate 138 towards the extended position, transitioning holding pins 134 and return pins 136 to an extended position. With holding pins 134 in the extended position, a subsequent fiber panel 140 may be secured to first mold element 110 via penetration of holding pins 134 into fiber panel 140.

As shown schematically in FIG. 14, the embodiment employs an actuator to extend holding pins 134 after fiber panel 140 is removed from mold cavity 100c. According to an exemplary embodiment, other actuating assemblies may be employed. A mechanical linkage between second mold element and holding pins may drive holding pins to extend as second mold element moves away from first mold element; spring may urge holding pins to extend upon movement of second mold element away from first mold element. The distal end of each return pin may be magnetically coupled to the bearing surface of second mold element; movement of second mold element away from first mold element drives return pins and holding pins to the extended position.

Further movement of second mold element away from first mold element overcomes the magnetic coupling between the return pins and second mold element, enabling second mold element to continue movement away from first mold element; mold assembly may include ejector pins to facilitate extraction of fiber panel from mold cavity; movement of the ejector pins may drive the connecting plate towards the extended position, transitioning holding pins 134 to extended position.

According to an exemplary embodiment, an actuator (e.g. hydraulic cylinder, pneumatic cylinder, electromechanical actuator, etc.) may be utilized to transition holding pins between the extended position and retracted position; a sensor may be employed to determine position of second mold element relative to first mold element. A controller coupled to the sensor may control the position of holding pins based on detected position of second mold element; controller may instruct holding pins to retract when second mold element is proximate to first mold element; controller may instruct holding pins to extend as second mold element moves away from first mold element.

Figure 15:
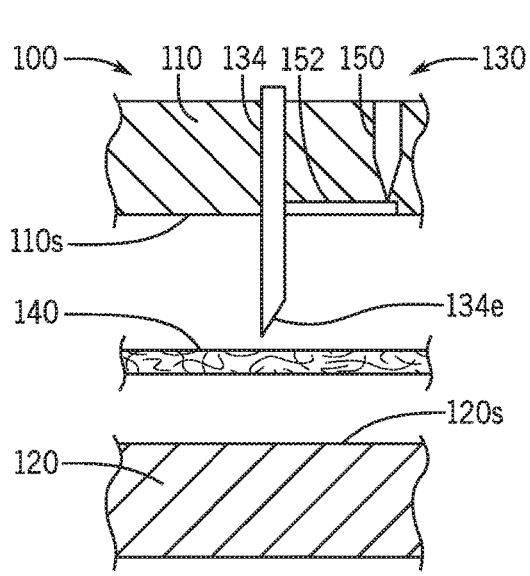
FIG. 15 is a schematic cross-section detail view of a mold apparatus having retractable pins to secure the fiber panel according to an exemplary embodiment.

Shown schematically in FIG. 15 is a diagram of an embodiment of a mold assembly 100 having a fluid pathway configured to inject resin into a void formed by a holding pin; fiber panel 140 is secured to first mold element 110 by moving fiber panel 140 towards the holding pin 134 such that pointed end 134e of holding pin 134 penetrates fiber panel 140; second mold element 120 is driven towards the first mold element 110, inducing retractable pin assembly 130 to withdraw holding pin 134 from fiber panel 140. Holding pin 134 may establish a void in fiber panel 140; mold assembly 100 is configured to flow resin into the void, enhancing the smoothness of vehicle trim component.

First mold element 110 includes a resin manifold 150 and a fluid pathway 152 extending from resin manifold 150 to retractable pin 150; resin manifold 150 and fluid pathway 152 are configured to provide resin to the void formed by holding pin 134; void may be filled with resin, establishing vehicle trim component having a smooth texture.

FIG. 16 is a schematic diagram of mold assembly 100 in which fiber panel 140 is secured to first mold element 110 via holding pin 134; holding pin 134 displaces material as holding pin 134 penetrates fiber panel 140; void is formed within fiber panel 140; void may be filled with resin to establish a vehicle trim component having a smooth texture.

FIG. 17 is a schematic diagram of the mold assembly 100 in which holding pin 134 is retracted; withdrawing holding pin 134 from fiber panel 150 forms a void 140v; fluid pathway 152 is positioned to flow resin from resin manifold 150 into void 140v; resin may be injected through manifold 150 and fluid pathway 152 to fill void 140v, enhancing the smoothness of the vehicle trim component.

Figure 18:
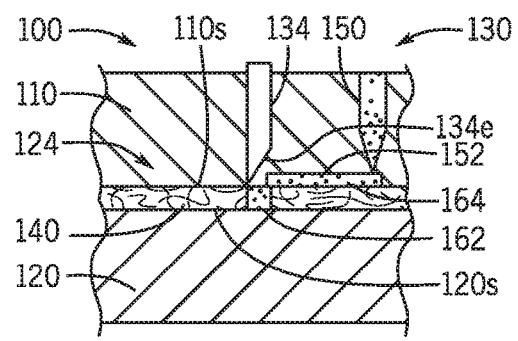
FIG. 18 is a schematic cross-section detail view showing a hole formed from the retractable pin filled by resin according to an exemplary embodiment.

FIG. 18 is a schematic diagram of the mold assembly 100 in which resin is injected into void 140v formed by holding pin 134; resin fills void 140v, forming a resin feature 162 that establishes vehicle trim component having a smooth texture; resin fills fluid pathway 152, establishing a runner or ridge 164 on the rear surface of vehicle trim component; each void within fiber panel may be filled in a similar manner. According to an exemplary embodiment, the voids formed by holding pins are filled with resin, holding pins may be positioned to provide enhanced coupling between fiber panel and first mold element without degrading the smoothness of the vehicle trim component.

Figure 19:
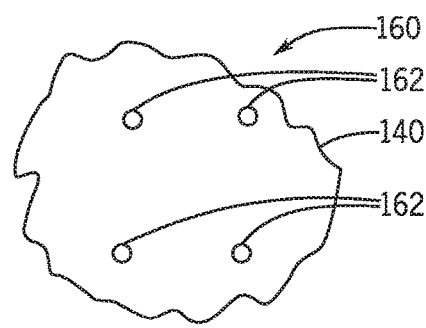
FIG. 19 is a schematic top partial view of a trim component formed by the mold apparatus according to an exemplary embodiment.

As shown schematically in FIG. 19, each void within fiber panel 140 is filled with a resin feature 162, establishing vehicle trim component 160 having a smooth surface; coverstock may be disposed on a surface of fiber panel to form a visible surface. According to an exemplary embodiment, the voids in fiber panel are filled with resin; coverstock may appear to be smooth (enhancing the visual appeal of the vehicle interior).

Figure 20:
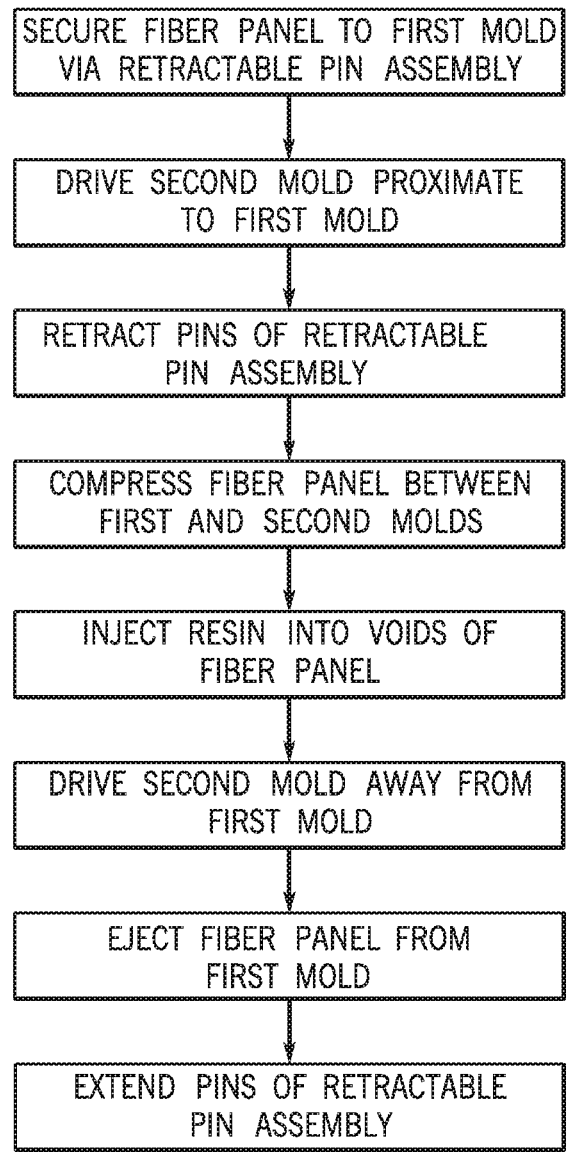
FIG. 20 is a schematic flow diagram of a method for forming a vehicle trim component by a mold apparatus according to an exemplary embodiment.

FIG. 20 is a schematic flow diagram of an embodiment of a method for forming vehicle trim component within mold assembly having a retractable pin assembly. A fiber panel is secured to first mold element via retractable pin assembly; retractable pin assembly includes multiple holding pins configured to penetrate fiber panel to secure fiber panel to first mold element; second mold element is driven toward first mold element; when second mold element is proximate to first mold element, holding pins of retractable pin assembly are retracted; retractable pin assembly may include multiple return pins configured to drive holding pins to withdraw from fiber panel via contact between return pins and second mold element. Fiber panel is compressed between first mold element and second mold element; compressing fiber panel between mold elements forms fiber panel into desired shape; holding pins are retracted (e.g. withdrawn from fiber panel) as fiber panel is compressed between first mold element and second mold element. Resin is injected into voids in fiber panel formed by holding pins; filling voids may establish vehicle interior component having a smooth surface (enhancing the appearance of vehicle interior).

According to an exemplary embodiment, after the compression forming and injection molding process is complete, second mold element is driven away from first mold element; fiber panel is ejected from first mold element (e.g. via ejection pins); holding pins of the retractable pin assembly are extended; retractable pin assembly may include an actuator configured to drive the holding pins toward an extended position, enabling the holding pins to penetrate a subsequent fiber panel.

Resin Feature for Supporting a Bent Edge of a Fiber Panel

According to an exemplary embodiment, a mold assembly may include a first mold element and a second mold element configured to be brought together to compress a fiber panel into a desired shape; mold assemblies may include a trim blade configured to penetrate the fiber panel as the first mold element and the second mold element are brought together to trim the fiber panel to desired dimensions; using an in-mold trim blade to shape the fiber panel may weaken the edges of the panel and reduce longevity.

According to an exemplary embodiment, a mold assembly is configured to inject resin onto adjacent inner surfaces of a bent edge of a fiber panel, enhancing the strength of the edge; the mold assembly for manufacturing vehicle trim component includes a first mold element configured to receive the fiber panel; the mold assembly includes a second mold element configured to compress the fiber panel between a first surface of the first mold element and a second surface of the second mold element to form the fiber panel into a desired shape. The mold assembly includes a fluid pathway configured to inject resin onto adjacent inner surfaces of a bent edge of the fiber panel such that resin extends to a distal end of the bent edge; injecting resin onto the inner surfaces of the bent edge establishes a resin feature that supports the bent edge (enhancing the strength and increasing the longevity of the fiber panel).

FIG. 21 is a schematic diagram of an embodiment of mold assembly 200 having a fluid pathway configured to inject resin onto adjacent inner surfaces of a bent edge of fiber panel; mold assembly 200 includes a first (e.g. lower) mold element 220 and second (e.g. upper) mold element 210; first mold element 220 includes first surface 220s defining first portion of mold cavity 200c and second mold element 210 includes second surface 210c defining second portion of mold cavity 200c; first surface 200s is configured to receive fiber panel 230 and second surface 210c is configured to compress fiber panel 230 against first surface 220s to form fiber panel 230 into a desired shape.

Fiber panel 230 includes a combination of structural fibers and thermoplastic resin. The structural fibers may include natural fibers hemp, wood, flax, kenaf and sisal) and/or synthetic fibers (e.g. glass fibers, carbon fibers and polymeric fibers); thermoplastic resin may include polypropylene (PP), acrylonitrile butadiene styrene (ABS) and/or polycarbonate (PC) binders; fiber panel 230 may be constructed from about 50 percent natural fibers and about 50 percent polypropylene (PP). To facilitate compression forming, fiber panel 230 is heated (e.g. to about 200 degrees Celsius) to induce the thermoplastic resin to liquefy; fiber panel 230 is disposed onto first surface 220s of cavity 200c and compressed between first surface 220s and second surface 210c as second mold element 210 is driven toward first mold element. As fiber panel 230 cools within mold assembly 200 thermoplastic solidifies (creating a substantially rigid composite panel that conforms to the shape of mold cavity 200c).

According to an exemplary embodiment, fiber panel 230 includes a combination of structural fibers and a thermoset resin; structural fibers may include natural fibers (e.g. hemp, wood, flax, kenaf and sisal) and/or synthetic fibers (e.g. glass fibers, carbon fibers and polymeric fibers); thermoset resin may include epoxy resin, polyimide resin, polyester resin and/or vinylester resin. To facilitate compression forming, fiber panel 230 is disposed onto first surface 220s of the cavity 200c and compressed between first surface 220s and second surface 210c as second mold element 210 is driven toward first mold element 220; during the compression process, panel 230 is heated (e.g. via a heated mold assembly 200), inducing the thermoset resin to cure; a substantially rigid composite panel that conforms to the shape of mold cavity 200c is formed.

As shown schematically in FIG. 21, first mold element 220 includes trim blades 220b configured to trim fiber panel 230 to desired dimensions as fiber panel 230 is compressed within mold cavity 200c; second mold element 210 is driven towards the first mold element 220, contact between second mold element 210 and fiber panel 230 drives edges of fiber panel 230 into contact with trim blades 220b. Further movement of second mold element 210 towards the first mold element 220 moves trim blades 220b to penetrate fiber panel 230, trimming fiber panel 230 to desired dimensions. According to an exemplary embodiment, two trim blades 220b are shown in FIG. 21, according to an exemplary embodiment, the first mold element may include more or less trim blades 220b. According to an exemplary embodiment, while trim blades 220b are coupled to first mold element 220 as shown in FIG. 21; at least a portion of trim blades 220b may be coupled to second mold element 210.

The process of trimming fiber panel 230 with trim blades 220b may weaken the edges of fiber panel 230; mold assembly 200 is configured to inject resin onto adjacent inner surfaces of a bent edge of fiber panel 230, enhancing the strength of the edge; second mold element 210 includes a recess 200r configured to establish a void within mold cavity 200c when mold assembly 200 is closed; when mold assembly 200 is closed the void is positioned proximate to adjacent inner surfaces of a bent edge of the fiber panel 230; second mold element includes an inlet 206 and a fluid pathway 208 extending from inlet 206 to the void; fluid pathway 208 is configured to inject the resin into the void such that the resin flows onto adjacent inner surfaces of a bent edge of fiber panel.

FIG. 22 is a schematic diagram of the mold assembly 200 in a closed position. With mold assembly in closed position trim blade 220b penetrates fiber panel 230, trimming the fiber panel to the desired dimensions; recess 200r establishes a void 200v positioned proximate to adjacent inner surfaces of a bent edge of fiber panel 230. When resin is injected into the void 200v (e.g. via inlet 206 and fluid pathway 208), the resin flows onto the adjacent inner surfaces of the bent edge. According to an exemplary embodiment, the void extends to a distal end of the bent edge, the resin flows to the lateral extent of fiber panel 230 (e.g. where trim blade 220b cuts fiber panel 230). Once the resin cures and hardens, a resin feature is formed that supports the bent edge of fiber panel (enhancing the strength and increasing the longevity of the vehicle trim component); void 200v may extend about the entire periphery of fiber panel 230; the void 200v may extend about a portion of the periphery.

Figure 23:
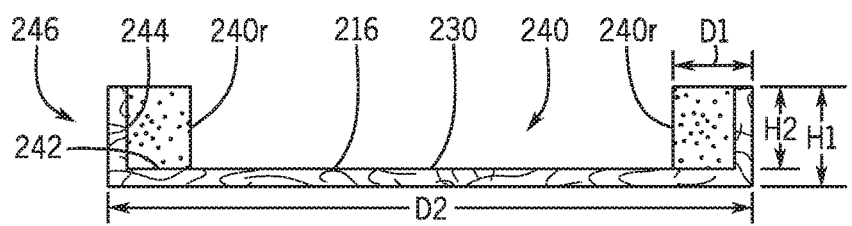
FIG. 23 is a schematic cross-section view of a trim component formed by the mold apparatus according to an exemplary embodiment.

As shown schematically in FIG. 23, vehicle trim component 240 has a resin feature 240r configured to support a bent edge of fiber panel 230; resin feature 240r is injection-molded (e.g. via mold assembly 200 having void 200v) onto an inner surface 216 of the fiber panel 230. When trim component 240 is installed within a vehicle, inner surface 216 faces away from vehicle interior; resin feature 240r supports the bent edge 246 of fiber panel 230 to provide a smooth visible surface (e.g. surface opposite the inner surface 216).

As shown in FIG. 23, resin feature 240r extends between a first inner surface 242 of the bent edge 246 and a second inner surface 244 of the bent edge 246; resin feature 240r extends to a distal end of the bent edge 246; resin feature 240r supports bent edge 246 enhancing the strength of fiber panel 230 and increasing the longevity of vehicle trim component 240; length D2 of fiber panel 230 may be selected based on a desired application; length D1 of resin feature 240r may be particularly selected to provide desired support to the bent edge 246 of fiber panel 230. If vehicle trim component 240 is employed within a door panel, resin feature 240r may have a longer length D1 to accommodate expected loads (e.g. from an occupant pulling on the bent edge 246 to close a vehicle door, from service personnel prying the bent edge 246 away from the door to remove the door panel, etc.). A height H1 of bent edge 246 and a height H2 of resin feature 240r may be selected to provide desired support to the bent edge 246. Longer heights H1 and H2 may enhance the strength of the edge and enable vehicle trim component 240 to accommodate higher loads.

According to an exemplary embodiment, resin feature 240r may extend about the entire periphery of vehicle trim component 240; according to an exemplary embodiment, vehicle trim component 240 may include a resin feature 240r that extends about a portion of the periphery. As shown schematically in FIG. 23, an angle between inner surface 242 and inner surface 244 of bent edge 246 is about 240 degrees. According to an exemplary embodiment, vehicle trim component 212 may include a larger or smaller angle between the inner surfaces; bent edge may be curved or may include multiple angled sections.

Figure 24:
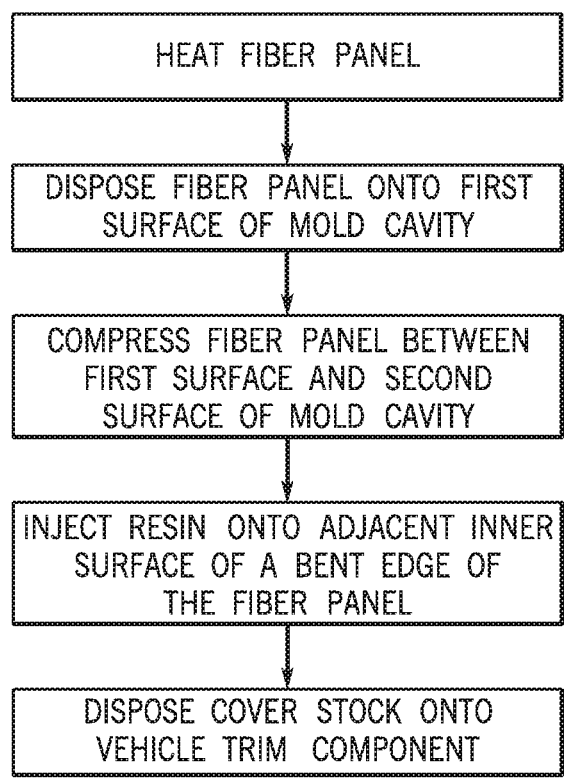
FIG. 24 is a schematic flow diagram of a method for forming a trim component according to an exemplary embodiment.

FIG. 24 is a flow diagram of an embodiment of a method for forming vehicle trim component by injecting resin onto adjacent inner surfaces of a bent edge of fiber panel; fiber panel is heated; if fiber panel includes thermoplastic resin, heating the panel liquefies the resin and facilitates compression forming of the panel; if the fiber panel includes a thermoset resin, the panel may be heated during the compression process. The fiber panel is disposed onto first surface of mold cavity; fiber panel is compressed between first surface and second surface of mold cavity to form fiber panel into a desired shape.

Resin is injected onto adjacent inner surfaces of a bent edge of fiber panel; resin may be injected into a void positioned proximate to the adjacent inner surfaces of the bent edge; void establishes a resin feature that supports the bent edge of fiber panel, increasing the strength of the panel. After interior trim component is removed from mold cavity, a cover stock may be disposed onto the vehicle trim component; fiber panel and/or various resin components may be configured to provide a visible surface for the trim component; cover stock may be obviated, reducing manufacturing costs.

Floating Core Assembly for Urging a Fiber Panel Against a Mold Surface

According to an exemplary embodiment, a mold assembly may include a first mold element and a second mold element configured to be brought together to compress a fiber panel into a desired shape; the second mold element may drive the fiber panel into contact with the first mold element. Further movement of the second mold element relative to the first mold element compresses the fiber panel into the desired shape; a trim blade may be coupled to the first mold element and configured to trim the fiber panel to desired dimensions as the first mold element and the second mold element compress the fiber panel; the second mold element drives the fiber panel into contact with the first mold element; the fiber panel may be caught on the trim blade. According to an exemplary embodiment, the trim blade may tear a portion of the fiber panel, weakening the fiber panel and/or forming a vehicle trim component having an undesirable appearance/texture. According to an exemplary embodiment, when the fiber panel is caught on the trim blade tension may build within the fiber panel as the second mold element continues to move toward the first mold element; the fiber panel is freed from the trim blade releasing tension that may drive the fiber panel to shift within the mold assembly, shifting the fiber panel away from the desired position/orientation.

According to an exemplary embodiment of the mold assembly, a floating core assembly configured to urge the fiber panel against a surface of a mold element before a trim blade penetrates fiber panel; mold assembly for manufacturing vehicle trim component includes a first mold element and a second mold element configured to be brought together to compress a fiber panel into a desired shape; the mold assembly includes a trim blade configured to penetrate the fiber panel as the first mold element and the second mold element are brought together to trim the fiber panel to desired dimensions. The mold assembly includes a floating core assembly coupled to the second mold element and configured to urge the fiber panel against a surface of the first mold element before the trim blade penetrates the fiber panel. According to an exemplary embodiment, the fiber panel is disposed against the surface of the first mold element before the trim blade penetrates the fiber panel, the possibility of the fiber panel being caught on the trim blade is substantially reduced or eliminated; the mold assembly may form a stronger and/or more aesthetically pleasing trim component.

FIG. 25 is a schematic diagram of an embodiment of a mold assembly 250 having a floating core assembly configured to urge fiber panel against surface of mold element; mold assembly 250 includes a first (e.g. lower) mold element 280 and a second (e.g. upper) mold element 270. The first mold element 280 includes a first surface 280s defining a first portion of mold cavity 250c and a second mold element 270 includes a second surface 270s defining a second portion of mold cavity 250c; first surface 280s is configured to receive a fiber panel 256 and a second surface 270s is configured to compress fiber panel 290 against first surface 280s to form fiber panel 290 into a desired shape.

Second mold element 270 includes a floating core assembly 260 having a core 262 and biasing members 264 (e.g. springs); second surface 270s of second mold element 270 is formed by the core 262 of the floating core assembly 260. Prior to compressing fiber panel 290 within mold cavity 250c the core 262 urges fiber panel against first surface 280s of first mold element 280 as second mold element 270 moves towards the first mold element 280; once second surface 270s is in contact with fiber panel 290 and fiber panel 290 is in contact with first surface 280s, further movement of second mold element 270 towards the first mold element 280 moves the core from extended position to retracted position. With the core 262 in the retracted position, biasing members 264 provide sufficient force to compress fiber panel 290 within mold cavity 250c. See FIG. 25.

Fiber panel 290 includes a combination of structural fibers and thermoplastic resin; structural fibers may include natural fibers (e.g. hemp, wood, flax, kenaf and sisal) and/or synthetic fibers (e.g. glass fibers, carbon fibers and polymeric fibers); thermoplastic resin may include polypropylene (PP), acrylonitrile butadiene styrene (ABS) and/or polycarbonate (PC) binders; fiber panel 290 may be constructed from about 50 percent natural fibers and about 50 percent polypropylene (PP). To facilitate compression forming, fiber panel 290 is heated (e.g. to about 200 degrees Celsius) to liquefy the thermoplastic resin; fiber panel 290 is pressed against first surface 280s of cavity 250c and compressed between first surface 280s and second surface 270s as second mold element 270 is driven toward first mold element 280; as fiber panel 290 cools within mold assembly 250 thermoplastic solidifies, establishing a substantially rigid composite panel that conforms to the shape of mold cavity 250c. See FIG. 25.

According to an exemplary embodiment, fiber panel 290 includes a combination of structural fibers and a thermoset resin; structural fibers may include natural fibers (e.g. hemp, wood, flax, kenaf and sisal) and/or synthetic fibers (e.g. glass fibers, carbon fibers and polymeric fibers); thermoset resin may include epoxy resin, polyimide resin, polyester resin and/or vinylester resin. To facilitate compression forming, fiber panel 290 is urged against first surface 280s of cavity 250c and compressed between first surface 280s and second surface 270s as second mold element 270 is driven toward first mold element 280; during the compression process, panel 290 is heated (e.g. via a heated mold assembly 250), to cure the thermoset resin; a substantially rigid composite panel that conforms to the shape of mold cavity 250c is formed.

As shown in FIG. 25, first mold element 280 includes trim blades 266 configured to trite fiber panel 290 to desired dimensions as fiber panel 290 is compressed within mold cavity 250c; movement of second mold element 270 towards the first mold element 280 moves core 262 to retract upon contact between core 262, fiber panel 290 and first surface 280s. As core 262 retracts, a body of second mold element 270 continues to move towards the first mold element 280; contact between the body of second mold element 270 and fiber panel 290 drives edges of fiber panel 290 into contact with trim blades 280b; further movement of second mold element 270 towards the first mold element 280 moves trim blades 280b to penetrate fiber panel 290, trimming fiber panel 290 to the desired dimensions. According to an exemplary embodiment, two trim blades 280b are shown in FIG. 25. According to an exemplary embodiment, a mold assembly may include more or less trim blades 280b. According to an exemplary embodiment, trim blades 280b are coupled to the mold element 280 as shown schematically in FIG. 25; according to an exemplary embodiment, at least a portion of trim blades may be coupled to the second mold element of the mold assembly. According to an exemplary embodiment, fiber panel 290 is disposed against first surface 280s of first mold element 280 before trim blades 280b penetrate fiber panel 290; the possibility of fiber panel 290 being caught on trim blades 280b is substantially reduced or eliminated; fiber panel 290 may remain smooth and properly oriented/positioned during the forming process, establishing a strong and/or aesthetically pleasing trim component.

FIG. 26 is a schematic diagram of the mold assembly 250 in which the core 262 of the floating core assembly 260 is in an extended position and fiber panel 290 is disposed against first surface 280s of first mold element 280; movement of second mold element 248 towards the first mold element 280 drives core 262 to urge fiber panel 290 against first surface 280s of first mold element 280. Once second surface 270s is in contact with fiber panel 290 and fiber panel 290 is in contact with first surface 280s, further movement of the second mold element 270 towards the first mold element 280 moves the core 262 toward the retracted position. As core 262 retracts, biasing members 264 are compressed, increasing the force applied to core 262; force applied by compressed biasing members 264 is sufficient to compress fiber panel 290 into a desired shaped within mold cavity 250c; as the body of second mold element is driven towards the first mold element 280, contact between the body and fiber panel 290 drives edges of fiber panel 290 into contact with trim blades 280b. Further movement of second mold element 270 towards the first mold element 280 moves trim blades 280b to penetrate fiber panel 290, trimming fiber panel 290 to the desired dimensions.

FIG. 27 is a schematic diagram of the mold assembly 250, in which the core 262 of the floating core assembly 260 is in a retracted position. With the core 262 in the retracted position compressed biasing members 264 urge core 262 toward first surface 280s of first mold element 280 with sufficient force to compress fiber panel 290 into a desired shape; bearing surface 272 of second mold element 270 drive fiber panel 290 toward first mold element 280 such that trim blades 280b penetrated fiber panel 290 and trim fiber panel 290 to the desired dimensions. According to an exemplary embodiment, fiber panel 290 is disposed against first surface 280s of first mold element 280 before trim blades 280b penetrate fiber panel 290; the possibility of fiber panel being caught on trim blades 280b is substantially reduced or eliminated; fiber panel 290 may remain smooth and properly oriented/positioned during the forming process (establishing a strong and/or aesthetically pleasing trim component).

According to an exemplary embodiment, the method of manufacturing a vehicle component comprises disposing a fiber panel onto a first surface of a mold cavity, compressing the fiber panel between the first surface and a second surface of the mold cavity to form the fiber panel into a desired shape and injecting resin into the mold cavity to fill at least one void between the first surface and the second surface adjacent to the fiber panel. The method comprises trimming at least one edge of the fiber panel to a desired dimension prior to disposing the fiber panel onto the first surface of the mold cavity and heating the fiber panel prior to disposing the fiber panel onto the first surface of the mold cavity. The fiber panel comprises a plurality of structural fibers and a thermoplastic resin, and heating the fiber panel comprises heating the fiber panel to a temperature sufficient to liquefy the thermoplastic resin; the fiber panel comprises a plurality of structural fibers and a thermoset resin, and heating the fiber panel comprises heating the fiber panel to a temperature sufficient to cure the thermoset resin. Injecting resin into the mold cavity to fill at least one secondary void between the fiber panel and the second surface to form an ancillary component of the vehicle trim component. The at least one void is shaped to form a lap joint between the fiber panel and a resin component. The method comprises removing the vehicle component from the mold cavity and disposing a cover stock onto the vehicle trim component to form a visible surface to vehicle occupants. The at least one void extends about at least a portion of a periphery of the fiber panel; the at least one void corresponds to a gap within the fiber panel, and the gap is enclosed by material of the fiber panel.

According to an exemplary embodiment, the process comprises disposing a fiber panel onto a first surface of a mold cavity, compressing the fiber panel between the first surface and a second surface of the mold cavity to form the fiber panel into a desired shape and injecting resin into the mold cavity to fill at least one void between the first surface and the second surface adjacent to the fiber panel. The process comprises removing the vehicle trim component from the mold cavity, disposing a cover stock onto the vehicle trim component to form a visible surface to vehicle occupants, trimming at least one edge of the fiber panel to a desired dimension prior to disposing the fiber panel onto the first surface of the mold cavity and heating the fiber panel prior to disposing the fiber panel onto the first surface of the mold cavity.

According to an exemplary embodiment, the mold cavity comprises a first surface configured to receive a fiber panel, a second surface configured to compress the fiber panel between the first surface and the second surface to form the fiber panel into a desired shape and at least one fluid pathway configured to inject resin into a void between the first surface and the second surface adjacent to the fiber panel. The at least one void extends about at least a portion of a periphery of the fiber panel; the at least one void corresponds to a gap within the fiber panel, and the gap is enclosed by material of the fiber panel. The mold cavity comprises at least one secondary fluid pathway configured to inject resin into a secondary void between the fiber panel and the second surface to form an ancillary component of the vehicle trim component; the mold cavity is configured to cool the fiber panel to facilitate hardening of a thermoplastic resin, a thermoset resin, or a combination thereof, within the fiber panel; the process comprises injecting resin into the mold cavity to fill at least one secondary void between the fiber panel and the second surface to form an ancillary component of the vehicle trim component.

Exemplary Embodiments—Part 2

Referring generally to the FIGURES, the application discloses various embodiments of vehicle trim components for use in vehicles and methods for producing the vehicle trim components.

According to an exemplary embodiment, a vehicle V includes an interior I having an instrument panel IP, a seat ST, a floor console FC and a door D; certain trim components of instrument panel IP, seat ST, floor console FC, door D, and/or other areas within interior I may be manufactured according to an exemplary embodiment. See FIGS. 1A and 1B.

According to an exemplary embodiment, vehicle trim component 320 can be part of a floor console 300, as shown schematically in FIGS. 28A to 28C. A main body 310 of floor console 300 can have an inner surface configured to receive vehicle trim component 320; vehicle trim component 320 may have ancillary components 332 formed by resin coupled to the compression formed component; ancillary components 332 may be connectors used to attach or align vehicle trim component 320 to or relative to main body 310 (e.g. ancillary components 332 may have apertures A that receive a screw or a projection from main body 310); ancillary components 332 will not be visible to a vehicle occupant when the vehicle trim component is mounted to main body 310. See also FIGS. 33D to 33F.

According to an exemplary embodiment, vehicle trim component 420 can be part of a floor console 400, as shown schematically in FIGS. 28D to 28F; main body 410 of floor console 400 can be configured to receive vehicle trim component 420 and to have connectors 412 to attach or align vehicle trim component 420 to or relative to main body 410; connectors 412 may interact with cover, fiber panel, or resin Ra to attach or align vehicle trim component 420. See also FIGS. 33D to 33F.

According to an exemplary embodiment, vehicle trim component 330 can be part of floor console 300, as shown schematically in FIGS. 29A to 29E; main body 310 of floor console 300 can have an inner surface configured to receive vehicle trim component 330; trim component 330 can have ancillary components 332 formed by resin that forms a border 333 and is coupled to cover 331. Ancillary components 332 may be connectors used to attach or align vehicle trim component 330 to or relative to main body 310; ancillary components 332 may have an apertures A that receive a screw or a projection from main body 310; ancillary components 332 are not visible to a vehicle occupant when the vehicle trim component is mounted to main body 310; vehicle trim component 330 may have ancillary components 334 that are ribs arranged in a honeycomb pattern and provided on fiber panel 335 to enhance strength. See also FIGS. 34A to 34G.

As shown schematically in FIGS. 30A to 30E, vehicle trim component 340 can be part of floor console 300. According to an exemplary embodiment, main body 310 of floor console 300 can have an inner surface configured to receive vehicle trim component 340; fiber panel 345 can project outward from cover 341 so that a portion 342 is visible before mounting vehicle trim component 340 to main body; vehicle trim component 340 can have ancillary components 343 formed by resin coupled to one or more peripheral side surfaces of fiber panel 345. Ancillary components 343 may be connectors used to attach or align vehicle trim component 340 to or relative to main body 310; ancillary components 343 may have apertures A that receive a screw or a projection from main body 310; ancillary components 343 are not visible to a vehicle occupant when vehicle trim component is mounted to main body 310; vehicle trim component 340 may include ancillary components 344 that may be arranged in a honeycomb pattern and provided on fiber panel 345 to enhance strength.

As shown schematically in FIGS. 31A to 31E, vehicle trim component 350 can be part of floor console 300. Main body 310 of floor console 300 can have an inner surface configured to receive vehicle trim component 350; cover 351 can project outward from fiber panel 354; vehicle trim component 350 can have ancillary components 352 formed by resin coupled to fiber panel 354 along a partial or complete border 353 that is formed by resin and is coupled to one or more peripheral side surfaces of fiber panel 354; ancillary components 352 may be connectors used to attach or align vehicle trim component 350 to or relative to main body 310; ancillary components 352 may have apertures A that receive a screw or a projection from the main body 310 (see FIG. 31E); ancillary components 352 will not be visible to a vehicle occupant e the vehicle trim component is mounted to main body 310.

As shown schematically in FIGS. 32A to 32E, vehicle trim component 460 can be part of floor console 400. Main body 410 of floor console 400 can have an outer surface configured to receive vehicle trim component 460; cover 461 can project outward from fiber panel 466. A partial or complete border 465 can be formed by resin; vehicle trim component 460 can have ancillary components 663 formed by a second type of resin coupled to fiber panel 466; ancillary components 463 may be connectors used to attach or align vehicle trim component 460 to or relative to main body 410; ancillary components 463 may have projections 468 that project into apertures A in main body 410; ancillary components 463 will not be visible to a vehicle occupant when vehicle trim component is mounted to main body 410; vehicle trim component 460 may include ancillary components 464 that may be arranged in a honeycomb pattern and provided on fiber panel 466 to enhance strength.

According to an exemplary embodiment, the process for manufacturing a trim component by a compression forming and injection molding may include disposing a cover and a fiber panel relative to one another at respective lateral faces and between a first surface of a mold and a second surface of the mold; the process for manufacturing the trim component by compression forming and injection molding may include compressing fiber panel P and cover C between the first surface and the second surface of the mold to couple fiber panel P and cover C and form a compression formed component having a shape; the shape of the compression formed component corresponds to a first contour f the first surface and a second contour of the second surface. The method includes injecting resin into the mold after the compression formed component is formed to fill at least one void disposed adjacent to the compression formed component (e.g. adjacent to at least one of cover and fiber panel); the vehicle trim component can then be removed from the mold.

The compression forming and injection molding process may facilitate formation of a trim component having dimensionally accurate edges, obviating the post-molding trimming process. Due to the dimensional accuracy of the mold cavity, each edge of the resultant trim component substantially corresponds to the desired dimensions; process of trimming the edges of the component after formation may be obviated, decreasing the duration of the manufacturing process and reducing the quantity of excess material that may otherwise be deposited in a landfill; adhesion between cover C and fiber panel P may be improved as compared to bonding cover C to fiber panel P via adhesives in a separate process step, obviating the "wrap around" process which saves material and reduces the duration of the manufacturing process. By forming fiber panel and molding certain ancillary components within a single mold cavity, the duration of the manufacturing process may be substantially reduced as compared to processes that include first compression mold and second injection mold.

As shown schematically in FIGS. 33A to 33F, mold may include a first (e.g. top) mold element MT and a second (e.g. bottom) mold element MB; first mold element MT includes a first surface Sa defining a first portion of the mold cavity and second mold element MB includes a second surface Sb defining a second portion of the mold cavity; first surface Sa is configured to receive fiber panel P and second surface Sb is configured to receive cover C. First mold element MT and second mold element MB can be moved from an open position (see FIG. 33A) to a closed position (see FIG. 33C) to compress fiber panel P and cover C against first surface Sa and second surface Sb to form fiber panel P and cover C into a compression formed component having a desired shape. According to an exemplary embodiment, the mold cavity formed by first mold element MT and second mold element MB may include first void Va and second void Vb into which resin Ra and resin Rb can be injected to form features of vehicle trim component.

According to an exemplary embodiment, cover C and fiber panel P are trimmed or cut to desired size(s) and shape(s) for the vehicle trim component to establish the visible surface of final trim component; cover C is trimmed to substantially conform to the desired end size; the material used to form the visible surface may be reduced; the additional steps for trimming the cover may be reduced or eliminated after the formation of the trim component. According to an exemplary embodiment, fiber panel P is trimmed prior to the compression forming process; the excess material may be recycled. According to an exemplary embodiment, recycling post-formation excess material may be difficult or impossible because resin within fiber panel has cured/hardened and/or resin has bonded to structural fibers.

As shown schematically in FIG. 33A, first mold element MT and second mold element MB are in the open position; fiber panel P and cover C can be disposed relative to one another at their respective lateral faces and between first surface Sa and second surface Sb; cover C can be disposed on second surface Sb of second mold element MB and fiber panel P can be disposed on cover C.

According to an exemplary embodiment, fiber panel P may include a thermoplastic resin; fiber panel P may be heated (e.g. to about 201 degrees Celsius) before fiber panel P is disposed in the mold to liquefy the thermoplastic resin; fiber panel P is disposed onto cover C; fiber panel P and cover C are disposed between first surface Sa and second surface Sb; the mold is moved from open position (see FIG. 33A) to closed position (see FIG. 33C) to compress fiber panel P and cover C between first surface Sa and second surface Sb and pressure couple fiber panel P and cover C. As fiber panel P cools within the mold the thermoplastic resin solidifies, bonding cover C to fiber panel P and forming a substantially rigid compression formed component that conforms to the shape of mold cavity (e.g. the shape corresponds to first contour of first surface Sa and second contour of second surface Sb); shape of the compression formed component is different than the original shape of fiber panel P. See FIGS. 33A and 33C.

According to other exemplary embodiments, when fiber panel P includes a thermoset resin, fiber panel P and cover C can be disposed between first surface Sa and second surface Sb; mold is moved from open position (see FIG. 33A) to closed position (see FIG. 33C) to compress fiber panel P and cover C between first surface Sa and second surface Sb and pressure couple fiber panel P and cover C. During the compression process, panel P is heated (by conventional mechanisms for heating first mold element MT and/or second mold element MB) to induce thermoset resin to cure and adhere to cover C; a rigid compression formed component that conforms to the shape of mold cavity is formed (e.g. the shape corresponds to first contour of first surface Sa and second contour of second surface Sb); the shape of the compression formed component is different than the original shape of fiber panel P.

According to an exemplary embodiment, bonding cover C to fiber panel P in mold may reduce the duration of the manufacturing process by eliminating a second processing step; compression formed component may have greater durability than bonding cover C to fiber panel P with an adhesive; quantity of cover C used may be reduced by bonding cover C to fiber panel P in mold (e.g. cover C may be cut to a shape substantially corresponding to a visible surface of trim component before being placed in mold). The quantity of material utilized from cover C may be reduced, as compared to processes in which cover C is adhered to trim component after forming (e.g. in conventional techniques where cover is applied after fiber panel is formed in mold, cover may be wrapped substantially around a visible surface of fiber panel to a back side (e.g. non-visible surface) of the trim component). The cover on the back side of fiber panel may not be visible after installation of trim component within vehicle V; larger quantities of cover material are utilized in embodiments in which cover is placed on fiber panel after the compression forming and injection molding processes are complete; wrapping cover around fiber panel may block or cover connectors disposed on fiber panel, potentially adding additional trimming steps to remove the blockages.

According to an exemplary embodiment, a scrim layer may be positioned on the non-visible side of cover C (e.g. between cover C and fiber panel P); scrim layer may block penetration of resin from fiber panel P into a surface layer of cover C; scrim layer may substantially insulate the surface layer from the heat of fiber panel P; scrim layer may be a polyurethane layer configured to provide heat and/or acoustic insulation between cover C and fiber panel P.

According to an exemplary embodiment, the method of forming the vehicle trim component includes injecting resin into mold after the compression formed component is formed to fill at least one first void disposed adjacent to the compression formed component; at least one void can be disposed adjacent at least one of a peripheral side surface and an interior side surface of the cover and/or fiber panel; at least one void can bid disposed adjacent other portions of the compression formed component.

As shown schematically in FIG. 33D, resin Ra is injected into mold cavity (e.g. via a port PTa) to fill at least one first void Va; the at least one first void Va may be implemented in a variety of configurations (based on desired result); the at least one first void Va can be disposed between first surface Sa and second surface Sb adjacent to the compression formed component. According to an exemplary embodiment, the at least one first void Va may be disposed between the compression formed component and the first surface Sa or second surface Sb; at least one first void Va may include a void adjacent to the cover and/or fiber panel; at least one first void Va may include void or gap within fiber panel P and gap is enclosed by material of fiber panel P. According to an exemplary embodiment, first void Va extends at least partly along at least one of peripheral side surface 530, peripheral side surface 532 and interior side surface 534 of at least one of cover C and compressed fiber panel P; the at least one first void Va may extends about at least a portion of a periphery of cover C and/or fiber panel P such that injecting resin into mold forms a border disposed about the at least a portion of the periphery of cover C and/or fiber panel P. According to an exemplary embodiment, the border may be configured for attaching vehicle component to vehicle and/or a second vehicle trim component.

Figure 33E:
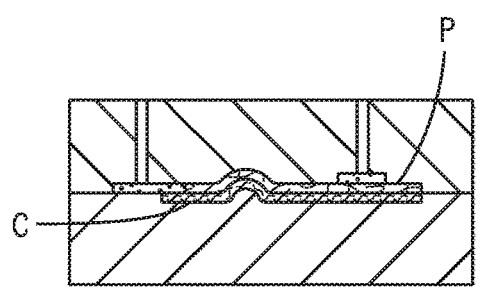
FIG. 33E is a schematic cross-section view of resin being cured according to an exemplary embodiment.
Figure 33F:
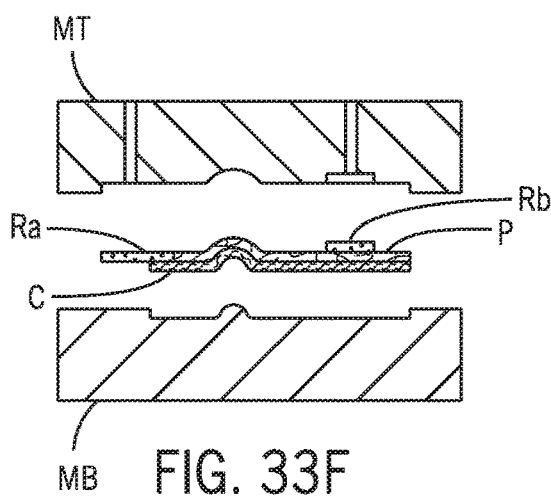
FIG. 33F is a schematic cross-section view of a vehicle interior trim component formed by a process according to an exemplary embodiment.

As shown schematically in FIGS. 33E and 33F, injected resin Ra fills first void Va and establishes a border, component, element, feature, etc., as resin hardens and/or cures. In the case of forming a border, due to the dimensional accuracy of mold cavity, each edge of the resultant trim component will substantially corresponds to the desired dimensions; the process of trimming the edges of the component after formation may be obviated, decreasing the duration of the manufacturing process and reducing the quantity of excess material that may otherwise be deposited in a landfill.

As shown schematically in FIG. 33D, resin is injected into mold after the compression formed component is formed to fill at least one second void Vb between the compression formed component and first surface Sa and/or second surface Sb to form an ancillary component of the vehicle trim component; resin Rb is injected via a port PTb into at least one second void Vb between fiber panel P and first surface Sa to form an ancillary component of vehicle trim component (e.g. mold cavity may include multiple second voids Vb configured to establish ribs along a surface of fiber panel P). Ribs are configured to support vehicle trim component, providing a stronger component and/or reducing the weight of the component by facilitating a reduction in fiber panel thickness; ancillary components can be attachment mechanisms configured to attach vehicle trim component to vehicle or to other vehicle trim components. According to an exemplary embodiment, fiber panel and the ancillary components are formed within a single mold cavity, the process of transferring the part between a compression mold and an injection mold is obviated; the duration of the manufacturing process is reduced; employing a single mold reduces design and manufacturing costs, as compared to producing first mold for the compression forming process and second mold for the injection molding process.

After resin Ra and/or resin Rb has been injected and cured, first mold element MT and second mold element MB can be moved to the open position (see FIG. 33F) and vehicle trim component can be removed from mold.

According to an exemplary embodiment, both types of resin are injected through different ports PTa and PTb to fill first void Va and second void Vb; the resin may be injected through a single port to fill both the first void Va and second void Vb.

As shown schematically in FIGS. 33A to 33F, the vehicle trim component may include a compression formed component including a cover (or coverstock) C that is pressure coupled to a fiber panel P/30; cover C/40 can be pressure coupled to the compressed fiber panel P along respective lateral faces (e.g. lateral face of cover C and lateral face of fiber panel P). According to an exemplary embodiment, pressure coupling is referred to as coupling that is facilitated by use of pressure; pressure coupling is referred to as coupling aided by adhesive or other means that is subjected to compression of cover C toward fiber panel P. See also FIGS. 5 and 6.

According to exemplary embodiments, vehicle trim components 510, 511, 512, 513, 514, 515 and 516 are shown schematically in FIGS. 34A to 34G. As shown schematically in FIGS. 34A to 34G, cover C of the vehicle trim component may be provided on at least a portion of fiber panel P to provide a desired appearance on the surface intended to be visible to the occupant of vehicle V. Cover C may establish a visible surface that matches vehicle interior I, enhancing the appearance of the trim component; cover C may extend over a portion of fiber panel P (FIG. 34A); cover C may be coextensive with fiber panel P (see FIGS. 34C and 34D); cover C may extend beyond the ends of fiber panel P (see FIGS. 34B, 34E, 34F and 34G). According to an exemplary embodiment, cover C/40 for fiber panel P/30 may include or may consist of a woven fabric, a non-woven fabric, an appliqué, vinyl, foam, foil, leather or a combination. See generally FIGS. 5, 6 and 34A-34G.

According to an exemplary embodiment, fiber panel P of the vehicle trim component may be used to provide a form and a desired level of structural rigidity for the vehicle trim component; fiber panel P includes a combination of structural fibers and resin; structural fibers may include natural fibers (e.g. hemp, wood, flax, kenaf, and sisal) and/or synthetic fibers (e.g. glass fibers, carbon fibers, and polymeric fibers). According to an exemplary embodiment, fiber panel P may be constructed from about 50 percent natural fibers and about 50 percent polypropylene (PP). According to an exemplary embodiment, the resin of fiber panel P may include a thermoplastic resin (e.g. polypropylene (PP), acrylonitrile butadiene styrene (ABS), and/or polycarbonate (PC) binders); the resin of fiber panel P may include a thermoset resin (e.g. epoxy resin, polyimide resin, polyester resin, and/or vinylester resin). See FIGS. 34A to 34G.

According to an exemplary embodiment, the vehicle trim component may include a resin Ra and a resin Rb that has been coupled via injection molding to cover C and/or fiber panel P; resin Ra and resin Rb may include a thermoplastic material (e.g. polypropylene (PP), acrylonitrile butadiene styrene (ABS), or polycarbonate (PC)); resin may include a thermoset material (e.g. epoxy resin, polyimide resin, polyester resin, or vinylester resin). See FIGS. 34A to 34G.

As shown schematically in FIGS. 34A to 34G, resin Ra may be coupled to at least one of a peripheral side surface 530, a peripheral side surface 532 and an interior side surface 534 of at least one of cover C and compressed fiber panel P. According to an exemplary embodiment, the resin may provide a full or partial frame or border for the vehicle trim component; the resin can be efficiently placed for desired structure, rigidity, appearance and/or other desired features. According to an exemplary embodiment, the resin may be used to form other features (e.g. attachment or alignment features); other features may be provided on or an integral part of the border.

As shown schematically in FIGS. 34A to 34F, the vehicle trim component may include injection-molded resin to provide an ancillary component. According to an exemplary embodiment, ancillary component may be a rib, honeycomb or other strengthening structure. The strengthening structure may be configured to support the fiber panel, providing a stronger trim component and/or reducing the weight of trim component by facilitating a reduction in fiber panel thickness; strengthening structure may extend across the interface between the fiber panel and the border formed by the resin (to enhance the strength of the panel/border interface); strengthening structure may be arranged or configured (e.g. oriented perpendicular to a desired collapse direction) to facilitate a desired degree or direction of energy absorption.

According to an exemplary embodiment, the ancillary component may be other features (e.g. connector, attachment or alignment features (such as holes, pins, mounts, etc.)); connectors, attachment or alignment features can be configured to facilitate coupling between trim component and another surface (e.g. door frame, instrument panel support structure, etc.) within interior I of vehicle V. Resin Rb may have a composition that is the same as or different from resin Ra; resin Rb can be efficiently placed for desired structure, rigidity, appearance and/or other desired features.

Figure 34A:
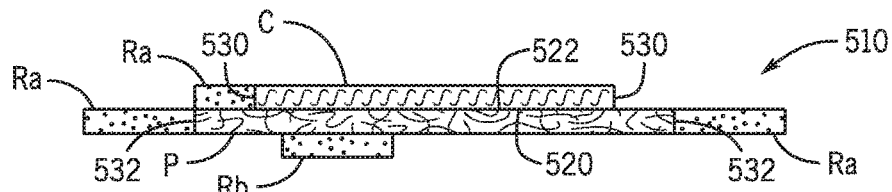
FIGS. 34A to 34G are schematic cross-section views of exemplary vehicle interior trim components according to an exemplary embodiment.
Figure 34B:
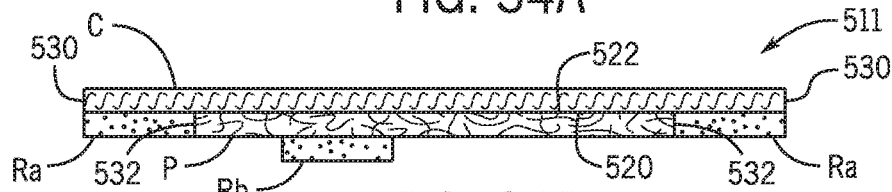
Figure 34C:
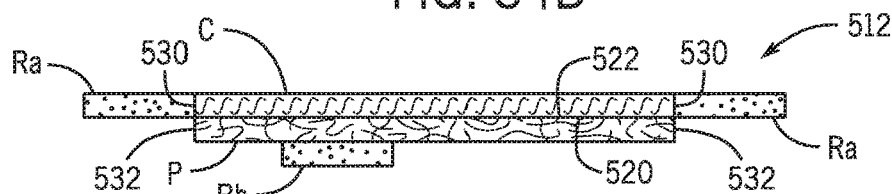
Figure 34D:
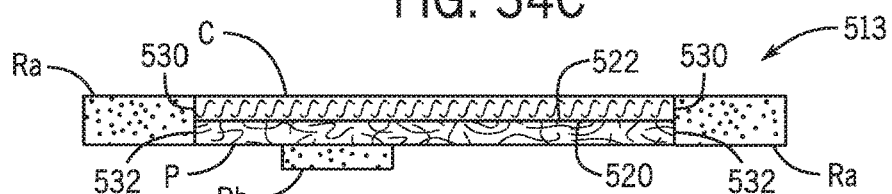
Figure 34E:
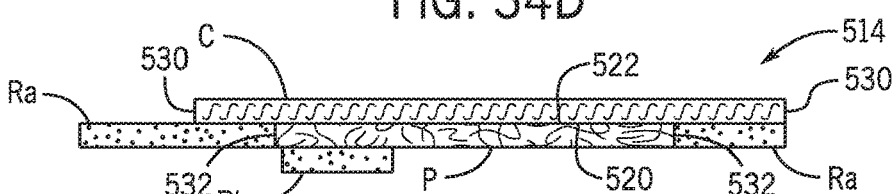
Figure 34F:
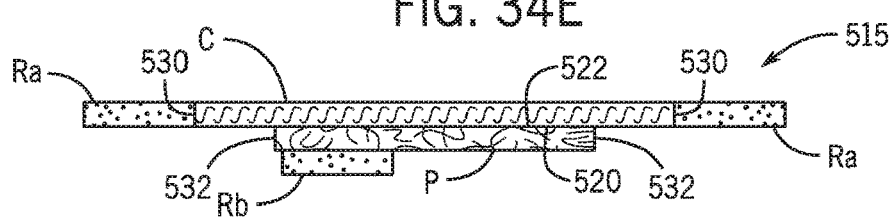
Figure 34G:
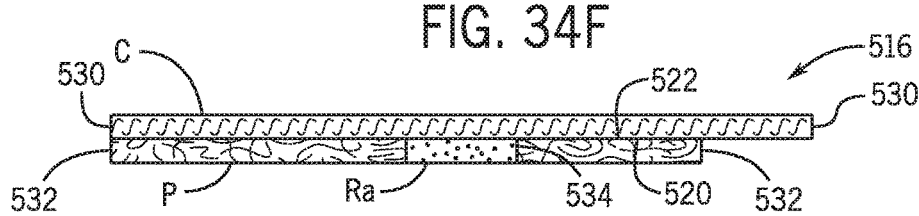

According to an exemplary embodiment, resin Ra may be coupled to peripheral side surface 530 of cover C (see FIGS. 34A, 34C and 34F); resin Ra may be coupled to peripheral side surface 532 of compressed fiber panel P (see FIGS. 34A, 34B and 34E); resin Ra may be coupled to (and across) peripheral side surfaces 530 and peripheral side surface 532 of both cover C and compressed fiber panel P (see FIG. 34D). According to an exemplary embodiment, resin Ra may be coupled to an interior side surface 534 of at least one of cover C and compressed fiber panel P. As shown schematically in FIG. 34G, interior side surface 534 of compressed fiber panel P; according to an exemplary embodiment, a similar interior side surface could be provided on cover C alone or on both cover C and compressed fiber panel P; cover C can be sized to substantially cover or not cover resin Ra. As shown schematically in FIGS. 34A to 34G, injection-molded resin Rb (providing the ancillary component) is shown coupled to a lateral face of fiber panel P; the ancillary components could be provided at other locations (e.g. coupled to cover C or as part of resin Ra that is coupled to peripheral or interior side surface 530, peripheral or interior side surface 532 and/or peripheral or interior side surface 534.

Resin Ra and resin Rb may be the same or different resins and may be formed at the same or different times on cover C and fiber panel P.

According to an exemplary embodiment, a vehicle trim component is prepared by a process that includes disposing a cover onto a first surface of a mold, disposing a fiber panel onto the cover and compressing the fiber panel and cover between the first surface and a second surface of the mold to couple the fiber panel and cover and form the fiber panel into a compression formed component having a shape. The shape corresponds to a first contour of the first surface and a second contour of the second surface. Resin is injected into the mold after the compression formed component is formed to fill at least one first void and the vehicle trim component is removed from mold.

According to an exemplary embodiment, a vehicle trim component includes a fiber panel, a cover coupled to the fiber panel and resin coupled to at least one of the cover and the fiber panel.

According to an exemplary embodiment, the method of forming a vehicle trim component includes disposing a cover and a fiber panel relative to one another at respective lateral faces and between a first surface of a mold and a second surface of the mold and compressing the fiber panel and the cover between the first surface and the second surface of the mold to couple the fiber panel and the cover and form a compression formed component having a shape; the shape corresponds to a first contour of the first surface and a second contour of the second surface. The method further includes injecting resin into the mold after the compression formed component is formed to fill at least one first void disposed adjacent to at least one of a peripheral side surface and an interior side surface of at least one of the cover and the fiber panel and removing the vehicle trim component from mold.

According to an exemplary embodiment, a vehicle trim component is prepared by a process. The process comprises disposing a cover onto a first surface of a mold; disposing a fiber panel onto the cover; compressing the fiber panel and the cover between the first surface and a second surface of the mold to couple the fiber panel and the cover and form the fiber panel into a compression formed component having a shape wherein the shape corresponds to a first contour of the first surface and a second contour of the second surface; injecting resin into the mold after the compression formed component s formed to fill at least one first void; and removing the vehicle trim component from the mold. The at least one first void comprises a void between the first surface and the second surface adjacent to the cover; the at least one first void extends about at least a portion of a periphery of the cover such that injecting resin into the mold forms a border disposed about the at least the portion of the periphery of the cover; the border is configured for attaching the vehicle trim component to a second vehicle trim component. The process further comprises injecting resin into the mold after the compression formed component is formed to fill at least one second void between the compression formed component and the second surface to form an ancillary component of the vehicle trim component; the at least one first void comprises a void between the first surface and the second surface adjacent to the compression formed component. The at least one first void extends about at least a portion of a periphery of the compression formed component such that injecting resin into the mold forms a border disposed about the at least the portion of the periphery of the compression formed component; the border is configured for attaching the vehicle trim component to a second vehicle trim component. The process further comprises injecting resin into the mold after the compression formed component is formed to fill at least one second void between the compression formed component and the second surface to form an ancillary component of the vehicle trim component; the at least one first void comprises a void between the second surface and the cover adjacent to the compression formed component; the at least one first void extends about at least a portion of a periphery of the compression formed component such that injecting resin into the mold forms a border disposed about the at least the portion of the periphery of the compression formed component; the border is configured for attaching the vehicle trim component to a second vehicle trim component. The process further comprises injecting resin into the mold after the compression formed component is formed to fill at least one second void between the compression formed component and the second surface to form an ancillary component of the vehicle trim component; the at least one first void corresponds to a gap within the fiber panel and the gap is enclosed by material of the fiber panel; the fiber panel comprises a plurality of fibers and a thermoplastic resin; the fiber panel is heated to a temperature to at least partially liquefy the thermoplastic resin, the fiber panel is disposed into the mold after the fiber panel is heated; the fiber panel is cooled in the mold to solidify the thermoplastic resin and to form the fiber panel into the compression formed component. The fiber panel comprises a plurality of fibers and a thermoset resin; the mold is heated to cure the thermoset resin and to form the fiber panel into the compression formed component; the shape of the compression formed component is different than an original shape of the fiber panel. Coupling the fiber panel and the cover comprises bonding the fiber panel and the cover; the cover is comprised of at least one of (a) woven fabric, (b) non-woven fabric, (c) an applique, (d) vinyl, (e) foam, (f) foil, and (g) leather.

According to an exemplary embodiment, the vehicle trim component comprises a fiber panel, a cover coupled to the fiber panel and resin coupled to at least one of the cover and the fiber panel; the cover is pressure coupled to the fiber panel along respective lateral faces to provide a compression formed component. The resin is coupled to at least one of a peripheral side surface and an interior side surface of at least one of the cover and the fiber panel; the resin is coupled to the cover; the resin is coupled to the fiber panel; the resin is coupled to the fiber panel in a gap within the fiber panel; the resin forms a border disposed about at least a portion of the periphery of the at least one of the fiber panel and the cover to which the resin is coupled; the border is configured for attaching the vehicle trim component to a second vehicle trim component. The vehicle trim component comprises an ancillary component coupled to the compression formed component.

According to an exemplary embodiment, the vehicle trim component comprises disposing a cover and a fiber panel relative to one another at respective lateral faces and between a first surface of a mold and a second surface of a mold; compressing the fiber panel and the cover between the first surface and the second surface of the mold to couple the fiber panel and the cover and form a compression formed component having a shape; the shape corresponds to a first contour of the first surface and a second contour of the second surface; injecting resin into the mold after the compression formed component is formed to fill at least one first void disposed adjacent to at least one of a peripheral side surface and an interior side surface of at least one of the cover and the fiber panel; and removing the vehicle trim component from the mold.

The present invention relates to a vehicle trim component. The vehicle trim component comprises a panel comprised of fibers and an ancillary component coupled to the panel comprised of resin and fibers. The ancillary component may comprise a resin portion comprising resin and a combined portion comprising resin and fibers. The fiber panel may comprise a plurality of fibers and a thermoplastic resin.

The present invention also relates to a vehicle trim component prepared by a process. The process comprises disposing a fiber panel onto a first surface of a mold, compressing a first portion of the fiber panel between the first surface and a second surface of the mold to form the fiber panel into a compression formed component, injecting resin into the mold after the compression formed component is formed to fill at least one void between the second surface of the mold and an uncompressed portion of the fiber panel and removing the vehicle trim component from the mold cavity. The resin combines with the uncompressed portion of the fiber panel to form an ancillary component coupled to the compression formed component; the ancillary component may comprise a resin portion comprised of resin and a combined portion comprised of resin and fiber mat. At least one void is configured to form an ancillary component of the vehicle trim component. The fiber panel may comprise a plurality of fibers and a thermoplastic resin; the fiber panel is heated to a temperature to at least partially liquefy the thermoplastic resin and form the fiber panel into the compression formed component.

The present invention further relates to a method of making a vehicle trim component prepared by a process. The method comprises the steps of disposing a fiber panel onto a first surface of a mold, compressing a first portion of the fiber panel between the first surface and a second surface of the mold to form the fiber panel into a compression formed component, injecting resin into the mold after the compression formed component is formed to fill at least one void between the second surface of the mold and an uncompressed portion of the fiber panel and removing the vehicle trim component from the mold cavity. The resin combines with the uncompressed portion of the fiber panel to form an ancillary component coupled to the compression formed component; the ancillary component may comprise a resin portion comprised of resin and a combined portion comprised of resin and fiber at; the a least one void may be configured to form an ancillary component of the vehicle trim component. The fiber panel may comprise a plurality of fibers and a thermoplastic resin; the fiber panel may be heated to a temperature to at least partially liquefy the thermoplastic resin and form the fiber panel into the compression formed component.

The present invention relates to a vehicle trim component. The vehicle trim component comprises a panel comprised of fibers; the panel comprises a notch and at least one protrusion adjacent the notch; the notch is configured to direct deployment of an airbag through the panel. The protrusion is configured to provide a relief for the notch; the protrusion is configured to direct deployment of an airbag through the panel. The vehicle trim component further comprising a rib adjacent the notch; the rib is configured to direct deployment of the airbag through the panel; the rib is formed on the panel; the rib comprises resin.

The present invention also relates to a vehicle trim component prepared by a process. The vehicle trim component comprises disposing a fiber panel onto a first surface of a mold, compressing a first portion of the fiber panel between the first surface and a second surface of the mold to form the fiber panel into a compression formed component, forming a second portion of the fiber panel between the first surface and a second surface of the mold to form a notch in the fiber panel and at least one protrusion in the fiber panel and removing the vehicle trim component from the mold cavity. The panel comprises a notch and at least one protrusion adjacent the notch; the at least one depression is formed in response to forming of the notch. The fiber panel comprises a plurality of fibers and a thermoplastic resin; the fiber panel is heated to a temperature to at least partially liquefy the thermoplastic resin and form the fiber panel into the compression formed component.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the system and method of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention is not limited to the embodiments as described; they are rather to be understood as being examples. Modifications and amendments of individual features will be familiar to the person skilled in the art. Besides those embodiments depicted in the figures and described in the description, other embodiments of the present invention are contemplated. Any single feature of one embodiment of the present invention may be used in any other embodiment of the present invention. Given the disclosure of the present invention, one versed in the art would appreciate that there may be other embodiments and modifications within the scope and spirit of the invention. All modifications attainable by one versed in the art from the present invention within the scope and spirit of the present invention are to be included as further embodiments of the present invention.

The terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. These terms should be interpreted as indicating that insubstantial or inconsequential modifications or alterations of the subject matter described and claimed are considered to be within the scope of the invention as recited in the appended claims.

The terms "coupled," "connected," etc., mean the joining of two members directly or indirectly to one another. Joining may be stationary (e.g. permanent) or moveable (e.g. removable or releasable); joining may be achieved with the two members or the two members and any additional intermediate members being integrally formed as a single unitary body with one another or with the two members or the two members and any additional intermediate members being attached to one another.

References to the positions of elements (e.g. "top," "bottom," "above," "below," etc.) are merely used to describe the orientation of various elements in the figures; orientation of various elements may differ according to other exemplary embodiments and variations are intended to be encompassed by the present disclosure.

The construction and arrangement of the elements of the panels, molded bodies, tooling, etc. as shown in the exemplary embodiments are illustrative only. Although only a few embodiments of the present disclosure have been described in detail, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter recited. Elements shown as integrally formed may be constructed of multiple parts or elements, the position of elements may be reversed or otherwise varied and the nature or number of discrete elements or positions may be altered or varied.

The word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Use of the word "exemplary" is intended to present concepts in a concrete manner. All such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may be made in the design, operating conditions and arrangement of the various exemplary embodiments without departing from the scope of the present invention. Any element (e.g. panel, molded body, tooling part, etc.) disclosed in one embodiment may be incorporated or utilized with any other embodiment disclosed herein. The order or sequence of any process or method steps may be varied or re-sequenced according to alternative embodiments. Other substitutions, modifications, changes and omissions may be made in the design, operating configuration, and arrangement of the preferred and other exemplary embodiments without departing from the scope of the appended claims.

According to exemplary and alternative embodiments, the methods and systems can be used to produce a wide variety of component forms and provide a wide variety of effects, for example, enhanced strength/material properties (e.g. by material selection, fiber selection/orientation, etc.), reduced weight/mass properties (e.g. by forming with composite or layered material, with voids, etc.), visual/decorative effects (e.g. color, color gradations, differing or multi-color fibers/additives, variations in surface effect, translucence, simulated stitching, simulated effects, etc.), environmental-friendly composition (e.g. use of scrap and/or recycled materials/fibers), alternative geometries/shapes (e.g. with strengthening/reinforcement such as with fiber), cost (e.g. using combinations of bulk and/or high performance materials selectively), function/performance (e.g. using materials/fibers and fiber orientation to enhance functionality such as strength, cycle life, resilience, stain/wear resistance, etc. By variations of the constituents of the component formed by the system and method. According to any of the embodiments, layers or materials can be formed as or on a substrate or base. As shown in the figures, any of a wide variety of components can be formed, including but not limited to a wide variety of automotive interior components and assemblies instrument panels, consoles, door panels, trim, inserts, decorative elements, lighting, functional modules, containers, and covers) and various other modules/components of components and assemblies.

The invention claimed is:

1. A trim component for a vehicle interior comprising:
a fiber panel;
a structure comprising a resin; and
a cover coupled to at least one of (a) the fiber panel, (b) the structure;
wherein the fiber panel comprises a compression formed component;
wherein the compression formed component comprises an edge along a periphery and provides a structural substrate having a shape and a thickness along the edge;
wherein the structure comprises a border of the structural substrate along the thickness of the structural substrate provided by the compression formed component.

2. The trim component of claim 1 wherein the fiber panel comprises a plurality of fibers and a resin configured to bind the fibers; and wherein the structure comprises a molded resin.

3. The trim component of claim 1 wherein the structure provides a border formed about at least a portion of a periphery of the fiber panel.

4. The trim component of claim 3 wherein the periphery of the fiber panel comprises an edge; and wherein the border of the structure is formed on the edge.

5. The trim component of claim 3 wherein the structure is configured to accommodate at least one variation in at least one edge of the fiber panel.

6. The trim component of claim 3 wherein the fiber panel comprises an outer surface; wherein the cover is coupled to the outer surface of the fiber panel and the structure.

7. The trim component of claim 3 wherein the fiber panel comprises an outer surface and the structure comprises an outer surface; wherein the cover is coupled to the outer surface of the fiber panel and the outer surface of the structure.

8. The trim component of claim 3 wherein the fiber panel comprises a compression formed component with the periphery; and wherein the border of the structure is formed from a resin.

9. The trim component of claim 1 wherein the structure comprises a rib configured to support the fiber panel.

10. The trim component of claim 1 wherein the structure comprises a molded feature configured to support the fiber panel.

11. The trim component of claim 10 wherein the molded feature comprises a rib.

12. The trim component of claim 1 wherein the border of the structural substrate comprises a resin border disposed about a periphery of the fiber panel.

13. The trim component of claim 1 wherein the cover comprises at least one of (a) cover stock; (b) a woven fabric; (c) a non-woven fabric; (d) an applique; (e) a vinyl layer; (f) a foam layer; (g) a foil layer; (h) a leather covering.

14. The trim component of claim 1 wherein the cover comprises a cover stock applied to the fiber panel during a compression molding process.

15. A trim component for a vehicle interior comprising:
a fiber panel comprising a compression formed component;
a structure formed from a molded resin; and
a cover coupled to the fiber panel;
wherein the structure is coupled to at least one of (a) the cover, (b) the fiber panel;
wherein the structure comprises at least one molded feature;
wherein the compression formed component comprises an edge along a periphery and provides a structural substrate having a shape and a thickness along the edge;
wherein the structure comprises a border of the structural substrate along the thickness of the structural substrate provided by the compression formed component; and
wherein the at least one molded feature comprises a molded feature configured to support the fiber panel.

16. The trim component of claim 15 wherein the molded feature configured to support the fiber panel comprises a rib.

17. The trim component of claim 16 wherein the rib comprises at least one of (a) a ridge; (b) a runner.

18. The trim component of claim 15 wherein the molded feature comprises the border coupled to at least a portion of a periphery of the fiber panel.

19. The trim component of claim 15 wherein the border of the structural substrate comprises a resin border disposed about a periphery of the fiber panel.

20. The trim component of claim 15 wherein the cover comprises at least one of (a) cover stock; (b) a woven fabric; (c) a non-woven fabric; (d) an applique; (e) a vinyl layer; (f) a foam layer; (g) a foil layer; (h) a leather covering.

21. The trim component of claim 15 wherein the cover comprises a cover stock applied to the fiber panel during a compression forming process.

22. The trim component of claim 15 wherein the cover comprises a cover stock applied to at least one of (a) a portion of the fiber panel; (b) a portion of the resin border.

* * * * *